(12) United States Patent
Kilambi

(10) Patent No.: US 8,546,561 B2
(45) Date of Patent: Oct. 1, 2013

(54) NANO-CATALYTIC-SOLVO-THERMAL TECHNOLOGY PLATFORM BIO-REFINERIES

(75) Inventor: Srinivas Kilambi, Marietta, GA (US)

(73) Assignee: Renmatix, Inc., King of Prussia, PA (US)

( * ) Notice: Subject to any disclaimer, the term of this patent is extended or adjusted under 35 U.S.C. 154(b) by 265 days.

(21) Appl. No.: 12/504,611

(22) Filed: Jul. 16, 2009

(65) Prior Publication Data

US 2010/0069626 A1 Mar. 18, 2010

Related U.S. Application Data

(60) Provisional application No. 61/081,337, filed on Jul. 16, 2008, provisional application No. 61/081,341, filed on Jul. 16, 2008, provisional application No. 61/081,346, filed on Jul. 16, 2008, provisional application No. 61/081,348, filed on Jul. 16, 2008, provisional application No. 61/092,680, filed on Aug. 28, 2008, provisional application No. 61/224,809, filed on Jul. 10, 2009.

(51) Int. Cl.
   *C07H 1/06* (2006.01)
   *C07H 1/08* (2006.01)

(52) U.S. Cl.
   USPC ............................. 536/128; 536/124; 536/127

(58) Field of Classification Search
   None
   See application file for complete search history.

(56) References Cited

U.S. PATENT DOCUMENTS

| | | |
|---|---|---|
| 1,938,802 A | 10/1933 | Braun et al. |
| 2,156,159 A | 4/1939 | Olson et al. |
| 2,198,785 A | 4/1940 | Mohr et al. |
| 2,356,500 A | 8/1944 | Boinot |
| 2,516,833 A | 8/1950 | Ant-Wuorinen |
| 2,681,871 A | 6/1954 | Wallace |
| 2,759,856 A | 8/1956 | Saums et al. |
| 2,801,939 A | 8/1957 | Hignett et al. |
| 2,810,394 A | 10/1957 | Ferguson |
| 2,822,784 A | 2/1958 | Heller et al. |
| 2,851,382 A | 9/1958 | Schmidt |
| 2,881,783 A | 4/1959 | Andrews |
| 2,994,633 A | 8/1961 | Clark |
| 2,997,466 A | 8/1961 | Ball et al. |
| 3,212,932 A | 10/1965 | Hess et al. |
| 3,314,797 A | 4/1967 | Hess et al. |
| 3,792,719 A | 2/1974 | Dickinson |
| 3,990,904 A | 11/1976 | Friese et al. |
| 4,100,016 A | 7/1978 | Diebold et al. |
| 4,105,467 A | 8/1978 | Buckl et al. |
| 4,201,596 A | 5/1980 | Church et al. |
| 4,308,200 A | 12/1981 | Fremont |
| 4,316,747 A | 2/1982 | Rugg et al. |
| 4,316,748 A | 2/1982 | Rugg et al. |
| 4,318,748 A | 3/1982 | Church |
| 4,338,199 A | 7/1982 | Modell |
| 4,363,671 A | 12/1982 | Rugg et al. |
| 4,366,322 A | 12/1982 | Raymond |
| 4,368,079 A | 1/1983 | Rugg et al. |
| 4,405,377 A | 9/1983 | Neuzil |
| 4,409,032 A | 10/1983 | Paszner et al. |
| 4,427,453 A | 1/1984 | Reitter |
| 4,468,256 A | 8/1984 | Hinger |
| 4,470,851 A | 9/1984 | Paszner et al. |
| 4,493,797 A | 1/1985 | Avedesian |
| 4,520,105 A | 5/1985 | Sinner et al. |
| 4,535,593 A | 8/1985 | Sakka |
| 4,543,190 A | 9/1985 | Modell |
| 4,556,430 A | 12/1985 | Converse et al. |
| 4,607,819 A | 8/1986 | Spils |
| 4,612,286 A | 9/1986 | Sherman et al. |
| 4,637,835 A | 1/1987 | Nagle |
| 4,644,060 A | 2/1987 | Chou |
| 4,645,541 A | 2/1987 | DeLong |
| 4,674,285 A | 6/1987 | Durrant et al. |
| 4,675,198 A | 6/1987 | Sevenants |
| 4,699,124 A | 10/1987 | Nagle |
| 4,742,814 A | 5/1988 | Sinner et al. |
| 4,764,596 A | 8/1988 | Lora et al. |

(Continued)

FOREIGN PATENT DOCUMENTS

| | | |
|---|---|---|
| AU | 2002234469 | 7/2007 |
| CA | 1284637 | 6/1991 |

(Continued)

OTHER PUBLICATIONS

Schacht et al. J. of Supercritical Fluids (2008), vol. 46, pp. 299-321.*
Pasquini et al. J. of Supercritical Fluids (2005), vol. 36, pp. 31-39.*
Pasquini et al. J. of Supercritical Fluids (2005), vol. 34, pp. 125-134.*
Moreschi et al. J. Agric. Food Chem. (2004), vol. 52, pp. 1753-1758.*
Kamm et al. Appl. Microbiol. Biotechnol. (2004), vol. 64, pp. 137-145.*
Hamelinck et al. Biomass and Bioenergy (2005), vol. 28, pp. 384-410.*
International PCT Application No. PCT/US2011/21726, International Search Report and Written Opinion dated Jul. 5, 2011.
Holgate, et al., "Glucose Hydrolysis and Oxidation in Supercritical Water", AIChE Journal, 1995, 41(3), 637-636.

(Continued)

*Primary Examiner* — Patrick Lewis

(74) *Attorney, Agent, or Firm* — Kilpatrick Townsend & Stockton LLP; Travis B. Gasa

(57) ABSTRACT

Methods of making glucose and/or furfural from biomass require one or more supercritical fluids that may be used to process biomass, cellulose from the biomass, and/or xylose from the biomass. Examples of supercritical fluids for use in processing biomass include ethanol, water, and carbon dioxide at a temperature and pressure above the critical points for ethanol and carbon dioxide but at a temperature and/or pressure below that of the critical point for water. A supercritical fluid containing carbon dioxide and water may be used to convert cellulose to glucose or convert xylose to furfural. The fluid has a temperature and pressure above the critical point of carbon dioxide, but at least one of the temperature and pressure is below the critical point for water.

21 Claims, 19 Drawing Sheets

(56) References Cited

U.S. PATENT DOCUMENTS

| | | |
|---|---|---|
| 4,857,638 A | 8/1989 | Yalpani et al. |
| 4,946,946 A | 8/1990 | Fields et al. |
| 4,964,995 A | 10/1990 | Chum et al. |
| 5,009,746 A | 4/1991 | Hossain et al. |
| 5,041,192 A | 8/1991 | Sunol et al. |
| 5,125,977 A | 6/1992 | Grohmann et al. |
| 5,169,687 A | 12/1992 | Sunol |
| 5,196,460 A | 3/1993 | Lora et al. |
| 5,213,660 A | 5/1993 | Hossain et al. |
| 5,328,934 A | 7/1994 | Schiraldi |
| 5,338,366 A | 8/1994 | Grace et al. |
| 5,411,594 A | 5/1995 | Brelsford |
| 5,424,417 A | 6/1995 | Torget et al. |
| 5,503,996 A | 4/1996 | Torget et al. |
| 5,512,231 A | 4/1996 | Thies et al. |
| 5,516,952 A | 5/1996 | Lee et al. |
| 5,536,325 A | 7/1996 | Brink |
| 5,558,783 A | 9/1996 | McGuinness |
| 5,628,830 A | 5/1997 | Brink |
| 5,705,369 A | 1/1998 | Torget et al. |
| 5,788,812 A | 8/1998 | Agar et al. |
| 5,811,527 A | 9/1998 | Ishitoku et al. |
| 5,824,187 A | 10/1998 | Richter et al. |
| 5,830,763 A | 11/1998 | Junk et al. |
| 5,980,640 A | 11/1999 | Nurmi et al. |
| 6,022,419 A | 2/2000 | Torget et al. |
| 6,025,452 A | 2/2000 | Kurple |
| 6,090,291 A | 7/2000 | Akai et al. |
| 6,180,845 B1 | 1/2001 | Catallo et al. |
| 6,228,177 B1 | 5/2001 | Torget |
| 6,419,788 B1 | 7/2002 | Wingerson |
| 6,555,350 B2 | 4/2003 | Ahring et al. |
| 6,569,640 B1 | 5/2003 | Castor et al. |
| 6,642,396 B1 | 11/2003 | Zeitsch et al. |
| 6,743,928 B1 | 6/2004 | Zeitsch |
| 6,872,316 B2 | 3/2005 | Heikkilä et al. |
| 6,878,212 B1 | 4/2005 | Pinatti et al. |
| 6,921,820 B2 | 7/2005 | Arai et al. |
| 6,929,752 B2 | 8/2005 | Cansell |
| 7,189,306 B2 | 3/2007 | Gervais |
| 7,238,242 B2 | 7/2007 | Pinatti et al. |
| 7,259,231 B2 | 8/2007 | Cornish et al. |
| 7,262,331 B2 | 8/2007 | van de Beld et al. |
| 7,476,296 B2 | 1/2009 | Appel et al. |
| 7,547,539 B2 | 6/2009 | Ikegami et al. |
| 7,566,383 B2 | 7/2009 | Everett et al. |
| 7,585,652 B2 | 9/2009 | Foody et al. |
| 7,649,086 B2 | 1/2010 | Belanger et al. |
| 7,666,637 B2 | 2/2010 | Nguyen |
| 7,670,813 B2 | 3/2010 | Foody et al. |
| 7,754,457 B2 | 7/2010 | Foody et al. |
| 7,771,699 B2 | 8/2010 | Adams et al. |
| 7,955,508 B2 | 6/2011 | Allan et al. |
| 7,960,325 B2 | 6/2011 | Kluko |
| 8,030,039 B1 | 10/2011 | Retsina et al. |
| 8,057,639 B2 | 11/2011 | Pschorn et al. |
| 8,282,738 B2 | 10/2012 | Kilambi et al. |
| 2001/0050096 A1 | 12/2001 | Costantini et al. |
| 2002/0061583 A1 | 5/2002 | Kawamura et al. |
| 2002/0069987 A1 | 6/2002 | Pye |
| 2003/0156970 A1 | 8/2003 | Oberkofler et al. |
| 2003/0221361 A1 | 12/2003 | Russell et al. |
| 2004/0020854 A1 | 2/2004 | Ali et al. |
| 2004/0231661 A1 | 11/2004 | Griffin et al. |
| 2005/0065336 A1 | 3/2005 | Karstens |
| 2006/0281913 A1 | 12/2006 | Ferreira et al. |
| 2007/0108036 A1 | 5/2007 | Siskin et al. |
| 2007/0148751 A1 | 6/2007 | Griffin et al. |
| 2007/0161095 A1 | 7/2007 | Gurin |
| 2007/0217980 A1 | 9/2007 | Garcia-Ortiz et al. |
| 2007/0254348 A1 | 11/2007 | Retsina et al. |
| 2007/0259412 A1 | 11/2007 | Belanger et al. |
| 2007/0267008 A1 | 11/2007 | Funazukuri et al. |
| 2008/0015336 A1 | 1/2008 | Cornish et al. |
| 2008/0032344 A1 | 2/2008 | Fallavollita |
| 2008/0051566 A1 | 2/2008 | Ohman et al. |
| 2008/0292766 A1 | 11/2008 | Hoffman et al. |
| 2008/0295981 A1 | 12/2008 | Shin et al. |
| 2008/0302492 A1 | 12/2008 | Shin et al. |
| 2009/0023187 A1 | 1/2009 | Foody et al. |
| 2009/0038212 A1 | 2/2009 | Cooper |
| 2009/0056201 A1 | 3/2009 | Morgan |
| 2009/0118477 A1 | 5/2009 | Hallberg et al. |
| 2009/0176286 A1 | 7/2009 | O'Connor et al. |
| 2009/0176979 A1 | 7/2009 | Hara et al. |
| 2009/0205546 A1 | 8/2009 | Kluko |
| 2009/0221814 A1 | 9/2009 | Pschorn et al. |
| 2009/0223612 A1 | 9/2009 | McKnight et al. |
| 2009/0229599 A1 | 9/2009 | Zhang |
| 2009/0232892 A1 | 9/2009 | Yamasaki et al. |
| 2009/0288788 A1 | 11/2009 | Castor |
| 2010/0004119 A1 | 1/2010 | Gadkaree et al. |
| 2010/0012583 A1 | 1/2010 | Stuart |
| 2010/0043782 A1 | 2/2010 | Kilambi |
| 2010/0048884 A1 | 2/2010 | Kilambi |
| 2010/0048924 A1 | 2/2010 | Kilambi |
| 2010/0055629 A1 | 3/2010 | McKnight et al. |
| 2010/0063271 A1 | 3/2010 | Allan et al. |
| 2010/0077752 A1 | 4/2010 | Papile |
| 2010/0081798 A1 | 4/2010 | Balensiefer et al. |
| 2010/0136634 A1 | 6/2010 | Kratochvil et al. |
| 2010/0136642 A1 | 6/2010 | Belanger et al. |
| 2010/0146842 A1 | 6/2010 | Dumenil |
| 2010/0146843 A1 | 6/2010 | Dumenil |
| 2010/0152509 A1 | 6/2010 | Ekman |
| 2010/0159569 A1 | 6/2010 | Medoff et al. |
| 2010/0175690 A1 | 7/2010 | Nagahama et al. |
| 2010/0184151 A1 | 7/2010 | Tolan et al. |
| 2010/0233771 A1 | 9/2010 | McDonald et al. |
| 2010/0269990 A1 | 10/2010 | Dottori et al. |
| 2010/0279361 A1 | 11/2010 | South et al. |
| 2010/0326610 A1 | 12/2010 | Harvey et al. |
| 2010/0329938 A1 | 12/2010 | Allan et al. |
| 2010/0330638 A1 | 12/2010 | Aita et al. |
| 2011/0021743 A1 | 1/2011 | Cornish et al. |
| 2011/0076724 A1 | 3/2011 | Dumenil |
| 2011/0079219 A1 | 4/2011 | McDonald et al. |
| 2011/0100359 A1 | 5/2011 | North |
| 2011/0126448 A1 | 6/2011 | Dumenil |
| 2011/0137085 A1 | 6/2011 | Trahanovsky et al. |
| 2011/0151516 A1 | 6/2011 | Van Der Heide et al. |
| 2011/0165643 A1 | 7/2011 | Retsina et al. |
| 2011/0171709 A1 | 7/2011 | Bardsley |
| 2011/0192560 A1 | 8/2011 | Heikkila et al. |
| 2011/0232160 A1 | 9/2011 | Siskin et al. |
| 2011/0237838 A1 | 9/2011 | Zmierczak et al. |
| 2011/0239973 A1 | 10/2011 | Qin |
| 2011/0253326 A1 | 10/2011 | Sherman et al. |
| 2011/0287502 A1 | 11/2011 | Castor |
| 2011/0294991 A1 | 12/2011 | Lake et al. |
| 2012/0103325 A1 | 5/2012 | Koenig et al. |
| 2012/0108798 A1 | 5/2012 | Wenger et al. |
| 2012/0116063 A1 | 5/2012 | Jansen et al. |
| 2012/0145094 A1 | 6/2012 | Simard |
| 2012/0146784 A1 | 6/2012 | Hines et al. |
| 2012/0184788 A1 | 7/2012 | Loop et al. |

FOREIGN PATENT DOCUMENTS

| | | |
|---|---|---|
| CN | 1680415 | 10/2005 |
| CN | 1931866 | 3/2007 |
| CN | 101200479 | 6/2008 |
| CN | 101613970 | 12/2009 |
| CN | 101736631 | 6/2010 |
| CN | 101787398 | 7/2010 |
| CN | 101886143 | 11/2010 |
| CZ | 225851 | 3/1984 |
| CZ | 248106 | 1/1987 |
| DE | 3225074 | 1/1984 |
| DE | 10259928 A1 | 7/2004 |
| EP | 0037912 | 10/1981 |
| EP | 1194226 | 9/2004 |
| EP | 1364072 | 3/2007 |
| EP | 1527204 | 4/2008 |
| EP | 1836181 | 3/2009 |

| | | |
|---|---|---|
| FR | 2580669 | 10/1986 |
| GB | 291991 | 6/1928 |
| GB | 692284 | 6/1953 |
| GB | 1245486 | 9/1971 |
| GB | 1569138 | 6/1980 |
| GB | 2145090 | 3/1985 |
| JP | 50145537 | 11/1975 |
| JP | 56045754 | 4/1981 |
| JP | 57061083 | 4/1982 |
| JP | 62283988 | 12/1987 |
| JP | 2001095594 | 4/1991 |
| JP | 04197192 | 7/1992 |
| JP | 11226385 | 8/1999 |
| JP | 2001262162 | 9/2001 |
| JP | 2003212888 | 7/2003 |
| JP | 2005040025 | 2/2005 |
| JP | 2005296906 | 10/2005 |
| JP | 2006223152 | 8/2006 |
| JP | 2006263527 | 10/2006 |
| JP | 2007313476 | 12/2007 |
| JP | 2008011753 | 1/2008 |
| JP | 2008035853 | 2/2008 |
| JP | 2008292018 | 12/2008 |
| JP | 2009189291 | 8/2009 |
| JP | 201132388 | 2/2011 |
| KR | 2009030967 | 3/2009 |
| KR | 20090039470 | 4/2009 |
| KR | 20100032242 | 3/2010 |
| RU | 2371002 | 10/2009 |
| WO | 8300370 | 2/1983 |
| WO | 8301958 | 6/1983 |
| WO | 9817727 | 4/1998 |
| WO | 9923260 | 5/1999 |
| WO | 9967409 | 12/1999 |
| WO | 0061276 | 10/2000 |
| WO | 0160752 | 8/2001 |
| WO | 0204524 | 1/2002 |
| WO | 02070753 | 9/2002 |
| WO | WO-2007056701 | 5/2007 |
| WO | 2008026932 | 3/2008 |
| WO | 2008036500 | 3/2008 |
| WO | 2008050740 | 5/2008 |
| WO | 2008121043 | 10/2008 |
| WO | 2008143078 | 11/2008 |
| WO | WO-2009015409 | 2/2009 |
| WO | 2009108773 | 3/2009 |
| WO | WO-2010009343 | 1/2010 |
| WO | 2010034055 | 4/2010 |
| WO | 2010045576 | 4/2010 |
| WO | 2010046532 | 4/2010 |
| WO | 2010069516 | 6/2010 |
| WO | 2010113129 | 10/2010 |
| WO | 2010121367 | 10/2010 |
| WO | 2011002822 | 1/2011 |
| WO | WO-2011091044 | 7/2011 |
| WO | 2011094859 | 8/2011 |

OTHER PUBLICATIONS

Li, et al., "Interaction of Supercritical Fluids with Lignocellulosic Materials", Industrial Engineering Chemistry Research, American Chemical Society Res., Jul. 1988, 27(7):1301-1312.

Lu, et al., "Decomposition of Cellulose to Produce 5-hydroxymethyl-furaldehyde in Subcritical Water", Abstract of Transactions of Tranjin University, STN Accession No. 2008:1016799, Document No. 151:427986, 2008, 14(3), 198-201.

Moreschi, et al., "Hydrolysis of Ginger Bagasse Starch in Subcritical Water and Carbon Dioxide", Journal of Agricultural and Food Chemistry, 2004, 52(6), 1753-1758.

Saito, et al., "The Investigation of Degradation Reaction of Various Saccharides in High Temperature and High Pressure Water", Journal of Physics:Conference Series, 2008, 121.

Wiboonsiriku, et al., "Properties of Extracts from Defatted Rice Bran by its Subcritical Water Treatment", Journal of Agricultural and Food Chemistry, 2007, 55(21), 8759-8765.

Zhao, et al., "Supercritical hydrolysis of cellulose for oligosaccharide production in combined technology", Chemical Engineering Journal, Aug. 1, 2009, 150(2):411-417.

PCT Application No. PCT/US2009/050898, International Preliminary Report on Patentability mailed Jan. 18, 2011.

PCT Application No. PCT/US2009/050898, International Search Report and Written Opinion mailed Feb. 8, 2010.

Adschiri, et al., "Noncatalytic Conversion of Cellulose in Supercritical and Sub-Critical Critical Water", Journal of Chemical Engineering of Japan, 1993, 26(6):676-680.

Bennett, et al., "Chemicals from Forest Products by Supercritical Fluid Extraction", Fluid Phase Equil., 1983, 10:337.

Bicker, et al., "Catalytical conversion of carbohydrates in subcritical water: A new chemical process for lactic acid production", Journal of Molecular Catalysis A: Chemical 239, 2005, 151-157.

Boocock, et al., "Liquefaction of Biomass by Rapid Hydrolysis", Can. J. Chem. Eng., 1983, 61:80.

Chamblee, et al., "Reversible in situ acid formation for β-pinene hydrolysis using $CO_2$ expanded liquid and hot water", Green Chemistry, 2004, vol. 6, 382-386.

Dias, et al. "Dehydration of xylose into furfural over micro-mesoporous sulfonic acid catalysts", Journal of Catalysis 229, 2005, 414-423.

Eckert, et al., "Environmental Science and Technology", 1986, 20:319-325.

Ehara, et al. "A comparative study on chemical conversion of cellulose between the batch-type and flow-type in supercritical water", Cellulose, 2002, 9:301-311.

Erzengin, et al., "Liquefaction of Sunflower Stalk by Using Supercritical Extraction", Energy Conversion and Management, Elsevier Science Publishers, Oxford, GB Aug. 1998, 39:11, 1203-1206.

Guirong, et al., "Cellulose decomposition behavior in hot-compressed aprotic solvents", Science in China Series B: Chemistry, May 2008, vol. 51, No. 5, 479-486.

Houghton, et al., "Reactivity of Some Organic Compounds with Supercritical Water", Fuel 1986, 61:827.

Kim, et al., "Selective Synthesis of Furfural from Xylose with Supercritical Carbon Dioxide and Solid Acid Catalyst", Journal of Industrial and Engineering Chemistry, The Korean Society of Industrial and Engineering Chemistry, Korea 2001, 7(6); 424-429.

Knopf, et al., "Reactive Extraction of Lignin from Biomass Using Supercritical Ammonia-Water Mixtures", J. Supercritical Fluids 1993, 6:249-254.

Li, et al., "Interaction of Supercritical Fluids with Lignocellulosic Materials", Industrial and Engineering Chemistry Research 1988, 27(7): 1301-1312.

Marchessault, et al., "A New Understanding of the Carbohydrate System", Future Sources of Organic Raw Materials 1980, 613-625.

Matsumura, et al. "Supercritical Water Treatment of Biomass for Energy and Material Recovery", Combust. Sci. and Tech., 2006, 178: 509-536.

McCoy, et al., "Extraction of Lignin from Biomass with Supercritical Alcohol", J. Supercritical Fluids 1989, 2:80-84.

McHugh, et al., "Supercritical Fluid Extraction : Principles and Practice", Butterworths 1986, 309-310.

Miyazawa, et al., "Polysaccharide Hydrolysis Accelerated by Adding Carbon Dioxide under Hydrothermal Conditions", Biotechnol. Prog. 2005, 21:1782-1785.

Modell, et al., "Supercritical Water Oxidation of Pulp Mill Sludges", Tappi J. 1992, 75:195.

Ogihara, et al. "Direct observation of cellulose dissolution in subcritical and supercritical water over a wide range of water densities (500-1000 kg/m$^3$)", Cellulose, 2005, 12:595-606.

Osada, et al., "Low Temperature Catalytic Gasification of Lignin and Cellulose with a Ruthenium Catalyst in Supercritical Water", Energy Fuels 2004 , 18: 327-333.

Pasquini, et al., "Extraction of Lignin from sugar cane bagasse and *Pinus taeda* wood chips using ethanol-water mixtures and carbon dioxide at high pressures", Journal of Supercritical Fluids, PRA Press, US Nov. 2005, 36(1); 31-39.

Persson, et al., "Supercritical Fluid Extraction of a Lignocellulosic Hydrolysate of Spruce for Detoxification and to Facilitate Analysis of Inhibitors", Biotechnology and Bioengineering, Wiley & Sons , Hoboken, NJ, US Sep. 20, 2002, 79(6):694-700.

Peter, et al., "High Pressure Extraction of Lignin from Biomass", Supercritical Fluid Technology, p. 385 (1985).

Rao, et al., "Pyrolysis Rates of Biomass Materials", Energy 1998, 23:973-978.

Sako, "Kinetic study of furfural formation accompanying supercritical carbon dioxide extraction", Journal of Chemical Engineering of Japan, Society of Chemical Engineers Aug. 1, 1992, 25(4):372-377.

Sangarunlert, et al., "Furfural production by acid hydrolysis and supercritical carbon dioxide extraction from rice husk", Korean Journal of Chemical Engineering 2007, 24(6): 936-941.

Sasaki, et al., "Cellulose Hydrolysis in Sub-Critical and Supercritical Water", Journal of Supercritical Fluids 1998, 13:261-268.

Sina, et al. "Key Compounds of the Hydropyrolysis of Glucose in Supercritical Water in the Presence of $K_2CO_3$", Ind. Eng. Chem. Res., 2003, 42(15), 3516-3521.

Walsum, et al. "Carbonic acid enhancement of hydrolysis in aqueous pretreatment of corn stover", Bioresource Technology 93, 2004, 271-226.

Yoshida, et al., "Gasification of Biomass Model Compound and Real Biomass in Supercritical Water", Biomass and Bioenergy, 26:71-78 (2004).

U.S. Appl. No. 12/504,613, Non-Final Office Action mailed Sep. 26, 2011.

U.S. Appl. No. 12/504,628, Non-Final Office Action mailed Aug. 8, 2011.

U.S. Appl. No. 12/504,628, Notice of Allowance mailed Dec. 7, 2011.

U.S. Appl. No. 12/504,628, Response to Office Action filed Oct. 27, 2011.

U.S. Appl. No. 12/504,628, Supplemental Response filed Nov. 14, 2011.

U.S. Appl. No. 12/504,636, Office Action mailed Nov. 10, 2011.

U.S. Appl. No. 12/504,636, Office Action mailed Apr. 23, 2012 (11 pages).

European Patent Application No. 09790548.3, Article 94(3) EPC, mailed Mar. 30, 2012 (8 pages).

U.S. Appl. No. 12/504,613, "Response to Final Office Action", filed May 30, 2012 (11 pages).

U.S. Appl. No. 12/504,636, "Response to Office Action", filed Jun. 8, 2012 (10 pages).

(Abstract) "Evaluation of materials for use in letdown valves and coal feed pumps for coal liquefaction service", Electr Power Res Inst Rep EPRIAF, No. 579, 1978, 94.

(Abstract) "Evaluation of materials for use in letdown valves for coal liquefaction service", Annual Conference on Materials for Coal Conversion and Utilization (CONF-791014), Oct. 9-11, 1979.

U.S. Appl. No. 12/504,613, "Advisory Action Received", Jun. 5, 2012, 2 pages.

U.S. Appl. No. 12/504,613, "Office Action", Aug. 2, 2012, 30 pages.

U.S. Appl. No. 12/504,636, "Notice of Allowance Received", Jul. 27, 2012, 11 pages.

Adschiri et al., "Cellulose hydrolysis in supercritical water to recover chemicals", Reaction Engineering for Pollution Prevention, 2000, 205-220.

(Abstract) Arai et al., "Biomass conversion in supercritical water for chemical recycle", Enerugi, Shigen, 16(2), 1995, 175-180.

(Abstract) Baek et al., "Optimization of the pretreatment of rice straw hemicellulosic hydrolyzates for microbial production of xylitol", Biotechnology and Bioprocess Engineering, 12(4), 2007, 404-409.

(Abstract) Balhouse, "Design, fabrication, and evaluation of a spiral-flow letdown valve", Electric Power Research Institute, Advanced Power Systems Division, EPRI AP, 1981.

(Abstract) Ballesteros et al., "Fractionation of Cynara cardunculus (cardoon) biomass by dilute-acid pretreatment", Applied Biochemistry and Biotechnology, 137-140, 2007, 239-252.

Bobleter, "Hydrothermal Degradation and Fractionation of Saccharides and Polysaccharides", 1998.

(Abstract) Bustos et al., "(Abstract) Modeling of the hydrolysis of sugar cane bagasse with hydrochloric acid", Applied Biochemistry and Biotechnology, 104(1), 2003, 51-68.

(Abstract) Carrasco et al., "(Abstract) SO2-catalyzed steam pretreatment and fermentation of enzymatically hydrolyzed sugarcane bagasse", Enzyme and Microbial Technology, 46(2), 2010, 64-73.

(Abstract) Carrasco et al., "Effects of dilute acid and steam explosion pretreatments on the cellulose structure and kinetics of cellulosic fraction hydrolysis by dilute acids in lignocellulosic materials", Applied Biochemistry and Biotechnology, 45-46, 1994, 23-34.

(Abstract) Carvalho et al., "Sugarcane bagasse hydrolysis with phosphoric and sulfuric acids and hydrolysate detoxification for xylitol production", Journal of Chemical Technology and Biotechnology, 79(11), 2004, 1308-1312.

(Abstract) Chen et al., "Study on dilute-acid pretreatment of corn stalk", Linchan Huaxue Yu Gongye, 29(2), 2009, 27-32.

(Abstract) Converti et al., "Wood hydrolysis and hydrolyzate detoxification for subsequent xylitol production", Chemical Engineering & Technology, 23(11), 2000, 1013-1020.

(Abstract) Do Egito De Paiva et al., "Optimization of D-xylose, L-arabinose and D-glucose production obtained from sugar cane bagasse hydrolysis process", Brazilian Symposium on the Chemistry of Lignins and Other Wood Components, 6th, 2001, 333-337.

(Abstract) Dogaris et al., "Hydrothermal processing and enzymatic hydrolysis of sorghum bagasse for fermentable carbohydrates production", Bioresource Technology, 100(24), 2009, 6543-6549.

Ehara et al., "Characterization of the lignin-derived products from wood as treated in supercritical water", Journal of Wood Science, vol. 48, No. 4, Aug. 2002, pp. 320-325.

Ehara et al., "Decomposition behavior of cellulose in supercritical water, subcritical water, and their combined treatments", J. Wood Sci., vol. 51, 2005, 148-153.

Ehrman, "Methods for the chemical analysis of biomass process streams", Handbook on Bioethanol, 1996, 395-415.

European Patent Application No. 09790548.3, "Response to Article 94(3) Communication", Jul. 24, 2012, 13 pages.

Garrote et al., "Manufacture of xylose-based fermentation media from corncobs by posthydrolysis of autohydrolysis liquors", Applied Biochemistry and Biotechnology, 95(3), 2001, 195-207.

(Abstract) Geddes et al., "Optimizing the saccharification of sugar cane bagasse using dilute phosphoric acid followed by fungal celluloses", Bioresource Technology, 101(6), 2010, 1851-1857.

(Abstract) Gong et al., "Study on hydrolysis and saccharification of microcrystalline cellulose in supercritical water", Xiandai Huagong, 30(2), 2010, 44-47.

Hamelinck et al., "Ethanol from lignocellulosic biomass: techno-economic performance in short-, middle- and long-term", Biomass and Bioenergy, vol. 28, 2005, 384-410.

(Abstract) Harmer et al., "A new route to high yield sugars from biomass: phosphoric-sulfuric acid", Chemical Communications, vol. 43, 2009, 6610-6612.

(Abstract) Herrera et al., "Production of Xylose from Sorghum Straw Using Hydrochloric Acid", Journal of Cereal Science, 37(3), 2003, 267-274.

(Abstract) Hosaka, "Filtration of lignin in hydrolysis solution", Hiroshima Daigaku Suichikusangakubu Kiyo, 17(1), 1978, 17-25.

Ioannidou et al., "Direct determination of toxic trace metals in honey and sugars using inductively coupled plasma atomic emission spectrometry", Talanta, 65(1), 2005, 92-97.

(Abstract) Jensen et al., "Effects of dilute acid pretreatment conditions on enzymatic hydrolysis monomer and oligomer sugar yields for aspen, balsam, and switchgrass", Bioresource Technology, 101(7), 2010, 2317-2325.

(Abstract) Jeong et al., "Optimizing dilute-acid pretreatment of rapeseed straw for extraction of hemicellulose", Applied Biochemistry and Biotechnology, 161(1-8), 2010, 22-33.

(Abstract) Jiang et al., "A method for quick analysis of biomass chemical composition from element analysis", Huagong Xuebao (Chinese Edition), 61(6), 2010, 1506-1509.

(Abstract) Kamada et al., "Development of letdown valve on pilot plant", Sekitan Kagaku Kaigi Happyo Ronbunshu, 35th, 1998, 459-462.

Kamm et al., "Principles of biorefineries", Appl. Microbiol. Biotechnol, vol. 64., 2004, 137-145.

(Abstract) Karimi et al., "Conversion of rice straw to sugars by dilute-acid hydrolysis", Biomass and Bioenergy, 30(3), 2006, 247-253.

(Abstract) Kupianen et al., "Comparison of formic and sulfuric acids as a glucose decomposition catalyst", Ind. Eng. Chem. Res., 49(18), 2010, 8444-8449.

(Abstract) Lee et al., "Hydrolysis of cellulose under subcritical and supercritical water using continuous flow system", Hwahak Konghak, 39(2), 2001, 257-263.

(Abstract) Levai, "Atom spectrometric methods for determination of trace metal impurities in pharmaceutical substances", Acta Pharmaceutica Hungarica, 71(3), 2001, 350-356.

(Abstract) Li, "Analysis of failure cause in CCI pressure reducing valves used in product pipeline", Guandao Jishu Yu Shebei, (5), 2008, 34-36.

(Abstract) Li et al., "Studies of Monosaccharide Production through Lignocellulosic Waste Hydrolysis Using Double Acids", Energy & Fuelds, 22(3), 2008, 2015-2021.

(Abstract) Li et al., "Improvement on technology of extracting xylose from the corncobs by acid method", Shipin Gongye Keji, 30(6), 2009, 263-264.

Li et al. "Fructose decomposition kinetics in organic acides-enriched high termperature liquid water", Biomass and Bioenergy, vol. 33, Issue 9, Sep. 2009, 1182-1187.

(Abstract) Li et al., "Study on the recovery of lignin from black liquor by ultrafiltration", Huaxue Gongcheng, 31(1), 2003, 49-52.

(Abstract) Lloyd et al., "Combined sugar yields for dilute sulfuric acid pretreatment of corn stover followed by enzymatic hydrolysis of the remaining solids", Bioresource Technology, 96(18), 2005, 1967-1977.

(Abstract) Lopez et al., "Chemical characterization and dilute-acid hydrolysis of rice hulls from an artisan mill", BioResources, 5(4), 2010, 2268-2277.

(Abstract) Lu et al., "Optimization of H2SO4-catalyzed hydrothermal pretreatment of rapeseed straw for bioconversion to ethanol: focusing on pretreatment at high solids content", Bioresource Technology, 100(12), 2009, 3048-3053.

(Abstract) Luterbacher et al., "High-Solids Biphasic CO2-H2O Pretreatment of Lignocellulosic Biomass", Biotechnology and Bioengineering, 107(3), 2010, 451-460.

(Abstract) Malaluan et al., "Biomass conversion in supercritical water", Off. Proc. Comb. Conf., 6th Conf. Asia Pac. Confed. Chem. Eng., 21st Australas. Chem. Eng. Conf., vol. 1 (Publisher: Inst. Eng., Aus., Barton, Australia), 1993, 209/1-214/1.

(Abstract) Marone et al., "Comminution of hydrolytic lignin in a jet mill", Gidroliznaya i Lesokhimicheskaya Promyshlennost, (6), 1991, 14-15.

(Abstract) Matsunaga et al., "Super-rapid chemical conversion of sugi wood by supercritical and subcritical water treatment", Mokuzai Gakkaishi, 50(5), 2004, 325-332.

(Abstract) McWilliams et al., "Comparison of aspen wood hydrolysates produced by pretreatment with liquid hot water and carbonic acid", Applied Biochemistry and Biotechnology, 98-100, 2002, 109-121.

Miller-Ihli et al., "Direct determination of lead in sugars using graphite furnace atomic absorption spectrometry", Atomic Spectroscopy, 14(4), 1993, 85-9.

(Abstract) Mok et al., "Dilute acid hydrolysis of biopolymers in a semi-batch flow reactor at supercritical pressure", Energy from Biomass and Wastes, 13, 1990, 1329-1347.

(Abstract) Mosier et al., "Optimization of pH controlled liquid hot water pretreatment of corn stover", Bioresource Technology, 96(18), 2005, 1986-1992.

Mosier et al., "Characterization of Acid Catalytic Domains for Cellulose Hydrolysis and Glucose Degradation", Biotechnology and Bioengineering, vol. 79, No. 6, Sep. 20, 2002, 610-618.

(Abstract) Nakata et al., "Bioethanol from cellulose with supercritical water treatment followed by enzymatic hydrolysis", Applied Biochemistry and Biotechnology, 129-132, 2006, 476-485.

(Abstract) Napradean et al., "Studies regarding cadmium determination by atomic absorption spectrometry. Note II. Pharmaceutical finished products", Farmacia, 53(2), 2005, 86-90.

(Abstract) Neureiter et al., "Dilute acid hydrolysis of presscakes from silage and grass to recover hemicellulose-derived sugars", Bioresource Technology, 92(1), 2004, 21-29.

(Abstract) Neureiter et al., "Dilute-acid hydrolysis of sugarcane bagasse at varying conditions", Applied Biochemistry and Biotechnology, 98-100, 2002, 49-58.

Nunn et al., "Product compositions and kinetics in the rapid pyrolysis of milled wood lignin", Industrial & Engineering Chemistry Process Design and Development, vol. 24, Jul. 1985, pp. 844-852.

(Abstract) Parajo et al., "Pre-hydrolysis of Eucalyptus wood with dilute sulfuric acid: operation in autoclave", Holz als Roh- und Werkstoff, 52(2), 1994, 102-8.

(Abstract) Park et al., "Kinetics of cellulose decomposition under subcritical and supercritical water in continuous flow system", Korean Journal of Chemical Engineering, 19(6), 2002, 960-966.

(Abstract) Pessoa, Jr. et al., "Acid hydrolysis of hemicellulose from sugarcane bagasse", Brazilian Journal of Chemical Engineering, 14(3), 1997, 291-297.

Pohl et al., "Direct determination of the total concentrations of magnesium, calcium, manganese, and iron in addition to their chemical and physical fractions in dark honeys", Analytical Letters, 44(13), 2011, 2265-2279.

(Abstract) Ramirez et al., "Mathematical modelling of feed pretreatment for bioethanol production", Computer-Aided Chemical Engineering, vol. 26, 2009, 1299-1304.

(Abstract) Roberto et al., "Dilute-acid hydrolysis for optimization of xylose recovery from rice straw in a semi-pilot reactor", Industrial Crops and Products, 17(3), 2003, 171-176.

Saka et al., "Chemical conversion of biomass resources to useful chemicals and fuels by supercritical water treatment", Bridgewater AV(ed) Progress in Thermocritical Biomass Conversion. Blackwell, Oxford, 2001, 1338-1348.

(Abstract) Saka, "Supercritical fluids to biomass research", Cellulose Communications, 5(3), 1998, 129-135.

(Abstract) Saka et al., "Supercritical fluids to biomass research (II)", Cellulose Communications, 9(3), 2002, 137-143.

Saka et al., "Chemical conversion of various celluloses to glucose and its derivatives in supercritical water", Cellulose Communications, 6(3), 1999, 177-191.

(Abstract) Sanchez et al., "Dilute-acid hydrolysis for fermentation of the Bolivian straw material Paja Brava", Bioresource Technology, 93(3), 2004, 249-256.

(Abstract) Sarrouh et al., "Biotechnological production of xylitol: enhancement of monosaccharide production by post-hydrolysis of dilute acid sugarcane hydrolysate", Applied Biochemistry and Biotechnology, 153(1-3), 2009, 163-170.

Sasaki et al., "Direct hydrolysis of cellulose to glucose using ultra-high temperature and pressure steam explosion", Carbohydrate Polymers 89, 2012, 298-301.

Sasaki et al., "Rapid and selective conversion of cellulose to valuable chemical intermediates using supercritical water", Proc. 6th international Symposium on Supercritical Fluids, Tome 2, 2003, 1417-1422.

(Abstract) Sasaki et al., "Super-rapid enzymatic hydrolysis of cellulose with supercritical water solubilization pretreatment", Kobunshi Ronbunshu, 58(10), 2001, 527-532.

Sasaki et al., "Dissolution and Hydrolysis of Cellulose in Subcritical and Supercritical Water", Industrial & Engineering Chemistry Research, 39(8), 2000, 2883-2890.

Sasaki et al., "Kinetics of cellulose conversion at 25 MPa in sub-and supercritical water", AIChE Journal, 50(1), 2004, 192-202.

(Abstract) Saucedo-Luna et al., "Optimization of acid hydrolysis of bagasse from *Agave tequilana* Weber", Revista Mexicana de Ingenieria Quimica, 9(1), 2010, 91-97.

(Abstract) Sera et al., "Development of saccharification techniques for cellulosic biomass", Hitz Giho, 68(2), 2008, 40-45.

(Abstract) Shikinaka et al., "Polyfunctional nanometric particles obtained from lignin, a woody biomass resource", Green Chemistry, 12(11), 2010, 1914-1916.

(Abstract) Soederstroem et al., "Effect of Washing on Yield in One- and Two-Step Steam Pretreatment of Softwood for Production of Ethanol", Biotechnology Progress, 20(3), 2004, 744-749.

(Abstract) Sokolov et al., "Activation of hydrolytic lignin obtained from corncobs", Kozharska i Obuvna Promishlenost, 13(6), 1972, 13-23.

(Abstract) Spigno et al., "Cellulose and hemicelluloses recovery from grape stalks", Bioresource Technology, 99(10), 2008, 4329-4337.

(Abstract) Springer, "Prehydrolysis of hardwoods with dilute sulfuric acid", Industrial & Engineering Chemistry Product Research and Development, 24(4), 1985, 614-23.

Srinivasan et al., "Pretreatment of Guayule Biomass Using Supercritical Carbon Dioxide-Based Method", Bioresource Technology, 101(24), 2010, 9785-9791.

(Abstract) Srokol et al., "Hydrothermal upgrading of biomass to biofuel; studies on some monosacchride model compounds", Carbohydrate Research, 339(10), 2004, 1717-1726.

(Abstract) Steinke, "Valve solutions for high-pressure letdown", Proceedings of the Symposium on Instrumentation for the Process Industries, 44th, 1989, 39-43.

(Abstract) Steinke et al., "Valve solutions for high pressure letdown", Advances in Instrumentation, 42(3), 1987, 1381-1390.

Strobel et al., "Carbohydrate Transport by the Anaerobic Thermophile *Clostridium thermocellum* LQRI", Applied and Environmental Microbiology, Nov. 1995, 4012-4015.

(Abstract) Suitor et al., "Development of a coal slurry letdown valve", American Society of Mechanical Engineers, Fluids Engineering Division, vol. 23, 1985, 142-144.

(Abstract) Sukhanovskii et al., "The chemical composition of the organic part and of ash in hydrolysis lignins", Gidroliznaya i Lesokhimicheskaya Promyshlennost, 18(5), 1965, 15-17.

(Abstract) Svitel'Skii, "Study of ash in lignin from kraft mill effluents", Mater. Nauch.-Tekh. Konf. Leningrad. Lesotekh. Akad., No. 4, 1966, 180-185.

Terol et al., "High-temperature liquid chromatography inductively coupled plasma atomic emission spectrometry hyphenation for the combined organic and inorganic analysis of foodstuffs", Journal of Chromatography, 1217(40), 2010, 6195-6202.

(Abstract) Trickett et al., "(Abstract) Dilute acid hydrolysis of bagasse hemicellulose", ChemSA, 8(3), 1982, 11-15.

Um et al., "Acid Hydrolysis of Hemicellulose in Green Liquor Pre-Pulping Extract of Mixed Northern Hardwoods", Appl. Biochem Biotechnol,153(1-3), 2009, 127-38.

(Abstract) Van Walsum et al., "Carbonic acid enhancement of hydrolysis in aqueous pretreatment of corn stover", Bioresource Technology, 93(3), 2004, 217-226.

(Abstract) Van Walsum, "Severity function describing the hydrolysis of xylan using carbonic acid", Applied Biochemistry and Biotechnology, 91-93, 2001, 317-329.

(Abstract) Varga et al., "Optimization of steam pretreatment of corn stover to enhance enzymatic digestibility", Applied Biochemistry and Biotechnology, 113-116, 2004, 509-523.

(Abstract) Veres et al., "Studies on matrix effects in the determination of the metal content of sugar complexes by atomic absorption spectrometry", Magyar Kemiai Folyoirat, 93(5), 1987, 199-204.

(Abstract) Vick Roy et al., "Biomass hydrolysis with sulfur dioxide and water in the region of the critical point", Process Technology Proceedings, 3 Supercrit. Flud Technol., 1985, 397-444.

(Abstract) Wu et al., "Determination of trace calcium in glucose by Zeeman flame atomic absorption spectrometry", Guangdong Weiliang Yuansu Kexue, 14(3), 2007, 58-60.

Yang et al., "(Abstract) Steaming extraction of corncob xylan for production of xylooligosaccharide", Wuxi Qinggong Daxue Xuebao, 17(4), 1998, 50-53.

(Abstract) Yee et al., "Improvement of xylose production by acid hydrolysis of bagasse pith with low liquor ratio", Taiwan Tangye Yanjiuso Yanjiu Huibao, 98, 1982, 59-70.

(Abstract) Yu et al., "Characteristics and Precipitation of Glucose Oligomers in the Fresh Liquid Products Obtained from the Hydrolysis of Cellulose in", Hot-Compressed Water, Industrial & Engineering Chemistry Research, 48(23), 2009, 10682-10690.

Zhang et al., "Cellulose utilization by *Clostridium thermocellum*: Bioenergetics and hydrolysis product assimilation", PNAS, May 17, 2005, 7321-7325.

(Abstract) Zhao et al., "Fermentable hexose production from corn stalks and wheat straw with combined supercritical and subcritical huydrothermal technology", Bioresource Technology, 100(23), 2009, 5884-5889.

(Abstract) Zhao et al., "Supercritical pretreatment and hydrolysis of cellulose", Huaxue Xuebao, 66(20), 2008, 2295-2301.

Zhao et al., "Combined supercritical and subcritical process for cellulose hydrolysis to fermentable hexoses", Environmental Science & Technology, 43(5), 2009, 1565-1570.

(Abstract) Zhuang et al., "Research on biomass hydrolysis under extremely low acids by HPLC", Taiyangneng Xuebao, 28(11), 2007, 1239-1243.

U.S. Appl. No. 12/504,613, Final Office Action, mailed Jan. 18, 2013 (25 pages).

Chinese Patent Application No. 200980131809.5, Office Action, mailed Dec. 25, 2012 (24 pages).

Ehara, "Chemical conversion of woody biomass by supercritical water-Degradation of Lignin-", 12th European Conference on Biomass for Energy, Industry and Climate Protection, Amsterdam (2002) (2 pages).

"Supercritical Fluids", Kirk-Othmer Encyclopedia of Chemical Technology, John Wiley & Sons, New York, Fifth Edition, vol. 22 (2006) (29 pages).

* cited by examiner

NANO-CATALYTIC-SOLVO-THERMAL TECHNOLOGY PLATFORM BIO-REFINERIES

CROSS-REFERENCE TO RELATED APPLICATIONS

This application claims priority to U.S. Provisional Patent Application No. 61/081,337 filed Jul. 16, 2008, U.S. Provisional Patent Application No. 61/081,341 filed Jul. 16, 2008, U.S. Provisional Patent Application No. 61/081,346 filed Jul. 16, 2008, U.S. Provisional Patent Application No. 61/081,348 filed Jul. 16, 2008, U.S. Provisional Patent Application No. 61/092,680 filed Aug. 28, 2008, and U.S. Provisional Patent Application No. 61/224,809 filed Jul. 10, 2009, the disclosures of each of which are incorporated herein by reference in their entireties. This application is related to and incorporates by reference the following PCT application filed on even date herewith: "NANO-CATALYTIC-SOLVO-THERMAL TECHNOLOGY PLATFORM BIO-REFINERIES", inventors Srinivas Kilambi and Kiran L. Kadam.

STATEMENT OF RIGHTS TO INVENTIONS MADE UNDER FEDERALLY SPONSORED RESEARCH

Not applicable.

BACKGROUND OF THE INVENTION

Biomass is an increasingly important raw material for fuel and industrial chemical production. Cellulose present in most biomass sources can be especially difficult to render accessible to reaction. In addition, many processes directed to converting biomass to fuel or industrial chemicals are limited in production capacity because the rate at which biomass is processed is low. Further, many processes for biomass conversion are directed to making a single product such as ethanol or butanol.

Some methods for processing biomass utilize a supercritical fluid. Supercritical fluids have been used in a number of ways.

Supercritical solvents such as supercritical water (SCW) and supercritical carbon dioxide ($SCCO_2$) have been used in extracting various substances and assisting chemical reactions. For example, U.S. Pat. No. 5,516,952 presents a process for breaking down natural, synthetic, vulcanized, and non-vulcanized rubbers. Typical products were said to include alkanes, alkenes, dienes, aromatics, alcohols, carboxylic acids, aldehydes, and ketones, all preferably having from about 3 to about 8 carbon atoms, as well as carbon dioxide, water, and halide acids. U.S. Pat. No. 5,830,763 describes a process for the preparation of organic and inorganic deuterium-tagged compounds by heating with deuterium oxide under supercritical conditions. U.S. Pat. No. 6,180,845 describes a process for the fractionation of waste biomass into a hydrocarbon mixture. U.S. Pat. Nos. 4,543,190 and 4,338,199 describe processes for the oxidation of organic compounds in supercritical water.

D. Boocock et al., "Liquefaction of biomass by rapid hydrolysis" *Can. J. Chem. Eng.*, 61:80 (1983) discloses the use of supercritical water to liquefy the biomass.

Peter et al., "High pressure extraction of lignin from biomass" *Supercritical fluid technology*, p. 385 (1985) discloses the use of supercritical fluids to get the lignin from biomass but not cellulose and xylose.

Houghton et al., "Reactivity of some organic compounds with supercritical water" *Fuel*, 61:827 (1986) discloses the use of supercritical fluids to decompose the organic compounds.

Modell et al., "Supercritical water oxidation of pulp mill sludges" *TAPPI J.*, 75:195 (1992) discusses the use of supercritical water for the oxidation of pulp mill sludges.

B. Potic et al., "Gasification of Biomass model compound and real biomass in Supercritical Water," *Biomass and Bioenergy*, 26:71-78 (2004); F. C. Knopf et al., "Reactive Extraction of Lignin from biomass using supercritical ammonia-water mixtures" *J. Supercritical Fluids*, 6:249-254 (1993); B. J. McCoy et al., "Extraction of Lignin from biomass with supercritical alcohol" *J. Supercritical Fluids*, 2:80-84 (1989); and B. Bennett et al., "Chemicals from forest products by supercritical fluid extraction" *Fluid Phase Equil.*, 10:337 (1983) also provide further background information on use of supercritical fluids.

Methods for efficiently converting biomass from renewable resources or waste materials to more valuable products are desirable.

BRIEF SUMMARY OF THE INVENTION

Disclosed are various methods, apparatus configurations, and compositions involved in converting biomass to more valuable products. One method involves fractionating biomass into cellulose, xylose, and optionally lignin, and subsequently processing at least one of the cellulose and xylose. The cellulose may be further processed to form glucose and fructose, for instance. Xylose may be further processed to form furfural. At least one of the steps involved in processing the biomass, cellulose, and/or xylose utilizes a supercritical fluid. In some instances, at least two of the steps involved utilize one or more supercritical fluids, and in other instances, all of the steps involved in the method utilize one or more supercritical fluids.

In one instance, a method involves utilizing a first supercritical fluid to process biomass separate cellulose and xylose, or to separate cellulose, lignin, and xylose. An optional second supercritical fluid acts on either the cellulose or the xylose, and an optional third supercritical fluid acts on the other of the cellulose and xylose. In this way, one manufacturing facility can be used to convert biomass into furfural, glucose, and optionally fructose.

In one instance, a method involves processing a water-containing biomass with supercritical alcohol and supercritical carbon dioxide to fractionate the biomass and obtain carbonaceous and other products that may be sold or further processed. In another instance, a method involves processing a biomass with supercritical alcohol, supercritical carbon dioxide, and additional sub-critical or near-critical water to fractionate and obtain products as described above. In yet another instance, a method includes two stages: the first stage involves processing a biomass with supercritical carbon dioxide and sub-critical water to hydrolyze hemicellulose thus separating the hemicellulose from the remaining solids; the second stage involves further processing the remaining solids from the first stage using an alcohol under supercritical or sub-critical conditions to extract lignin thus separating the lignin from the cellulose solids. In each instance, conditions are maintained so that the temperature and pressure are below the critical point for water. Products of fractionation may include one or more of cellulose, lignin, and xylose.

In another instance, provided is a two stage process for fractionating a biomass comprising: (a) forming a first reactant mixture comprising a biomass, water and $CO_2$ at a first temperature and a first pressure; (b) maintaining the first reactant mixture at the first temperature and the first pressure for a first time period, wherein the $CO_2$ is supercritical and the water is sub-critical, and wherein a first reaction occurs; (c) recovering a solid from the first reaction mixture; (d) contacting the solid with a second fluid comprising a $C_1$-$C_5$ alcohol to form a second reactant mixture at a second temperature and a second pressure; (e) maintaining the second reactant mixture at the second temperature and the second pressure for a second time period, wherein a second reaction occurs; and (f) quenching the second reaction to form at least one reaction product mixture.

Also disclosed is a method of making amorphous cellulose in which, subsequent to a method for fractionating a biomass as discussed above, the reaction product mixture is expanded sufficiently rapidly to destroy crystalline structure of the cellulose, resulting in amorphous cellulose.

Products obtained from the process may therefore include, for example, a solution of lignin and optionally xylose in an aqueous alcoholic phase in conjunction with cellulose in a carbonic acid phase; a slurry of biomass, supercritical, and sub-critical fluids as described in the paragraph above; a slurry of biomass, supercritical, and sub-critical fluids as described above as well as one or more products of interest such as a glucan (particularly cellulose), xylose, xylose oligosaccharides (XOS), hemicellulose, and/or lignin; and a solution of e.g. xylose in an aqueous alcohol and/or carbonic acid phase. Amorphous cellulose is also provided.

The cellulose produced by supercritical fractionation of biomass, amorphous and/or crystalline, may be used alone or together with additional cellulose to produce glucose and/or fructose. In one instance, a method involves contacting cellulose with carbon dioxide and water at a temperature and pressure above the critical point for carbon dioxide and below the critical point for water, e.g. sub-critical or near-critical water. In another instance, a method involves contacting cellulose with carbon dioxide and water at a temperature and pressure at, above or near the critical point water, e.g. supercritical or near-critical water. The method may involve contacting the cellulose for a sufficient period of time to obtain glucose and optionally fructose.

In another instance, a method involves contacting cellulose first with supercritical water and subsequently contacting the resultant slurry with carbon dioxide and water at a temperature and pressure above the critical point for carbon dioxide and below the critical point for water. The method may involve contacting the cellulose for a sufficient period of time to obtain glucose and optionally fructose.

Also provided is a process for hydrolyzing cellulose, comprising: (a) supplying a slurry comprising cellulose, water and $CO_2$ at a first temperature; (b) heating the slurry at a second temperature and a pressure for a first time period, wherein the $CO_2$ is supercritical $CO_2$ and the water is near-critical or supercritical water, and wherein a hydrolysis reaction occurs; (c) quenching the reaction; and (d) recovering at least one hydrolysis product. In some embodiments, the first temperature is about 220 to about 280° C. In some embodiments, the second temperature is about 371 to about 377° C. In some embodiments, the pressure is about 225 bar. In some embodiments, the first time period is about 0.12 to about 0.3 seconds. In some embodiments, the cellulose solids remaining after the first pass is recovered and subject to another round of hydrolysis using any method for cellulose hydrolysis described herein. In some embodiments, the cellulose solids remaining after the first pass is not recovered and the mixture is treated with supercritical $CO_2$ and sub-critical water to achieve further hydrolysis and better yield of glucose.

A composition may comprise cellulose and/or glucose in a mixture of carbon dioxide and water at a temperature and pressure above the critical point for carbon dioxide and below the critical point for water. A composition may comprise cellulose and/or glucose in a mixture of carbon dioxide and water at a temperature and pressure at, above or near the critical point water. A composition may comprise carbon dioxide and glucose in water, wherein the temperature and pressure are below the critical point for carbon dioxide and water.

Xylose made by a supercritical method of fractionating biomass may be contacted with a supercritical fluid to dehydrate the xylose and form furfural.

A method of dehydrating xylose to form furfural includes contacting xylose with sub-critical water or a processing fluid comprising water and carbon dioxide in which the temperature and pressure of the processing fluid are above the critical point for carbon dioxide but at least one of the temperature and pressure is below the critical point for water. A process for producing furfural from xylose may include: (a) mixing xylose with sub-critical or near-critical water to form a mixture at a first temperature and a first pressure; (b) maintaining the mixture at the first temperature and the first pressure for a first time period; and (c) rapidly cooling the mixture to a second temperature and a second pressure, wherein furfural is produced by the process. In another instance, a process for producing furfural from xylose includes: (a) mixing xylose, $CO_2$, and sub-critical or near-critical water to form a mixture at a first temperature and a first pressure, wherein at the first temperature and the first pressure the mixture is present as a two-phase system comprising an aqueous phase and a $CO_2$-rich phase; (b) maintaining the mixture at the first temperature and the first pressure for a first time period; (c) rapidly cooling the mixture to a second temperature and a second pressure; (d) separating the $CO_2$-rich phase from the aqueous phase; and (e) cooling the $CO_2$-rich phase to a third temperature and a third pressure, wherein furfural is produced by the process.

Also provided are various compositions such as xylose in sub-critical water and xylose in a fluid containing water and carbon dioxide in which the fluid has a temperature and pressure above a critical point of carbon dioxide but at least one of the temperature and pressure of the fluid is beneath the critical temperature and pressure for water.

Further provided are systems for converting biomass to more valuable products such as glucose and furfural comprising a module configured for fractionating biomass to form cellulose and xylose, and optionally lignin; optionally a module configured for hydrolyzing cellulose to form glucose, and optionally fructose; and optionally a module configured for dehydrating xylose or hydrolyzing xylose/XOS to form furfural. In some embodiments, the module configured for fractionating biomass comprises a reactor configured for contacting a biomass with a reactive fluid at a temperature and pressure above the critical point of carbon dioxide but at least one of the temperature and pressure of the fluid is beneath the critical temperature and pressure for water. In some embodiments, the module configured for fractionating biomass comprises a reactor configured for contacting a biomass with a reactive fluid at a temperature and pressure at, above or near the critical point water. In some embodiments, the module configured for hydrolyzing cellulose comprises a reactor configured for contacting cellulose with a reactive fluid at a temperature and pressure above the critical point of carbon dioxide but at least one of the temperature and pressure of the fluid is beneath the critical temperature and pressure for water. In some embodiments, the module configured for hydrolyzing cellulose comprises a reactor configured for contacting cellulose with a reactive fluid at a temperature and pressure at, above or near the critical point water. In some embodiments, the module configured for dehydrating xylose or hydrolyzing xylose/XOS comprises a reactor configured for contacting cellulose with a reactive fluid at a temperature and pressure above the critical point of carbon dioxide but at least one of the temperature and pressure of the fluid is beneath the critical temperature and pressure for water. In some embodiments, one or more of the modules described in this paragraph further comprises a heating device for heating the reactive fluid to the desired temperature and a back-pressure regulator located downstream of the reactor for maintaining the desired pressure.

The modules in the system may be configured to operate in tandem and/or in parallel with one another to facilitate a continuous process for fractionating biomass to form valuable products such as glucose and furfural as described herein. The modules in the system may also operate independently from each other as stand alone modules, each carrying out the processes for performing the desired functions as described herein, for examples, a module for fractionating biomass to form cellulose and xylose carries out a reaction for fractionating biomass to form cellulose and xylose using a method describe herein for fractionating biomass to form cellulose and xylose, a module for hydrolyzing cellulose to form glucose carries out a reaction for hydrolyzing cellulose to form glucose using a method for hydrolyzing cellulose to form glucose as described herein, and independently a module for dehydrating xylose to form furfural carries out a reaction for dehydrating xylose to form furfural using a method for dehydrating xylose to form furfural as described herein.

Also provided is a system for fractionating biomass comprising: a reactor configured for contacting a biomass with a reactive fluid at a temperature and pressure above the critical point of carbon dioxide but at least one of the temperature and pressure of the fluid is beneath the critical temperature and pressure for water; a heating device configured for heating the reactive fluid to the desired temperature; a back-pressure regulator located downstream of the reactor for maintaining the desired pressure; and a heat exchanger configured for cooling the reaction and located downstream of the reactor. In some embodiments, the system may further comprise a filtration device configured for separating at least a portion of the fractionated product in solid state from the fractioned and cooled reaction mixture.

Also provided is a system for hydrolyzing cellulose to form glucose, and optionally fructose, comprising: a reactor configured for contacting cellulose with a reactive fluid at a temperature and pressure above the critical point of carbon dioxide but at least one of the temperature and pressure of the fluid is beneath the critical temperature and pressure for water; a heating device configured for heating the reactive fluid to the desired temperature; a back-pressure regulator located downstream of the reactor for maintaining the desired pressure; and a heat exchanger configured for cooling the reaction and located downstream of the reactor. In some embodiments, the system may further comprise a filtration device configured for separating at least a portion of the fractionated product in solid state from the fractioned and cooled reaction mixture.

Also disclosed is a system for dehydrating xylose or hydrolyzing xylose/XOS to form furfural, comprising: a reactor configured for contacting xylose/XOS with a reactive fluid at a temperature and pressure above the critical point of carbon dioxide but at least one of the temperature and pressure of the fluid is beneath the critical temperature and pressure for water; a heating device configured for heating the reactive fluid to the desired temperature; a back-pressure regulator located downstream of the reactor for maintaining the desired pressure; and a heat exchanger configured for cooling the reaction and located downstream of the reactor. In some embodiments, the system further comprises a condenser device configured for condensing at least a portion of the volatile product in the reaction mixture.

Also provided is a composition as described herein, including reaction intermediates as described, or a product produced by any of the processes as described herein or a portion of the processes described. Also provided is a system for producing any of the compositions described herein, or for performing any of the methods or a portion of a method as described herein.

DETAILED DESCRIPTION OF THE INVENTION

Figure 1:
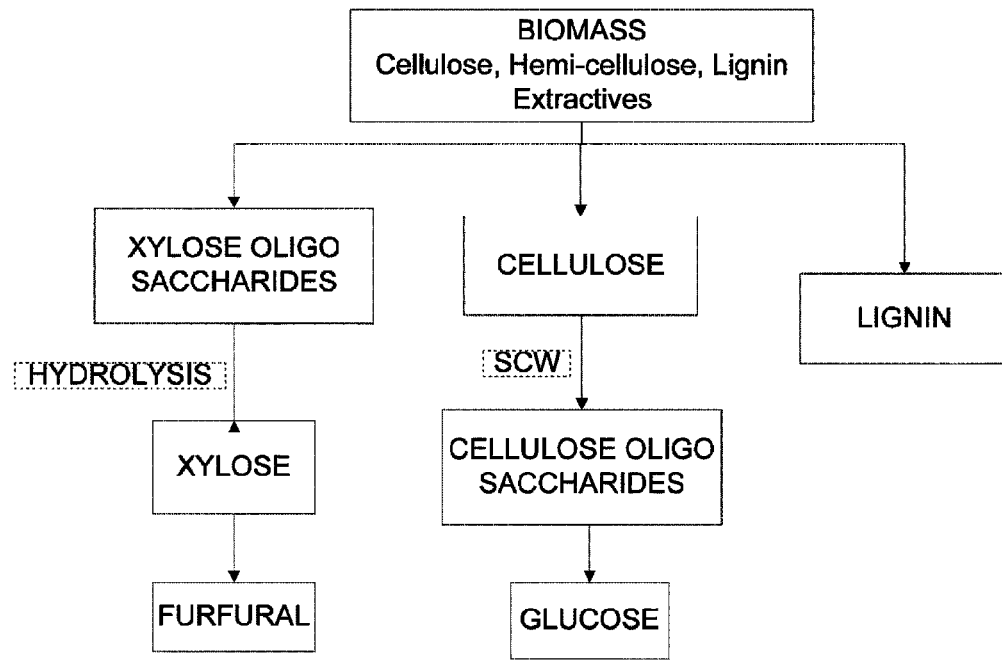
FIG. 1 is a schematic for one embodiment of an NCST platform bio-refinery.

A manufacturing facility may process a biomass to produce at least one of xylose and cellulose, and optionally lignin, wherein at least one and often each of the products is formed using a separate supercritical fluid. Biomass may be processed using a first supercritical fluid to form at least one of cellulose and xylose, and optionally lignin. A lignin-containing biomass, e.g. a lignocellulosic biomass, may be processed using a first supercritical fluid to form lignin and at least one of cellulose and xylose. One of cellulose and xylose may be processed using a second supercritical fluid, and the other of cellulose and xylose may be processed using a third supercritical fluid. The first, second and third supercritical fluid may be the same or different, as described in more details herein. Each of these is discussed in more detail below.

Biomass may be fractionated using a supercritical fluid in a number of ways. One way involves new methods as disclosed below.

The invention in one instance provides a process for fractionating a biomass, using water and a supercritical $C_1$-$C_5$ alcohol. The processes described herein provide new methods for producing cellulose, xylose, xylose oligosaccharides (XOS) and/or lignin from biomass.

A supercritical fluid is a fluid at a temperature above its critical temperature and at a pressure above its critical pressure. A supercritical fluid exists at or above its "critical point", the point of highest temperature and pressure at which the liquid and vapor (gas) phases can exist in equilibrium with one another. Above critical pressure and critical temperature, the distinction between liquid and gas phases disappears. A supercritical fluid possesses approximately the penetration properties of a gas simultaneously with the solvent properties of a liquid. Accordingly, supercritical fluid extraction has the benefit of high penetrability and good solvation.

Reported critical temperatures and pressures include: for pure water, the critical temperature is about 374.2° C., and the critical pressure is about 221 bar. Carbon dioxide has a critical point of about 31° C. and about 72.9 atmospheres (about 1072 psig). Ethanol has a critical point of about 243° C. and about 63 atmospheres. Methanol has a critical point of about 923.0° R (512.8° K.) and about 1174.0 psia (80.9 bar). The critical point for other alcohols can be ascertained from the literature or experimentally.

Near-critical water has a temperature at or above about 300° C. and below the critical temperature of water or about 374.2° C., and near-critical water has a pressure of at least about 225 bar. Sub-critical water has a temperature of less than about 300° C. and a pressure of at least about 225 bar. Sub-critical water temperature may be greater than about 250° C. and less than about 300° C., and in many instances sub-critical water has a temperature between about 250° C. and about 280° C.

As used herein, a fluid which is "supercritical" (e.g. supercritical water, supercritical ethanol, supercritical $CO_2$, etc.) indicates a fluid which would be supercritical if present in pure form under a given set of temperature and pressure conditions. For example, "supercritical water" indicates water present at a temperature of at least about 374.2° C. and a pressure of at least about 221 bar, whether the water is pure water, or present as a mixture (e.g. water and ethanol, water and $CO_2$, etc). Thus, for example, "a mixture of sub-critical water and supercritical carbon dioxide" indicates a mixture of water and carbon dioxide at a temperature and pressure above that of the critical point for carbon dioxide but below the critical point for water, regardless of whether the supercritical phase contains water and regardless of whether the water phase contains any carbon dioxide. For example, a mixture of sub-critical water and supercritical $CO_2$ may have a temperature of about 250° C. to about 280° C. and a pressure of at least about 225 bar.

The term "reactive fluid" used herein means a fluid that is at a temperature higher than the boiling point of the liquid state of the fluid under atmospheric pressure (1 atm). The reactive fluid may be a liquid, a gas, a supercritical fluid, or a mixture of these. For example, water at a temperature above 100° C. and under atmospheric pressure is considered a reactive fluid. Supercritical, near critical, and sub-critical fluids are reactive fluids, illustrative examples including but not limited to sub-critical water, near critical water, supercritical water, supercritical ethanol, and supercritical $CO_2$.

As used herein, "$C_1$-$C_5$ alcohol" indicates an alcohol comprising 1 to 5 carbon atoms. Examples of $C_1$-$C_5$ alcohols include, but are not limited to, methanol, ethanol, n-propanol, isopropanol, n-butanol, s-butanol, t-butanol, i-butanol, n-pentanol, 2-pentanol, 3-pentanol, 2-methyl-1-butanol, 2-methyl-2-butanol, 3-methyl-1-butanol, 3-methyl-2-butanol, and 2,2-dimethyl-1-propanol. Mixtures of one or more of these alcohols may be used.

Fractionation of Biomass

We have developed a new approach to hydrothermal processing (HTP) called Solvothermal Processing (STP) that uses one or more supercritical $C_1$-$C_5$ alcohols in combination with hot compressed water, and optionally including $CO_2$, for biomass fractionation to produce value-added chemical products. Biomass comprises glucan, hemicellulose, and may additionally comprise lignin. Briefly, biomass is reacted under hydrothermal conditions (using water and supercritical $C_1$-$C_5$ alcohol, and optionally $CO_2$), producing cellulose, xylose and/or xylose oligosaccharides (xylose/XOS) (from hemicellulose), and additionally, when the biomass is a lignocellulosic biomass, lignin. The cellulose is insoluble in the aqueous alcoholic phase, and the xylose and lignin are soluble in the aqueous alcoholic phase. The alcohol (e.g. ethanol) may enhance the recovery of water-insoluble, lignin-derived compounds. Marchessault and St-Pierre observed that hydrothermally treated lignin coalesces into small spheres of less than 5-10 μm diameter that are readily soluble in aqueous organic solvents, such as ethanol-water (Marchessault, R. H., St-Pierre, J. M. "A New Understanding of the Carbohydrate System" In I, Chemrawn, L. E. St-Pierre, and G. R. Brown (Eds.), Future Sources of Organic Raw Materials: 613-625. Pergamon Press, Oxford. 1980). The instant invention avoids lignin precipitation via the addition of alcohol to the water phase, which allows both cleanly fractionated cellulose and high quality lignin to be separately recovered. After evaporation of alcohol from the solvent mixture, the lignin precipitates out of solution, and the xylose (which is water soluble) remains in solution (see e.g. FIG. 2B). These products may be separated and used to form other value-added products, as further described below.

Without wishing to be bound by theory, the addition of carbon dioxide to the reactant mixture promotes the formation of carbonic acid, which enhances the hydrolysis of hemicellulose at relatively low reaction severity, forming xylose and other C5 and C6 sugars. Addition of $CO_2$ allows for the ability to adjust reaction acidity without the addition of strong acids or bases which are more prone to form degradation products via side reactions, and which can lead to disposal problems (such as with gypsum that is formed during neutralization of acidic hydrolyzates). Also, $CO_2$ can be recovered and recycled. Initial studies by Miyazawa and Funazukuri showed that the addition of $CO_2$ significantly enhanced polysaccharide hydrolysis rates (in some cases by 10-fold), increased yields of monomeric sugars, and suppressed the formation of hydroxymethylfuran (HMF) byproducts relative to that observed with comparable mineral acid catalyzed processes (Miyazawa, T. and Funazukuri, T. "Polysaccharide hydrolysis accelerated by adding carbon dioxide under hydrothermal conditions" Biotechnol. Prog. 2005, 21:1782-1785). In some embodiments, addition of $CO_2$ to the hot water-supercritical ethanol process increases the concentration of xylose extracted by the process, and may additionally reduce the amount of organic acids produced.

Therefore, in one instance, fractionation occurs at a temperature and pressure that is above the critical point for both carbon dioxide and the alcohol used in fractionation but at a temperature and/or pressure below the critical point for water. Fractionation does not require the presence of three separate phases. In one theory, the conditions produce an aqueous phase and a supercritical phase. One or more products of interest preferentially dissolve in the aqueous phase, and one or more products of interest dissolve preferentially in the supercritical phase. The aqueous phase may be pure water, aqueous alcohol, carbonic acid, or a mixture of aqueous alcohol (such as methanol and/or ethanol) and carbonic acid. The supercritical phase may contain carbon dioxide and alcohol (such as methanol and/or ethanol), or the supercritical phase may contain carbon dioxide, water, and alcohol. Without wishing to be bound by theory, it is believed that in various instances the aqueous phase dissolves certain water-soluble materials of interest (such as xylose) and helps protect them from further reaction as is promoted by the more chemically aggressive supercritical phase.

Any suitable biomass may be used in the invention, such as a lignocellulosic biomass (e.g. wood, corn stover, wheat straw, bagasse, solid municipal organic waste, corn cobs, or citrus peels and pulp waste and the like), corn, cotton fiber, and the like. The biomass may be treated (e.g. mechanically ground using, for instance, using such size-reduction equipment as a hammer-mill, high-shear mixer such as a plate mill, serrated blade in a slurry tank, and/or an in-line colloidal mixer) in order to obtain biomass particles of the desirable size for a particular set of reaction conditions. For example, the biomass may be treated to obtain a biomass having a particle size of, e.g., no more than about 1 inch hydraulic diameter. In various embodiments, the biomass has a particle size of less than about 20 mm, about 5 mm to about 20 mm, about 7 mm to about 20 mm, about 10 mm hydraulic diameter. During the mechanical treatment, the moisture content of the wet feed may be reduced. The biomass post-mechanical treatment may in various embodiments contain up to about 5 wt %, about 5 wt % to about 12 wt % of water. Alternatively, the biomass may be fed to the reaction process as it is received from its collection points.

Prior to reacting with a reactive fluid such as a water/supercritical $C_1$-$C_5$ alcohol mixture, the biomass may optionally be mixed with a fluid to produce a slurry. The slurry may be comprised of, for example, water and/or one or more $C_1$-$C_5$ alcohols such as ethanol. In some embodiments, the slurry may be comprised of the biomass, water, and the $C_1$-$C_5$ alcohol. In some embodiments, the slurry may be comprised of the biomass, water, and ethanol. In some embodiments, the biomass comprises about 1 to about 35 wt % of the slurry. In some embodiments, the biomass comprises about 1 to about 10 wt % of the slurry. In some embodiments, the biomass comprises about 1 to about 5 wt % of the slurry. In some embodiments, the biomass comprises at least 5 wt % of the slurry. In some embodiments, the biomass comprises about 1 to about 50 wt %, about 5 to about 50 wt %, about 5 to about 40 wt %, about 10 to about 35 wt %, about 15 to about 35 wt % of the slurry.

Single Stage Fractionation of Biomass

In one aspect, a biomass is fractionated to cellulose and xylose, and optionally lignin, in a single stage using a reactive fluid comprising water and a $C_1$-$C_5$ alcohol, and optionally $CO_2$. In one instance, the biomass is reacted with a fluid comprising water and a supercritical $C_1$-$C_5$ alcohol. In some embodiments, the $C_1$-$C_5$ alcohol is selected from ethanol, methanol, butanol, or a combination of one of more of ethanol, methanol, and butanol. In some embodiments, the C1-$C_5$ alcohol is ethanol. In some embodiments, the $C_1$-$C_5$ alcohol is methanol. In some embodiments, the $C_1$-$C_5$ alcohol is butanol. The $C_1$-$C_5$ alcohol may be, for example, about 1 wt % to about 99 wt % of the reactive fluid. In some embodiments, the $C_1$-$C_5$ alcohol is about 5 wt % to about 95 wt %, about 10 wt % to about 90 wt %, about 20 wt % to about 80 wt %, about 30 wt % to about 70 wt % or about 40 wt % to about 60 wt % of the reactive fluid. In some embodiments, the $C_1$-$C_5$ alcohol is at least about 10 wt %, at least about 20 wt %, at least about 30 wt %, at least about 40 wt %, at least about 50 wt %, at least about 60 wt %, at least about 70 wt %, at least about 80 wt %, at least about 90 wt % of the reactive fluid. In some embodiments, the $C_1$-$C_5$ alcohol is about 40 wt % to about 55 wt % of the reactive fluid. In some embodiments, the $C_1$-$C_5$ alcohol is about 30 wt % to about 55 wt % of the reactive fluid. In some embodiments, the water is about 1 wt % to about 99 wt % of the reactive fluid. In some embodiments, the water is 5 wt % to about 95 wt %, about 10 wt % to about 90 wt %, about 20 wt % to about 80 wt %, about 30 wt % to about 70 wt % or about 40 wt % to about 60 wt % of the reactive fluid. In some embodiments, the water is at least about 10 wt %, at least about 20 wt %, at least about 30 wt %, at least about 40 wt %, at least about 50 wt %, at least about 60 wt %, at least about 70 wt %, at least about 80 wt %, at least about 90 wt % of the reactive fluid. In some embodiments, the reactive fluid is essentially free of the $C_1$-$C_5$ alcohol. In some embodiments, the reactive fluid is essentially free of the water.

The reactive fluid comprising water and a $C_1$-$C_5$ alcohol may further comprise $CO_2$. In some embodiments, the reactive fluid does not comprise $CO_2$. In some embodiments, the reactive fluid comprises $CO_2$. When present, the $CO_2$ may be, for example, about 5 wt % to about 40 wt % of the reactive fluid. In some embodiments, the $CO_2$ is about 5 wt % to about 20 wt % of the reactive fluid. In some embodiments, the $CO_2$ is about 5 wt % of the reactive fluid. In some embodiments, the aqueous alcoholic solution is saturated with $CO_2$. Generally, the aqueous alcoholic solution becomes saturated with $CO_2$ at about 5 wt % $CO_2$. In some embodiments, the reactant mixture does not comprise a mineral acid.

In some instances, sufficient water is present in the water/alcohol/carbon dioxide mixture to aid hydrolyzing hemi-cellulose and/or dissolve a water-soluble product of interest such as xylose. Because raw biomass processing often removes water from the biomass, it is often helpful to add water to size-reduced biomass prior to processing the biomass in a supercritical reactor. Alcohol can be added as well to form slurry of size-reduced raw biomass in aqueous alcohol. Alternatively, alcohol or aqueous alcohol can be introduced into the reactor as a separate stream from the biomass, which enters dry, in water, in alcohol, in aqueous alcohol, or entrained in carbon dioxide.

Water can serve any of a number of roles in the reaction. Water can dissolve in carbon dioxide to form carbonic acid that acts on biomass to extract, fractionate, and react with biomass such as hemi-cellulose. Water can be present as liquid to dissolve compounds such as xylitol. Water can also aid the alcohol in dissolving lignin and e.g. xylitol.

The biomass and reactive fluid are generally reacted at a temperature of about 243° C. to about 300° C. In some embodiments, the reaction temperature is about 250° C. to about 300° C. In some embodiments, the reaction temperature is about 243° C. to about 270° C. In some embodiments, the reaction temperature is about 280° C. to about 300° C. The biomass and reactive fluid are generally reacted at a pressure of at least about 63.8 bar (63 atm). In some embodiments, the reaction pressure is about 63.8 bar to about 220 bar. In some embodiments, the reaction pressure is about 70 bar to about 130 bar. In some embodiments, the reaction pressure is about 80 bar. In some embodiments, the reaction temperature is about 243° C. to about 300° C., and the reaction pressure is about 63.8 bar to about 220 bar. In some embodiments, the reaction temperature is about 250° C. to about 300° C. and the reaction pressure is about 70 bar to about 130 bar. In some embodiments, the reaction temperature is about 280° C. to about 300° C., and the reaction pressure is about 80 bar. In some embodiments, the water is sub-critical water. In some embodiments, the water is near-critical water. In some embodiments, the $CO_2$ is supercritical $CO_2$. In some embodiments, the $C_1$-$C_5$ alcohol is supercritical and the water is sub-critical. In some embodiments, the $C_1$-$C_5$ alcohol and the $CO_2$ are supercritical, and the water is sub-critical.

The reaction conditions (e.g. reaction temperature and pressure) may be maintained for the length of time needed to produce the desired reaction products. In some embodiments, the biomass is treated for about 0.1 min to about 60 min. In some embodiments, the biomass is treated for about 10 sec to about 60 min. In some embodiments, the biomass is treated for about 0.1 min to about 30 min. In some embodiments, the biomass is treated for about 0.17 min to about 15 min. In some embodiments, the biomass is treated for about 10 sec to about 3 min. In some embodiments, the biomass is treated for about 10 sec to about 1 min. The reaction conditions are selected based on the products to be produced from the biomass, and in many instances, reaction times are on the order of seconds.

Two-Stage Fractionation of Biomass

In another aspect, a biomass is fractionated to cellulose, xylose, optionally lignin and other products, in a two-stage process. The process accomplishes hemicellulose hydrolysis in the first stage with water and $CO_2$; and fractionates, e.g. cleanly fractionates, cellulose and lignin, e.g. high-quality lignin, in the second stage with a $C_1$-$C_5$ alcohol, e.g. ethanol or butanol.

In the first stage, addition of carbon dioxide to the compressed water promotes the formation of carbonic acid, which enhances hydrolysis of hemicellulose at relatively low reaction severity. The advantage with $CO_2$ is the ability to adjust reaction acidity without addition of strong acids or bases. Also, $CO_2$ can be recovered and recycled. The addition of $CO_2$ can significantly enhance polysaccharide hydrolysis rates and hence, increase yields of monomeric sugars, and suppress the formation of HMF byproducts relative to that observed with comparable mineral acid-catalyzed processes.

In the second stage, addition of a $C_1$-$C_5$ alcohol (e.g. ethanol or butanol) dissolves lignin leaving cellulose in solid phase. Cellulose and lignin are separated by filtering the second stage slurry. Solids from filtration contain mostly cellulose. After evaporation of ethanol/butanol from the filtrate, lignin is precipitated.

During the physicochemical treatment stage of the biomass, the molecular structures of the complex polymers that comprise the biomass particles are altered. The hemicellulose fraction of biomass is hydrolyzed to C5 and C6 sugar molecules (primarily xylose, glucose, and arabinose), and the lignin fraction is separated from the lignocellulose complex and becomes dissolved in the aqueous alcoholic solvent. This process does not generally chemically alter the lignin, other than to produce smaller fragments. The resulting lignin is of a lower molecular weight than the native one in biomass, but no chemical alteration of the lignin at the monomeric level has happened. In some embodiments, about 60 wt % to about 70 wt % of the original biomass is recovered as xylose and lignin.

The reaction at the single stage fractionation of biomass or at each stage of the two stage fractionation process may be quenched by addition of cooled solvent, for example, cooled water/$C_1$-$C_5$ alcohol. In some embodiments, the reaction is quenched by addition of water/ethanol at about 130° C. In some embodiments, the reaction is quenched by cooling to about 70° C. to about 80° C. and a pressure of about 5-10 bar. The reaction may also be quenched by rapid expansion of at least part of the reactant mixture to a lower pressure, such as atmospheric pressure, as may occur through a throttling valve. This may be accomplished within or outside the reactor. In some embodiments, the entire reactant mixture is rapidly expanded to atmospheric pressure. In some embodiments, for example in a semi-batch reaction, the biomass may be placed in a packed bed, the reactive fluid such as the water/supercritical $C_1$-$C_5$ alcohol, the water/supercritical $CO_2$ or the $C_1$-$C_5$ alcohol is passed through the packed bed to react the biomass, and the extracted solution (comprising the xylose and lignin) is rapidly expanded to atmospheric pressure e.g. through a nozzle. Expansion of the reaction product mixture to atmospheric pressure may be sufficiently rapid to additionally destroy crystalline structure of the cellulose, resulting in amorphous cellulose. The reaction may also be quenched by cooling the reaction mixture in a heat exchanger. In some instances, the reaction is cooled without diluting the products in the reaction mixture.

After the reaction, the insoluble cellulose, which may generally comprise up to about 35-40 wt % of the initial biomass fraction, may be separated from the solvent and the soluble components by conventional methods such as e.g. filtration, centrifugation, etc. Using the single stage method, the lignin, which may generally comprise up to about 20 wt % of the dry biomass, remains dissolved in the water-alcohol solvent where carbon dioxide has been flashed from the mixture, and the lignin may be separated from the xylose and other sugars and un-reacted hemicellulose, which are also dissolved in the water-alcohol solvent, by conventional methods. For example, by evaporating the $C_1$-$C_5$ alcohol, the lignin will precipitate out of solution, while the xylose remains dissolved in the remaining water. The lignin may then be separated by e.g. filtration, centrifugation, etc. In another example, after filtration of the cellulose, the solvent is evaporated, resulting in a solid comprising lignin and xylose. Addition of water to this solid will dissolve only the xylose, which may be separated from the lignin by e.g. filtration. In some embodiments, up to about 80% of the lignin in the original biomass is recovered. Xylose may be separated from other sugars and hemicellulose by conventional methods known in the art.

In the two stage methods for biomass fractionation, the majority of the hemicellulose in the biomass may be hydrolyzed to form xylose and/or xylose oligosaccharides (referred to as "xylose/XOS" herein) in the first stage. Xylose/XOS is obtained in the liquid phase. The remaining solid from the first stage is processed further to separate lignin from cellulose. The lignin is dissolved in the alcohol and the cellulose remains as a solid.

In some instances, the mixture comprising the biomass and the reactive fluids is preheated before entering the reactor, e.g. in a furnace or a heat exchanger. In some instances, the reactive fluids are preheated before contacting the biomass in a reactor. The pressure required for the fractionation reaction can be applied by suitable means known in the art, such as a high pressure piston pump for delivering fluid to the reactor or a pressure exerted by an inert gas such as nitrogen. The pressure can be maintained by, for example, a back pressure regulator located downstream of the reactor.

The cellulose, lignin and xylose products obtained may be analyzed using known methods. For example, lignin can be analyzed using UV-Vis spectrometry or GC/MS; xylose can be analyzed using HPLC; cellulose can be analyzed using acid hydrolysis followed by HPLC.

The methods for biomass fractionation can be practiced in a batch process, a semi-batch process or a continuous process, and may utilize conventional chemical reactor technology. One non-limiting example of a continuous process is illustrated in FIG. 2B. The reaction schematic in FIG. 2B may also be modified for use in a batch or semi-batch process.

In some embodiments, the process for fractionating biomass is a semi-batch process for fractionating a biomass comprising: adding the biomass to a reactor bed; passing a fluid comprising water, $C_1$-$C_5$ alcohol, and optionally $CO_2$ through the biomass at a first temperature and a first pressure for a first time period, wherein the $C_1$-$C_5$ alcohol is supercritical at the first temperature and first pressure; quenching the reaction to form one or more reaction product mixtures comprising one or more fractionated products; and recovering one or more fractionated products. In some embodiments, the reaction is quenched by rapidly expanding the extracted fluid (i.e. the fluid which has passed through the packed bed) to atmospheric pressure. In some embodiments, while the fluid is not passing through the biomass packed bed, the bed is purged with a stream of nitrogen gas.

In some embodiments, the process for fractionating biomass is a batch process for fractionating a biomass comprising: loading the biomass, water, $C_1$-$C_5$ alcohol, and optionally $CO_2$ into a batch reactor to form a reactant mixture; heating the reactant mixture to a first temperature and a first pressure for a first time period, wherein the $C_1$-$C_5$ alcohol is supercritical at the first temperature and first pressure; quenching the reaction to form one or more reaction product mixtures comprising one or more fractionated products; and recovering one or more fractionated products.

In some embodiments, the process for fractionating biomass is a batch or continuous process for fractionating a biomass comprising: (a) feeding a slurry of the biomass in a first fluid comprising water and a $C_1$-$C_5$ alcohol, a second fluid comprising water and a $C_1$-$C_5$ alcohol, and optionally a third fluid to a reactor, wherein the biomass, first fluid, second fluid, and optional third fluid form a reactant mixture; (b) maintaining the reactant mixture in the reactor at a first temperature and first pressure for a first time period, wherein the $C_1$-$C_5$ alcohol is supercritical at the first temperature and first pressure, and wherein a reaction occurs; (c) quenching the reaction, wherein one or more reaction product mixtures comprising one or more fractionated products are produced; and (d) recovering one or more fractionated products from the one or more reaction product mixtures. The slurry may optionally be pre-heated prior to entering the reactor, for example, so that the reactant mixture is at or near the first temperature and/or first pressure prior to entering the reactor. For example, slurry may be mixed with pre-heated second fluid prior to entering the reactor. The reactor may also be pre-heated to the desired temperature and/or pressure prior to loading the reactor with the slurry. The $CO_2$ may be mixed with the slurry (e.g. before or after pre-heating of the slurry), mixed with the second fluid, and/or added separately to the reactor. The reaction may be quenched inside or outside of the reactor, for example, by expanding the reactant mixture or a portion thereof to a lower pressure (e.g. atmospheric pressure). Alternatively or additionally, the reaction may be quenched by adding a cooled fluid (e.g. cooled water/alcohol) to the reactant mixture. The fractionated products may be collected from the cooled effluent stream from the reactor at several stages. In one embodiment, the effluent mixture (the reaction product mixture) is passed through a high pressure filter. The solids that do not pass the filter may be collected and rinsed with e.g. a water/$C_1$-$C_5$ alcohol mixture (e.g. a water/ethanol mixture), yielding the cellulose product which is insoluble in the mixture. The filtrate that passes through the filter contains soluble products, e.g. lignin and xylose. The filtrate may be collected, e.g. in an effluent tank. When $CO_2$ is fed to the reactor, the bulk of it may be separated from the water/$C_1$-$C_5$ alcohol mixture in the effluent tank. The $C_1$-$C_5$ alcohol may then be evaporated from the mixture, causing lignin to precipitate from the solution. This may then be filtered, and lignin product collected. The xylose/XOS product may be collected from the remaining water solution.

Also provided by the invention is a process for fractionating a biomass comprising the steps of: (a) feeding a slurry of the biomass in a first fluid comprising water and a $C_1$-$C_5$ alcohol, a second fluid comprising water and a $C_1$-$C_5$ alcohol, and optionally a third fluid to a reactor, wherein the biomass, first fluid, second fluid, and optional third fluid form a reactant mixture; (b) maintaining the reactant mixture in the reactor at a first temperature and first pressure for a first time period, wherein the $C_1$-$C_5$ alcohol is supercritical at the first temperature and first pressure, and wherein a reaction occurs; (c) quenching the reaction, wherein one or more reaction product mixtures comprising one or more fractionated products are produced; and (d) recovering one or more fractionated products from the one or more reaction product mixtures.

In some embodiments, the process for fractionating a biomass is a single stage process comprising: (a) feeding a slurry comprising a biomass in a first fluid comprising water and a $C_1$-$C_5$ alcohol and optionally $CO_2$ to a reactor, wherein the biomass, first fluid, and optional $CO_2$ form a reactant mixture; (b) maintaining the reactant mixture in the reactor at a first temperature and first pressure for a first time period, wherein the $C_1$-$C_5$ alcohol is supercritical at the first temperature and first pressure, and wherein a reaction occurs; (c) quenching the reaction, wherein one or more reaction product mixtures comprising one or more fractionated products are produced; and (d) recovering one or more fractionated products from the one or more reaction product mixtures. In some embodiments, the slurry comprising the reactant mixture is heated before fed to the reactor. In some embodiments, the reaction is quenched by cooling the reaction mixture, for example, by passing through a heat exchanger.

Also provided by the invention is a process for fractionating a biomass comprising the steps of: (1) preparing a slurry of the biomass in a water/ethanol mixture; (2) heating the biomass slurry to a first temperature by mixing with a stream of a heated water/ethanol mixture; (3) feeding the heated biomass slurry and optionally $CO_2$ to a reactor maintained at the first temperature and a first pressure to form a reactant mixture; (4) maintaining the reactant mixture in the reactor for a first time period; (5) allowing the reactant mixture to flow out of the reactor (the effluent mixture); (6) cooling the effluent mixture by mixing with a stream of a cold water/ethanol mixture; (7) passing the cooled effluent mixture through a high pressure filter to collect the solids that do not pass the filter; (8) rinsing the solids collected with a water/ethanol mixture to remove soluble components; (9) collecting the insoluble solid as a first solid product; (10) collecting the filtered fluid from step (7) in an effluent tank; (11) evaporating ethanol from the filtered fluid collected in the effluent tank to precipitate a second solid product; (12) collecting the second solid product by filtration; and (13) collecting an aqueous filtrate from step (12). In some embodiments, a $CO_2$ stream is fed to the reactor in step (3). In this case, the filtered fluid from step (7) that is collected in the effluent tank contains $CO_2$, which may optionally either be refluxed under supercritical conditions or liquefied under sub-critical conditions. In some embodiments, $CO_2$ is not added to the reactor.

The laboratory-scale examples of STP discussed further below illustrate the invention. A plant size system of this invention operating, e.g. in a continuous mode, can use biomass of larger particle sizes than those described in the examples below e.g. less than about 1 inch hydraulic diameter. Pumps or other mechanisms capable of handling high-solids slurries and industrially relevant ways of heat transfer are embraced by the methods and processes of this invention. Examples of modifications which may be used on an industrial scale include recovering heat through jacketed pipe heat exchangers.

In some embodiments, the process for fractionating a biomass, such as a lignocellulosic biomass, is a two stage process comprising: (a) forming a first reactant mixture comprising a biomass, water and $CO_2$ at a first temperature and a first pressure; (b) maintaining the first reactant mixture at the first temperature and the first pressure for a first time period, wherein a first reaction occurs; (c) recovering a solid from the first reaction mixture; (d) contacting the solid with a second fluid comprising a $C_1$-$C_5$ alcohol to form a second reactant mixture at a second temperature and a second pressure; (e) maintaining the second reactant mixture at the second temperature and the second pressure for a second time period, wherein a second reaction occurs; and (f) quenching the second reaction to form at least one reaction product mixture. In some embodiments, the process is a continuous process. In some embodiments, the process is a batch process or a semi-batch process. In some embodiments, the first reactant mixture is formed by mixing a slurry of a biomass in water with $CO_2$.

Figure 5:
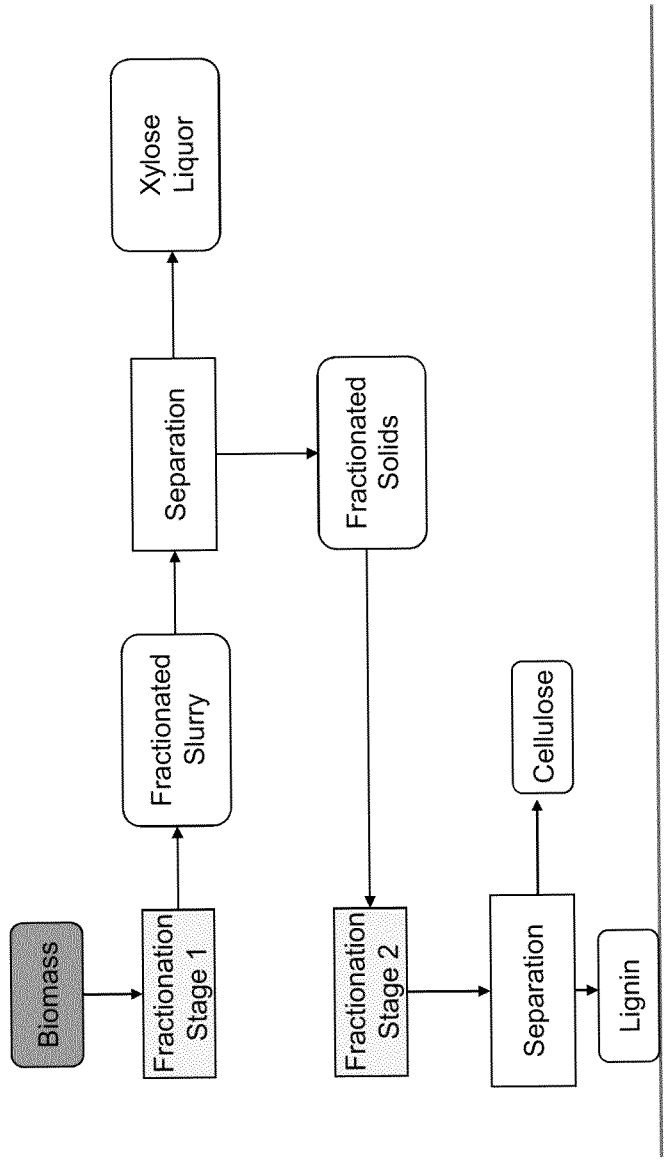
FIG. 5 is a schematic of a two-stage biomass fractionation.

Schematic of the two-stage fractionation process is shown in FIG. 5. A high-pressure reactor system is used for continuous fractionation of biomass in two stages. The reactors operate at temperatures and pressures of up to 350° C. and 100 bar, respectively. The reactor systems are equipped with auxiliary systems, i.e., a high pressure process gas and liquid feeding system; a liquid product collection system; and a data monitoring and acquisition system.

In some embodiments, the first stage in the two stage fractionation of biomass may comprise the following steps: (1) preparing a slurry of the biomass in water; (2) heating the slurry, e.g. in a furnace; (3) mixing $CO_2$ with the slurry to form a reactant mixture; (4) feeding the reactant mixture to the first stage reactor, e.g. continuously by a high-pressure slurry pump, wherein a reaction occurs; (5) quenching the reaction; (6) passing the quenched reaction mixture through a filter to remove insoluble solids and particulate matters; and (7) collecting the filtrate, e.g. in an effluent tank. In some embodiments, liquid $CO_2$ is fed (from another line) directly into the slurry using a special $CO_2$ pump. In some embodiments, the slurry reaches reaction temperature before entering the reactor. The pressure may be maintained by a back pressure regulator located downstream of the reactor. In some embodiments, at the end of reaction time, the effluent exiting the reactor is immediately quenched near the outlet by a heat exchanger. In some embodiments, the cooled reactor effluent is passed through a high-pressure filter to remove solids and particulate matter, and the filtrate is collected in an effluent tank. The xylose-rich solution is analyzed on an HPLC for identification and quantification of sugar products.

In some embodiments, the second stage in the two stage fractionation of biomass may comprise the following steps: (1) mixing the insoluble solids from the first stage with a $C_1$-$C_5$ alcohol (e.g. ethanol or butanol) to form a second reactant mixture; (2) heating the second reactant mixture to a reaction temperature; (3) feeding the heated second reactant mixture to the second stage reactor, e.g. continuously by a high-pressure slurry pump, where a second reaction occurs; (4) quenching the second reaction; (5) passing the quenched reaction mixture through a filter to remove insoluble solids and particulate matters; and (6) collecting the filtrate, e.g. in an effluent tank. The pressure is maintained, e.g. by a back pressure regulator located downstream of the reactor. In some embodiments, at the end of reaction time, the effluent exiting the reactor is immediately quenched near the outlet by a heat exchanger. In some embodiments, the cooled reactor effluent is passed through a high pressure filter to remove solids and particulate matter, and the filtrate is collected in an effluent tank. The insoluble solids are analyzed and quantified for cellulose content. Lignin dissolved in the $C_1$-$C_5$ alcohol (e.g. ethanol or butanol) is precipitated by evaporating/distilling ethanol/butanol from the solution.

Conversion of Cellulose to Glucose

The Nano Carbonic Solvothermal Technology (NCST) of this invention provides methods for performing cellulose hydrolysis in sub- or near-critical water and carbon dioxide. Optionally, the cellulose may be solubilized with near critical or supercritical water prior to hydrolysis.

Mechanism of Cellulose Hydrolysis

Cellulose is composed of long chains of sugar molecules of various kinds. Each cellulose molecule is an unbranched polymer of 1000 to 1 million D-glucose units, linked together with beta-1,4-glycosidic bonds. Cellulose from various sources is all the same at the molecular level. In the hydrolysis process, these chains are broken down to free the sugar.

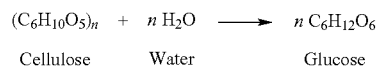

$$(C_6H_{10}O_5)_n \; + \; n\, H_2O \longrightarrow n\, C_6H_{12}O_6$$
Cellulose　　　　Water　　　　Glucose There are two types of hydrogen bonds in cellulose molecules: those that form between the C3-OH group and the oxygen in the pyranose ring within the same molecule and those that form between the C6-OH group of one molecule and the oxygen of the C3-OH group of another molecule. Ordinarily, the beta-1,4-glycosidic bonds themselves are not too difficult to break. However, because of the hydrogen bonding network, cellulose can form very tightly packed crystallites. These crystals are sometimes so tight that neither water nor enzyme can penetrate them; only exogluconase, a subgroup of cellulase that attacks the terminal glucosidic bond, is effective in breaking it down. The inability of water to penetrate cellulose also explains why crystalline cellulose is insoluble. On the other hand, amorphous cellulose allows the penetration of endogluconase, another subgroup of cellulase that catalyzes the hydrolysis of internal glycosidic bonds.

The natural consequence of this difference in the crystalline structure is that the hydrolysis rate is much faster for amorphous cellulose than that for crystalline cellulose. The process of breaking the glucosidic bonds that hold the glucose basic units together to form a large cellulose molecule is called hydrolysis because a water molecule must be supplied to render each broken bond inactive.

The inability of the water to penetrate cellulose may be overcome by penetrating the water at supercritical or near-critical conditions. The supercritical water breaks down the hydrogen bonds of crystalline structure cellulose, solubilizing the cellulose.

Supercritical water can lead to complete hydrolysis of cellulose, but typically the glucose and fructose yields are around 25% and 13%, respectively. The addition of $CO_2$ increases these yields and provides a fast process for converting cellulose to glucose and fructose, for instance. Supercritical carbon dioxide reacts with sub-critical or near-critical water to form carbonic acid. The carbonic acid acts as an acid-catalyst in hydrolysis of the glucosidic bonds in cellulose to produce glucose, fructose, mannose, and oligomers thereof. Supercritical $CO_2$ mixed with sub-critical, near-critical or supercritical water catalyzes the hydrolysis of cellulose but has minimal impact on the decomposition of the hydrolysis products (e.g. glucose and fructose). Consequently, while a strong acid such as a mineral acid may be used in certain instances, often it is not needed or used in a method disclosed herein.

The near-critical or supercritical water solubilization initially results in rapid complete solubilization of cellulose, to give a solution of highly water soluble compounds (oligomers). This is followed by a temperature reduction step (to sub-critical or near-critical water conditions) in combination with $CO_2$ injection to increase the hydrolysis pathway to the sugars in high yield. Hydrolysis in the near critical water region without $CO_2$ is problematic, as the reaction rate decreases, requiring long residence times which can lead to the formation of undesirable decomposition products that can inhibit downstream fermentation.

Nano Carbonic Hydrothermal Treatment

The invention provides a process for cellulose hydrolysis using the Nano Carbonic Solvothermal Technology (NCST), in which supercritical carbon dioxide and sub-critical, near-critical or supercritical water are used in a solvothermal process. The reaction may be performed as a single stage (hydrolysis only) or a two-stage (solubilization and hydrolysis) reaction.

The single-stage process for hydrolyzing cellulose may be generally as follows: cellulose is contacted with a fluid mixture comprising supercritical $CO_2$ and sub-critical or near-critical water to form a reactant mixture at a hydrolysis temperature and hydrolysis pressure for a hydrolysis time period (e.g. the residence time in a reactor), wherein a reaction occurs and forms one or more hydrolysis products; and then the reaction is quenched. One or more hydrolysis products (e.g. glucose, fructose, mannose, cellobiose, and oligomers) may be obtained and recovered from the reaction.

In a two stage process for cellulose hydrolysis, the cellulose is solubilized prior to the hydrolysis. The two-stage process may be generally as follows: (1) cellulose is solubilized by contacting the cellulose with near-critical or supercritical water at a solubilization temperature and a solubilization pressure for a solubilization time period (e.g. the residence time in a reactor); and (2) the solubilization reaction is quenched. The solubilized cellulose is then contacted with a fluid mixture comprising supercritical $CO_2$ and sub-critical or near-critical water to form a reactant mixture at a hydrolysis temperature and hydrolysis pressure for a hydrolysis time period (e.g. the residence time in a reactor), wherein a reaction occurs and forms one or more hydrolysis products; and then the reaction is quenched. One or more hydrolysis products (e.g. glucose, fructose, mannose, cellobiose, and oligomers) may be obtained and recovered from the reaction. While the first stage (the solubilization stage) is optional, the two stage process may in some embodiments provide higher product yields than the single stage process.

The cellulose used in this invention can be obtained from various sources and in various forms, e.g. α-cellulose fibers, bleached cotton (natural cellulose), and cellulose produced from fractionation of a biomass, e.g. a lingo-cellulosic biomass such as wood, corn stover, wheat straw, bagasse, solid organic waste and the like. In one embodiment, the cellulose is obtained from a biomass fractionation process discussed above. The cellulose may optionally be made into a slurry prior to the solubilization and/or hydrolysis reaction, by combining with one or more fluids such as water. In some embodiments, the slurry comprises about ½ to about 20 wt % cellulose. In some embodiments, the slurry comprises about 1 to about 10 wt % or 5 wt % cellulose. The cellulose may be crystalline or amorphous.

Solubilizing Cellulose

Cellulose may be solubilized in water with or without added materials. For instance, if desired, one may first dissolve a crystalline cellulose using the appropriate enzyme as discussed above. However, in many instances, an enzyme is unnecessary. Cellulose may be dissolved in water that is below the supercritical point, such as in sub-critical or near-critical water. Cellulose may be dissolved in supercritical water instead of or in addition to dissolving it in water below the supercritical point.

Consequently, the solubilization temperature for cellulose may be about, for example, about 373° C. to about 420° C. In some embodiments, the solubilization temperature is about 375° C. to about 400° C. In some embodiments, the solubilization temperature is about 375° C. In some embodiments, the solubilization is performed with supercritical water. In some embodiments, the solubilization is performed with near critical water. Generally, using near critical water for solubilization may require longer solubilization time periods to achieve an equivalent level of solubilization in comparison with using supercritical water. In the solubilization step, supercritical water forms a homogeneous mixture with cellulose and causes its complete solubilization in very short time (c.<1 sec). However, the initial hydrolysis products are further decomposed at supercritical temperatures. In near-critical water, both the hydrolysis of cellulose and further decomposition of the hydrolysis product are slower. Prolonged treatment with near-critical water tends to result in significant amount of undesirable decomposition products (glycoaldehydes, erthsose, glyceraldehydes, etc).

The solubilization pressure may be about, for example, 221 bar to about 350 bar. In some embodiments, the solubilization pressure is about 200 bar to about 240 bar. In some embodiments, the solubilization pressure is about 200 bar to about 225 bar. In some embodiments, the solubilization pressure is about 225 bar. In some embodiments, the solubilization pressure is about 225 bar, and the solubilization temperature is about 375° C.

Solubilization may therefore be just below the supercritical point, at or slightly above the supercritical point, or at any combination of the temperature and pressure ranges discussed above.

The solubilization time period may be about, for example, about 0.1 s to about 5 s; these time period are based on water density at process conditions. In some embodiments, the solubilization time period is about 0.1 s to about 2 s. In some embodiments, the solubilization time period is about 0.1 s to about 1 s. In some embodiments, the solubilization time period is about 1 s to about 2 s. In some embodiments, the solubilization time period is about 0.5 s. Solubilization is preferably performed quickly when supercritical water is used, and longer time periods are often used when near-critical or sub-critical water are used.

The solubilization reaction may be quenched immediately by reducing the temperature of the reaction, e.g. to 250-350° C. to minimize hydrolyzing desired products made in the solubilizing step. In some embodiments, the solubilization reaction is quenched by reducing the temperature to about 280-290° C. The temperature may be reduced, for example, by addition of a cooler fluid (e.g. $CO_2$, water, or a combination of $CO_2$ and water). In some embodiments, the amount of $CO_2$ added to quench results in a mixture containing about 5 wt % to about 20 wt % $CO_2$ of the total fluids. In some embodiments, the $CO_2$ is supercritical $CO_2$.

In some embodiments, process cellulose is diluted in a 1:1 ratio with water, the mixture is heated rapidly to 375° C. so that the water is in supercritical condition, and the pressure is maintained at 225 to 300 bar. In one such embodiments, process cellulose slurry at 220° C. is diluted in a 1:1 ratio with water at 440° C., thereby rapidly heating the mixture to 375° C. so that the water is in supercritical condition; the pressure is maintained at 225 to 300 bar. After about ½-1 sec, the mixture is quenched to about 280-300° C.

Hydrolysis Reaction

As noted previously, the cellulose solubilization step above does not occur for a single-step solubilization-hydrolysis process. A fluid mixture comprising supercritical $CO_2$ and water at, above, or below its critical point is used to both solubilize and hydrolyze cellulose simultaneously rather than having steps designed to perform primarily solubilization and primarily hydrolysis. The fluid mixture reacts with cellulose for a sufficient period of time to dissolve cellulose and convert at least a portion of it to desired products such as glucose and fructose. For a single-step solubilizing-hydrolysis process, generally the rate-limiting step is the rate of dissolving cellulose, and consequently conditions are selected as outlined below to provide longer reaction times but lower temperatures to avoid e.g. hydrolysis or degradation of desired products to side or unwanted products.

Generally, the fluid mixture in the hydrolysis reaction may comprise about 1-30 wt % of $CO_2$. In some embodiments, the fluid mixture comprises about 5 wt % to about 20 wt % $CO_2$. In some embodiments, the fluid mixture is saturated with $CO_2$. The $CO_2$ may be combined with the water prior to contacting with the cellulose, or may be contacted with the cellulose separately from the water (e.g. through different reaction injection ports in a reactor). Alternatively, water may be carried over from the solubilizing step. In some embodiments, the hydrolysis reaction is performed at a pH of about 3 to about 5 by adjusting the amounts of $CO_2$ and water as needed.

The hydrolysis temperature may be about, for example, 270° C. to about 340° C. In various embodiments, the hydrolysis temperature may be about, for example, about 270° C. to about 300° C., about 280° C. to about 320° C., about 280° C. to about 300° C., about 280° C. to about 290° C., about 280° C., or about 300° C.

The hydrolysis pressure may be about, for example, 180 bar to about 350 bar. In various embodiments, the hydrolysis pressure is about 180 bar to about 225 bar, about 200 bar to about 225 bar, or about 225 bar.

Conditions may be selected so that the temperature and pressure are near-critical or sub-critical for the water of the hydrolyzing fluid.

The hydrolysis time period may be about for example, about 1 s to about 30 s. In general, when performing a single-stage reaction, the hydrolysis time period will be longer than when performing a two-stage reaction. Generally, the two-stage reaction will result in higher yields with much shorter reaction times. In various embodiments, the hydrolysis time period is, for example, about 2 s to about 30 s, about 2 s to about 3 s, about 3 s to about 15 s, about 15 s to about 20 s.

In one instance, supercritical $CO_2$ and sub-critical water hydrolyze cellulose at a temperature of about 280-290° C. and a pressure of about 225 bar for a period of about 15-20 seconds. These conditions allow the process to be easily controlled, but at the expense of slight loss or conversion of desired product (e.g. glucose, fructose) to side or unwanted product (e.g. acetic and propionic acid).

In another instance, hydrolysis may be performed first at conditions where both water and $CO_2$ are at or above their respective critical points to perform a rapid hydrolysis on dissolved cellulose, followed by immediate reduction in temperature to milder conditions as discussed in the paragraph above to complete the reaction. For example, supercritical water and supercritical $CO_2$ hydrolyze the dissolved cellulose for a period of about ¼-1 sec., preferably about ¼-½ sec. or about 0.6-0.8 sec. at a temperature of about or slightly above the critical temperature and a pressure of about or slightly above the critical pressure (e.g. about 374 or 375° C. and about 223-225 bar). The mixture is immediately quenched by e.g. introducing cooler water and $CO_2$ to reduce the temperature below the critical temperature and react instantaneously, for a period of less than 5 sec., between about 1-5 sec., or about 2-3 sec. These conditions provide for a faster reaction time than the single step hydrolysis process discussed above while providing about the same or better product yield.

The cellulose hydrolysis reaction may be quenched by a variety of methods, such as adding a cooler fluid (e.g. water) directly to the reactant mixture, by indirect cooling (heat exchange), or by performing work on a turbine. In some embodiments, the hydrolysis reaction is quenched by cooling the reactant mixture to a temperature of about 30° C. to about 80° C., about 20° C. to about 80° C., about 25° C., or about room temperature.

One or more hydrolysis products (e.g. glucose, fructose, mannose, cellobiose, cellotriose, and oligomers may be obtained and recovered from the cellulose hydrolysis reaction. The particular reaction products obtained depend upon the content of the original biomass as well as the reaction conditions used to hydrolyze the cellulose. For example, mannose may be obtained from particular types of biomass, such as softwoods, hemicellulose of which contains mannans. Glucose is the sugar monomer in cellulose, which is released upon hydrolysis. Fructose is formed by isomerization of glucose under certain reaction conditions. Higher levels of fructose (versus glucose) may be selected for when using higher hydrolysis pressures (e.g. greater than 300 bar, about 350 bar). Oligomers may be obtained when cellulose is partially hydrolyzed. In some embodiments, the at least one hydrolysis product is selected from the group consisting of glucose, fructose, and oligomers thereof. In some embodiments, the at least one hydrolysis product is glucose. In some embodiments, the at least one hydrolysis product is fructose. In some embodiments, the at least one hydrolysis product is mannose. In some embodiments, the at least one hydrolysis product is cellobiose. The hydrolysis products may be analyzed by conventional methods, such as e.g. HPLC, and may be separated by conventional methods.

Figure 9:
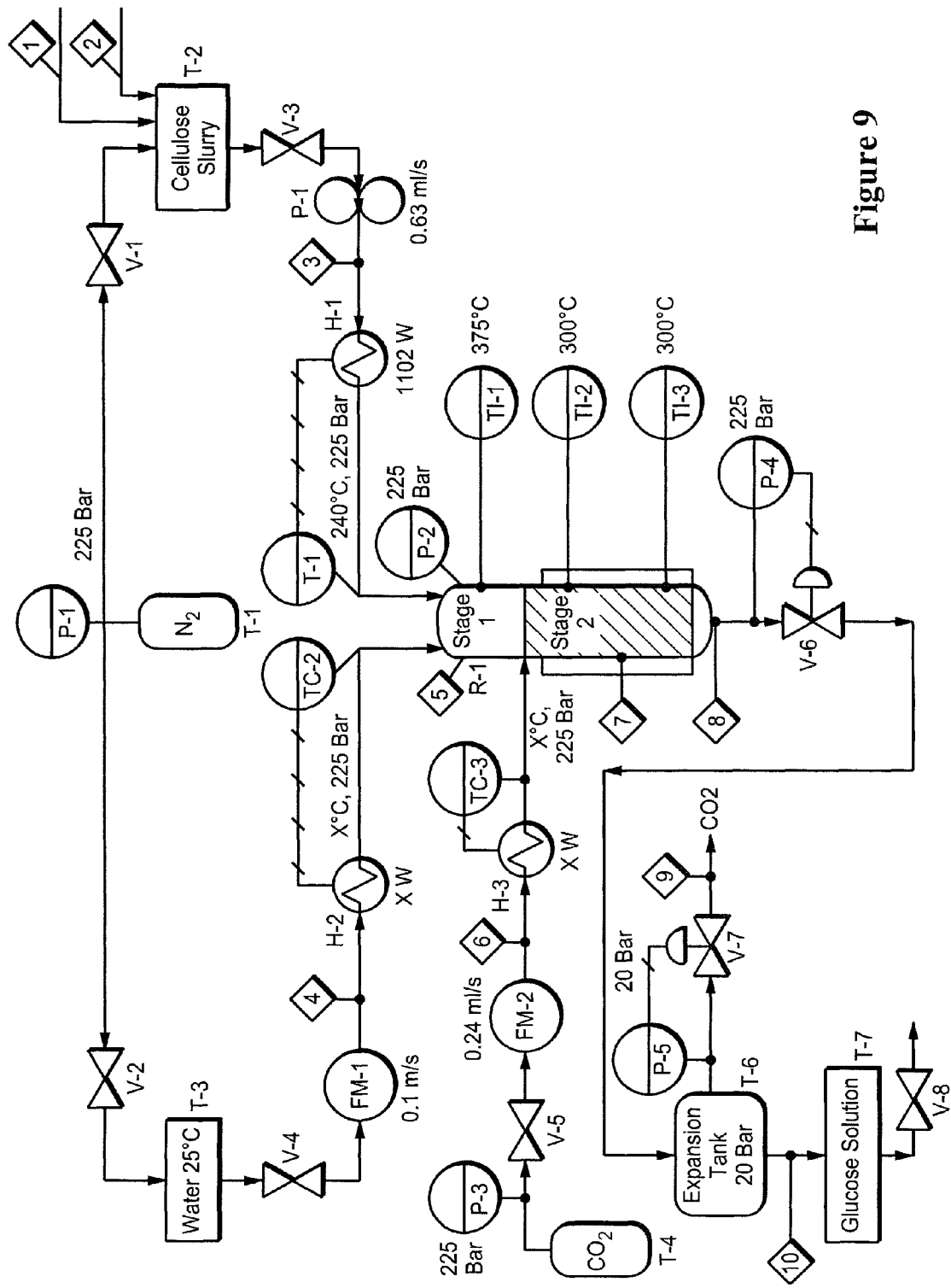
FIG. 9 depicts an example of a reactor system for a continuous two-stage process for cellulose hydrolysis in the Nano Carbonic Solvothermal Technology (NCST) process.

The process for cellulose hydrolysis may be a batch process in which all fluids and reactants enter the reactor and are retained there without further addition, a semi-continuous process in which e.g. cellulose is placed in a reactor and a dissolving and/or hydrolyzing fluid passes through the bed or mass of cellulose, or a continuous process in which cellulose and fluids are constantly added, and may utilize conventional chemical reactor technology. FIG. 9 is a schematic of one example of a reactor for a continuous two-stage reaction process.

In some embodiments, the process for cellulose hydrolysis is a semi-continuous process for cellulose hydrolysis comprising: (a) adding the cellulose to a first reactor that is maintained at a first constant temperature; (b) continuously pumping water through the first reactor; (c) solubilizing the cellulose in the first reactor; (d) quenching the solubilization reaction; (e) transferring the solubilized cellulose to a second reactor; (f) contacting the solubilized cellulose with $CO_2$ in the second reactor; (g) hydrolyzing the solubilized cellulose in the second reactor to form one or more hydrolysis products; (h) continuously removing the one or more hydrolysis products from the second reactor; (i) rapidly cooling and depressurizing the one or more hydrolysis products; and (j) recovering at least one hydrolysis product.

In some embodiments, the process for cellulose hydrolysis is a continuous process for cellulose hydrolysis comprising: (a) mixing the cellulose with water to form a slurry; (b) continuously pumping the cellulose slurry through a first reactor that is maintained at a constant first temperature; (c) solubilizing the cellulose in the first reactor; (d) transferring the solubilized cellulose slurry and the $CO_2$ to a second reactor; (f) hydrolyzing the solubilized cellulose in the second reactor to form one or more hydrolysis products; (g) continuously removing the one or more hydrolysis products from the second reactor; (h) rapidly cooling and depressurizing the one or more hydrolysis products; and (i) recovering at least one hydrolysis product. In some embodiments, the residence time of the cellulose slurry in the first reactor is adjusted by varying the flow rate of the cellulose slurry through the first reactor.

In some embodiments, the process for cellulose hydrolysis comprises: solubilizing cellulose with supercritical water at about 375° C. and about 225 bar for about 1 to about 2 seconds or about 0.6 to about 2 seconds; quenching the solubilization reaction; hydrolyzing the cellulose using supercritical carbon dioxide and near-critical water at about 300° C. and about 200 bar or 220 bar to about 225 bar for about 2 to 30 seconds; quenching the hydrolysis reaction mixture; and recovering at least one hydrolysis product. In some embodiments, the at least one hydrolysis product is selected from the group consisting of glucose, fructose, and oligomers.

The invention also provides a continuous process for hydrolyzing cellulose to produce valuable products such as glucose and fructose comprising: (a) supplying a slurry comprising cellulose, water and $CO_2$ at a first temperature; (b) heating the slurry at a second temperature and a pressure for a first time period, wherein a reaction occurs and forms one or more hydrolysis products; (c) quenching the reaction; and (d) recovering at least one hydrolysis product. The slurry is supplied at a temperature of about 220 to about 280° C., e.g. at about 220° C., about 250° C. or about 280° C. The hydrolysis reaction is carried out at a temperature near or at the critical temperature of water. In some embodiments, the second temperature is about 371 to about 377° C., e.g. at about 371° C., at about 372° C., at about 373° C., at about 374° C., at about 375° C., about 376° C. or about 377° C. In one embodiment, the pressure is maintained at 225 bar. The residence time of the mixture of cellulose, supercritical $CO_2$ and supercritical water in the reactor where hydrolysis occurs is calculated based on water density at process conditions and the flow rate. In some embodiments, the first time period is about 0.1 to about 1 second. In some embodiments, the first time period is about 0.1 to about 0.5 seconds, about 0.12 to about 0.5 seconds, or about 0.12 to about 0.3 seconds.

Various examples of methods of converting cellulose to glucose using a supercritical fluid are discussed in the examples below. The practice of this invention can be further understood by reference to those examples, which are provided by way of illustration and are not intended to be limiting.

Dehydration of Xylose to Form Furfural

Also provided is a process for producing furfural from xylose, using sub-critical or near-critical water, optionally in combination with supercritical $CO_2$. The methods described herein may provide an economical system for producing furfural from xylose in good yield and selectivity.

As used in describing xylose dehydration to furfural, sub-critical water may have a temperature of about 100° C. to about 300° C.

Briefly, xylose is reacted under hydrothermal conditions (using sub-critical or near-critical water), optionally in the presence of $CO_2$. At sub- and near-supercritical water conditions, xylose undergoes dehydration and loses three water molecules to become furfural:

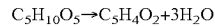

$$C_5H_{10}O_5 \rightarrow C_5H_4O_2 + 3H_2O$$

Xylose oligosaccharides (XOS), which may be obtained from fractionation of biomass together with xylose, breaks down to xylose monomers under the conditions for xylose dehydration described herein and the xylose monomers undergoes dehydration under such conditions. Therefore, any and every embodiments of the hydrothermal processes or any variations thereof described herein for xylose apply to xylose oligosaccharides or a mixture of xylose and xylose oligosaccharides, as if the process is separately described for xylose oligosaccharides or a mixture of xylose and xylose oligosaccharides.

Addition of $CO_2$ to the reaction may facilitate the reaction, and may improve both the yield and the selectivity of furfural. Without wishing to be bound by theory, it is hypothesized that $CO_2$ acts as a catalytic agent, by mixing with the water and forming carbonic acid, thus creating an acidic condition which may catalyze the reaction. Additionally, when sufficient $CO_2$ is added to the reaction mixture such that a 2-phase system (aqueous phase and a $CO_2$-rich phase) is formed, it is hypothesized that the reaction occurs in the aqueous phase (the reaction zone), as xylose is water soluble and present mostly in the aqueous phase, and the $CO_2$-rich phase extracts the furfural away from the reaction zone, hence decreasing the concentration of furfural in the reaction zone and thus decreasing the destruction of the furfural and/or other side reactions.

The process for producing furfural from xylose may be generally as follows. First, xylose in either dry or aqueous form or XOS, for instance, is mixed with sub-critical or near-critical water, and optionally $CO_2$, to form a mixture of xylose/XOS, sub- or near-critical water, and optionally supercritical $CO_2$ at a first temperature and a first pressure. In some embodiments, the mixture to be reacted comprises supercritical $CO_2$. In some embodiments, the mixture to be reacted does not comprise $CO_2$. In some embodiments, the mixture to be reacted does not comprise a mineral acid. In some embodiments, the mixture to be reacted does not comprise hydrochloric, phosphoric, or sulfuric acids. The mixture is kept at the first temperature and the first pressure for a time period for reaction (e.g. the residence time in a reactor or a longer or shorter time, depending on reactor configuration and conditions downstream from the reactor), during which time the xylose reacts to form furfural. Once the desired conversion of xylose to furfural is achieved, the reacted mixture is cooled rapidly to a lower temperature and pressure to quench the reaction.

The xylose/XOS used in the reaction may be from, for example, a commercial source or may be produced by fractionation of a biomass such as a lingo-cellulose biomass (e.g. bagasse, wheat straw, corn stover, and the like). In one embodiment, the xylose and XOS is obtained from a biomass fractionation process discussed above. The xylose solution may contain, for example, about 3 wt % to about 25 wt % xylose, about 3 wt % to about 15 wt % xylose, about 5 wt % to about 15 wt % xylose. In some embodiments, the xylose solution is about 12 wt % xylose. In some embodiments, the xylose solution is about 10 wt % xylose.

In general, the first temperature in the process for producing furfural from xylose (the temperature at which dehydration occurs) may be about 200° C. to about 374° C. In various embodiments, the first temperature may be, for example, about 200° C. to about 330° C., about 250° C. to about 374° C., about 250° C. to about 330° C., about 270° C. to about 350° C., about 270° C. to about 330° C., about 270° C. to about 300° C., about 275° C. or about 300° C., about 280° C. to about 300° C., about 280° C. to about 350° C., about 300° C. In some embodiments, the water is near-critical water. In some embodiments, the water is sub-critical water. The first temperature may be adjusted by changing the temperature of the sub-critical or near-critical water and/or by changing the ratio of the aqueous xylose solution to the sub-critical or near-critical water (e.g. by changing the flow rates).

The first pressure in the process for producing furfural from xylose may be, for example, about 100 bar to about 350 bar. In some embodiments, the first pressure is about 180 bar to about 320 bar. In some embodiments, the first pressure is about 100 bar to about 220 bar. In some embodiments, the first pressure is about 180 bar to about 220 bar. In some embodiments, the first pressure is above about 225 bar. In some embodiments, the first pressure is about 225 bar.

The temperature and/or pressure at which xylose dehydration occurs may be above the critical point for $CO_2$ but below the critical point for water. Temperatures and pressures may be selected from those discussed above to dehydrate xylose.

The reaction time period in the process for producing furfural from xylose may be, for example, about 0.5 to about 180 s. In some embodiments, the reaction time period is about 5 s to about 120 s. In some embodiments, the reaction time period is about 60 s to about 120 s. In some embodiments, the reaction time period is about 3 s to about 30 s. In some embodiments, the reaction time period is about 30 s to about 60 s. In some embodiments, the reaction time period is about 0.5 s to about 35 s. In some embodiments, the reaction time period is about 0.5 s to about 5 s. In some embodiments, the reaction time period is about 2 s to about 5 s. In some embodiments, the reaction time period is about 3 s to about 5 s. In some embodiments, the reaction time period is about 3 s to about 4 s.

The xylose dehydration reaction is quenched by rapid cooling (e.g. less than about 1 sec) of the mixture to a lower temperature and pressure. Various methods of rapid cooling may be used, for example, by adding a coolant (e.g. cooled fluid (e.g. cooled water or other appropriate cooled fluid), ice, or other appropriate coolant), by quenching in a heat exchanger with cold fluid indirectly, by immersing the reaction vessel in a cooled bath, by rapid expansion of the reactant mixture (e.g. by expansion through a nozzle), etc. In some embodiments, the cooled fluid is cooled water. In some embodiments, the cooled fluid may have a temperature of, for example, about −30° C. to about 60° C., for example about 25° C. The lowered temperature may be, for example, about −10° C. to about 60° C., for example, about 20° C. to about 60° C. The lowered pressure may be, for example, about 1 bar to about 75 bar, for example, about 1 atm.

The furfural may be recovered and purified from the reaction product mixture by conventional methods known in the art. For example, the furfural may be recovered from the reaction product mixture by removing the water from the mixture (e.g. by evaporation, distillation, pervaporation, adsorption, extraction of $CO_2$, etc.) to cause precipitation of furfural. Generally, furfural will start to precipitate out of an aqueous furfural solution when the furfural concentration reaches about 5 wt % to about 15 wt %. The furfural product may be purified using conventional methods, e.g. adsorption, chromatography, ion exchange chromatography, etc. The furfural product may be analyzed using conventional methods, e.g. HPLC, GC, etc.

In some embodiments of the process for producing furfural from xylose, $CO_2$ is added to the mixture of sub- or near-critical water and xylose/XOS. The $CO_2$ may be added to aqueous xylose solution, and if desired, aqueous xylose solution can be mixed with additional water at sub-critical or near-critical conditions. The $CO_2$ may be added to the sub- or near-critical water prior to mixing with xylose/XOS. The $CO_2$ and the sub- or near-critical water may be separately added to xylose/XOS. In some embodiments, the $CO_2$ concentration is low enough that the mixture is a single phase system at the first temperature and first pressure. In some embodiments, the $CO_2$ concentration is such that the mixture is a two-phase system at the first temperature and first pressure, comprising an aqueous phase and a $CO_2$-rich phase. For example, at 4 mol % $CO_2$, the mixture is present as a single phase. At about 40 mol % $CO_2$, the mixture separates into two phases: a $CO_2$-rich phase and an aqueous phase. In various embodiments, the mixture may comprise, for example, about 1 mol % to about 50 mol % $CO_2$, about 4 mol % to about 40 mol % $CO_2$, about 10 mol % to about 40 mol % $CO_2$, about 20 mol % to about 40 mol % $CO_2$, about 30 mol % to about 40 mol % $CO_2$.

In some embodiments of the process for producing furfural from xylose, when the $CO_2$ concentration is sufficiently high such that the mixture is a two-phase system at the first temperature and first pressure, after the mixture has reacted at the first temperature and the first pressure for the reaction time period, the reacted mixture may optionally be rapidly cooled to a temperature and pressure at which the water is no longer sub- or near-critical, but wherein the $CO_2$ may optionally be supercritical. For example, the temperature may be rapidly reduced to about 31° C. to about 80° C., for example about 31° C. to about 60° C., and the pressure, for example, to about 70 bar to about 120 bar, for example, to about 70 bar to about 80 bar. This process aids in preventing furfural from degrading or reacting further. At this point, the $CO_2$-rich phase (which may comprise co-extracted water) may be separated from the aqueous phase using standards techniques. For example, the $CO_2$-rich phase may be separated from the aqueous phase by refluxing to remove the co-extracted water, which also concentrates the furfural fraction. The flow rate of $CO_2$ may be adjusted to optimize the furfural extraction and vary the reflux ratio to give high furfural yields in the product stream. After separation, the $CO_2$-rich phase may be further cooled and depressurized, for example, to about −10° C. to about 70° C., about 20° C. to about 70° C., for example, about 20° C. to about 35° C., and for example, to about 1 bar to about 40 bar, for example, to about 1 atm. After furthering cooling and depressurization, the furfural may be separated from the $CO_2$ by conventional techniques.

The process for xylose dehydration may be a batch process, a semi-batch process, a semi-continuous, or a continuous process, and may utilize conventional chemical reactor technology. In some embodiments, the process is a batch process. In some embodiments, the process is a semi-batch or semi-continuous process. In some embodiments, the process is a batch process. In some embodiments, the process is a continuous process.

In some embodiments of the process for producing furfural from xylose, the yield of furfural production increases with increasing xylose conversion. In some embodiments, the selectivity of furfural production increases with increasing xylose conversion. In various embodiments, the yield of furfural production increases with increasing xylose conversion, wherein the xylose conversion level is at least about 50%, at least about 60%, at least about 70%, at least about 80%, at least about 90%. In various embodiments, the selectivity of furfural production increases with increasing xylose conversion, wherein the xylose conversion level is at least about 50%, at least about 60%, at least about 70%, at least about 80%, at least about 90%. Xylose conversion is measured by the amount of xylose and XOS consumed. The yield of furfural is measured by conventional methods, e.g. HPLC analysis, GC analysis, etc. The selectivity is measured by the yield of furfural produced relative to the total theoretical yield based on total xylose consumption. In some embodiments, the addition of $CO_2$ enhances production of furfural.

Systems and Compositions

Also provided is a system for converting biomass to more valuable products such as glucose and furfural comprising a module configured for fractionating a biomass to form at least one of cellulose and xylose, and optionally lignin. In some embodiments, the system further comprises a module configured for hydrolyzing cellulose to form glucose, and optionally fructose. In some embodiments, the system further comprises a module configured for dehydrating xylose or hydrolyzing xylose/XOS to form furfural. In some embodiments, the system further comprises a module configured for hydrolyzing cellulose to form glucose, and optionally fructose; and a module configured for dehydrating xylose or hydrolyzing xylose/XOS to form furfural.

In some embodiments, the module configured for fractionating biomass to form at least one of cellulose and xylose, and optionally lignin, comprises a reactor configured for contacting a biomass with a reactive fluid at a temperature and pressure above the critical point of carbon dioxide but at least one of the temperature and pressure of the fluid is beneath the critical temperature and pressure for water. In some embodiments, the module configured for fractionating biomass comprises a reactor configured for contacting a biomass with a reactive fluid at a temperature and pressure at, above or near the critical point water. In some embodiments, the reactor is configured for contacting a biomass with a reactive fluid at a temperature of up to about 250° C., about 300° C., about 350° C., about 375° C. or about 400° C. and a pressure of up to about 100 bar, about 150 bar, about 200 bar, about 250 bar, about 300 bar, or about 350 bar. In some embodiments, the module configured for fractionating biomass further comprises a heating device configured for heating the reactive fluid to the desired temperature and a back-pressure regulator located downstream of the reactor for maintaining the desired pressure. In some embodiments, the module may further comprise a heat exchanger configured for cooling a reaction located downstream of the reactor. In some embodiments, the module may further comprise a filtration device configured for separating solids and particulate matters from liquids in a reaction mixture, such as a high-pressure filter. In some embodiments, the module may further comprise a second reactor configured for contacting a biomass with a reactive fluid at a temperature and pressure above the critical point of carbon dioxide but at least one of the temperature and pressure of the fluid is beneath the critical temperature and pressure for water.

In a particular embodiment, the module configured for fractionating biomass to form at least one of cellulose and xylose, and optionally lignin, comprising: a heater for heating the reactant mixture; a reactor for fractionating the biomass, mechanically coupled to the heater for receiving the heated reactant mixture; and a heat exchanger mechanically coupled with the reactor for receiving and cooling the fractionated reactant mixture. In some embodiments, the system further comprises a filtration device for separating at least a portion of the fractionated product in solid state from the fractioned and cooled reactant mixture. The reactor in the system of the invention is any reactor capable of sustaining the severe temperatures and pressures under which the fractionation reaction occurs, such as a tube constructed to sustain the temperature and pressure suitable for fractionating biomass. The heater of the system can be any suitable heater. Non-limiting examples of the heater include furnace, oven, heating blanket and heat exchanger (e.g. a tube heat exchanger or a shell heat exchanger. The heat exchanger for cooling the reaction mixture after may be a tube heat exchanger or a shell heat exchanger.

In some embodiments, a system is provided for fractionating biomass to form at least one of cellulose and xylose, and optionally lignin, comprising a module configured for fractionating biomass to form at least one of cellulose and xylose, and optionally lignin; and a reactant mixture including a biomass, water, a $C_1$-$C_5$ alcohol, and optionally $CO_2$.

In some embodiments, provided is a composition comprising a biomass, water and a $C_1$-$C_5$ alcohol. In some embodiments, the $C_1$-$C_5$ alcohol is a supercritical $C_1$-$C_5$ alcohol. Water and supercritical $C_1$-$C_5$ alcohol together form the reactive fluid for fractionating biomass. In some embodiments, the $C_1$-$C_5$ alcohol is selected from ethanol, methanol, butanol, or a combination of one of more of ethanol, methanol, and butanol. In some embodiments, the $C_1$-$C_5$ alcohol is ethanol. In some embodiments, the $C_1$-$C_5$ alcohol is methanol. In some embodiments, the $C_1$-$C_5$ alcohol is butanol. The $C_1$-$C_5$ alcohol may be, for example, about 1 wt % to about 99 wt % of the reactive fluid. In some embodiments, the $C_1$-$C_5$ alcohol is about 5 wt % to about 95 wt %, about 10 wt % to about 90 wt %, about 20 wt % to about 80 wt %, about 30 wt % to about 70 wt % or about 40 wt % to about 60 wt % of the reactive fluid. In some embodiments, the $C_1$-$C_5$ alcohol is at least about 10 wt %, at least about 20 wt %, at least about 30 wt %, at least about 40 wt %, at least about 50 wt %, at least about 60 wt %, at least about 70 wt %, at least about 80 wt %, at least about 90 wt % of the reactive fluid. In some embodiments, the $C_1$-$C_5$ alcohol is about 40 wt % to about 55 wt % of the reactive fluid. In some embodiments, the $C_1$-$C_5$ alcohol is about 30 wt % to about 55 wt % of the reactive fluid. In some embodiments, the water is about 1 wt % to about 99 wt % of the reactive fluid. In some embodiments, the water is 5 wt % to about 95 wt %, about 10 wt % to about 90 wt %, about 20 wt % to about 80 wt %, about 30 wt % to about 70 wt % or about 40 wt % to about 60 wt % of the reactive fluid. In some embodiments, the water is at least about 10 wt %, at least about 20 wt %, at least about 30 wt %, at least about 40 wt %, at least about 50 wt %, at least about 60 wt %, at least about 70 wt %, at least about 80 wt %, at least about 90 wt % of the reactive fluid. In some embodiments, the reactive fluid is essentially free of the $C_1$-$C_5$ alcohol. In some embodiments, the reactive fluid is essentially free of the water.

In some embodiments, provided is a composition comprising a biomass, water, a $C_1$-$C_5$ alcohol and optionally $CO_2$. In some embodiments, the $C_1$-$C_5$ alcohol and the optional $CO_2$ in the reactant mixture both are in supercritical state. In such instances, water, supercritical $C_1$-$C_5$ alcohol and the optional supercritical $CO_2$ together form the reactive fluid. In some embodiments, the reactive fluid does not comprise $CO_2$. In some embodiments, the reactive fluid comprises $CO_2$. When present, the $CO_2$ may be, for example, about 5 wt % to about 40 wt % of the reactive fluid. In some embodiments, the $CO_2$ is about 5 wt % to about 20 wt % of the reactive fluid. In some embodiments, the $CO_2$ is about 5 wt % of the reactive fluid. In some embodiments, the aqueous alcoholic solution is saturated with $CO_2$. Generally, the aqueous alcoholic solution becomes saturated with $CO_2$ at about 5 wt % $CO_2$. In some embodiments, the reactant mixture does not comprise a mineral acid.

Fractionation of biomass such as a lignocellulosic biomass produces cellulose, xylose/XOS and lignin. Therefore, the invention provides compositions comprising a product produced by any of the processes described herein, such as a cellulose product, a xylose product (e.g. xylose/XOS), a lignin product, or a mixture thereof.

In some embodiments, the module configured for hydrolyzing cellulose to form glucose, and optionally fructose, comprises a reactor configured for contacting cellulose with a reactive fluid at a temperature and pressure above the critical point of carbon dioxide but at least one of the temperature and pressure of the fluid is beneath the critical temperature and pressure for water. In some embodiments, the module configured for hydrolyzing cellulose comprises a reactor configured for contacting cellulose with a reactive fluid at a temperature and pressure at, above or near the critical point water. In some embodiments, the reactor is configured for contacting cellulose with a reactive fluid at a temperature of up to about 250° C., about 300° C., about 350° C., about 375° C. or about 400° C. and a pressure of up to about 100 bar, about 150 bar, about 200 bar, about 250 bar, about 300 bar, or about 350 bar. In some embodiments, the module configured for hydrolyzing cellulose further comprises a heating device configured for heating the reactive fluid to the desired temperature and a back-pressure regulator located downstream of the reactor for maintaining the desired pressure. In some embodiments, the module may further comprise a heat exchanger configured for cooling a reaction located downstream of the reactor. In some embodiments, the module may further comprise a filtration device configured for separating solids and particulate matters from liquids in a reaction mixture, such as a high-pressure filter. In some embodiments, the module may further comprise a second reactor configured for solubilizing cellulose in a reactive fluid at a temperature and pressure above the critical point of carbon dioxide but at least one of the temperature and pressure at, above or near the critical point water.

In some embodiments, a system is provided for hydrolyzing cellulose to form glucose, and optionally fructose, comprising a module configured for hydrolyzing cellulose to form glucose, and optionally fructose; and a composition comprising cellulose and/or glucose, water, and optionally $CO_2$.

In some embodiments, provided is a composition comprising cellulose and/or glucose in a mixture of carbon dioxide and water at a temperature and pressure above the critical point for carbon dioxide and below the critical point for water. In some embodiments, the composition comprises cellulose, $CO_2$ and water at about 100° C. to about 375° C. In some embodiments, the composition comprises cellulose, $CO_2$ and water at about 100° C. to about 300° C. In some embodiments, the composition comprises cellulose, $CO_2$ and water at about 200° C. to about 375° C. In some embodiments, the composition comprises cellulose, $CO_2$ and water at about 100° C. to about 375° C. and about 100 to about 350 bars. In some embodiments, the composition comprises about 3 wt % to about 5 wt % cellulose. In some embodiments, the composition comprises cellulose, glucose, $CO_2$ and water at about 100° C. to about 375° C. In some embodiments, the composition comprises cellulose, glucose, $CO_2$ and water at about 100° C. to about 375° C., about 100° C. to about 300° C., 200° C. to about 375° C. In some embodiments, the composition comprises cellulose, glucose, $CO_2$ and water at about 100° C. to about 375° C. and about 100 to about 350 bars. In some embodiments, the composition comprises glucose, $CO_2$ and water at about 100° C. to about 375° C. and about 100 to about 350 bars. In various embodiments, the composition may comprise, for example, about 5 wt % to about 20 wt % $CO_2$.

In some embodiments, provided is a composition comprising a product of cellulose hydrolysis following any of the process for hydrolyzing cellulose or any variations thereof described herein. In some embodiments, the composition comprises a glucose product produced in a process for hydrolyzing cellulose or any variations thereof described. In some embodiments, the composition comprises a fructose product produced in a process for hydrolyzing cellulose or any variations thereof described. In some embodiments, the composition comprises a glucose product and a fructose product produced in a process for hydrolyzing cellulose or any variations thereof described.

In some embodiments, the module configured for dehydrating xylose or hydrolyzing xylose/XOS to form furfural, comprises a reactor configured for contacting cellulose with a reactive fluid at a temperature and pressure above the critical point of carbon dioxide but at least one of the temperature and pressure of the fluid is beneath the critical temperature and pressure for water. In some embodiments, the reactor is configured for contacting xylose/XOS with a reactive fluid at a temperature of up to about 250° C., about 300° C., about 350° C., about 375° C. or about 400° C. and a pressure of up to about 100 bar, about 150 bar, about 200 bar, about 250 bar, about 300 bar, or about 350 bar. In some embodiments, the module configured for dehydrating xylose further comprises a heating device configured for heating the reactive fluid to the desired temperature and a back-pressure regulator located downstream of the reactor for maintaining the desired pressure. In some embodiments, the module may further comprise a heat exchanger configured for cooling a reaction located downstream of the reactor. In some embodiments, the module may further comprise a condenser device configured for condensing and collecting a volatile product (e.g. furfural) in a reaction mixture, such as a cold trap cooled with e.g. cold water, ice or dry ice.

In some embodiments, a system is provided for dehydrating xylose or hydrolyzing xylose/XOS to form furfural, comprising a module configured for dehydrating xylose or hydrolyzing xylose/XOS to form furfural; and a composition comprising xylose and/or furfural, water, and optionally $CO_2$.

Also provided are various compositions such as xylose in sub-critical water and xylose in a fluid containing water and carbon dioxide in which the fluid has a temperature and pressure above a critical point of carbon dioxide but at least one of the temperature and pressure of the fluid is beneath the critical temperature and pressure for water. In some embodiments, the composition comprises xylose/XOS and sub-critical water, e.g. xylose/XOS and water at about 100° C. to about 300° C. In some embodiments, the composition comprises xylose/XOS and water at a pressure of about 100 to about 350 bars. In some embodiments, the composition comprises xylose/XOS and sub-critical water at about 100° C. to about 300° C. and about 100 to about 350 bars. In some embodiments, the composition comprises about 3 wt % to about 25 wt %, about 3 wt % to about 15 wt %, about 5 wt % to about 15 wt % xylose/XOS. In some embodiments, the composition comprises about 12 wt % xylose/XOS. In some embodiments, the composition comprises about 10 wt % xylose/XOS.

In some embodiments, provided is a composition comprising xylose/XOS, supercritical $CO_2$ and sub-critical water. In some embodiments, the composition comprises xylose/XOS, $CO_2$ and water at about 100° C. to about 300° C. In some embodiments, the composition comprises xylose/XOS, $CO_2$ and water at about 100° C. to about 300° C. and about 100 to about 350 bars. In some embodiments, the composition comprises about 3 wt % to about 25 wt %, about 3 wt % to about 15 wt %, about 5 wt % to about 15 wt % xylose/XOS. In some embodiments, the $CO_2$ concentration is low enough that the composition is a in a single phase. In some embodiments, the $CO_2$ concentration is such that the composition is in a two-phase system, comprising an aqueous phase and a $CO_2$-rich phase. For example, at 4 mol % $CO_2$, the composition may be present as a single phase. At about 40 mol % $CO_2$, the composition separates into two phases: a $CO_2$-rich phase and an aqueous phase. In various embodiments, the composition may comprise, for example, about 1 mol % to about 50 mol % $CO_2$, about 4 mol % to about 40 mol % $CO_2$, about 10 mol % to about 40 mol % $CO_2$, about 20 mol % to about 40 mol % $CO_2$, about 30 mol % to about 40 mol % $CO_2$.

In some embodiments, any of the modules described herein may further comprise additional apparatus such as vessels for holding the fluids or slurry, devices for monitoring the temperatures and pressures, and modules for date collection and safety controls.

The practice of this invention can be further understood by reference to the following examples, which are provided by way of illustration and are not intended to be limiting. Although exemplified by the conditions (e.g. temperature, pressure, time, etc.) and examples provided herein, the invention is not limited by the conditions and examples provided herein. The invention contemplates all suitable conditions that can be identified by routine optimization in light of the disclosures provided herein.

EXAMPLES

Example 1

A Semi-Batch Process for Biomass Fractionation

Corn stover was obtained from the National Renewable Energy Laboratory (NREL). The corn stover was processed using a grinder to produce 40 mesh corn stover. The 40 mesh particle size was found to be suitable for use in the laboratory-scale supercritical fluid extraction process.

Figure 2A:
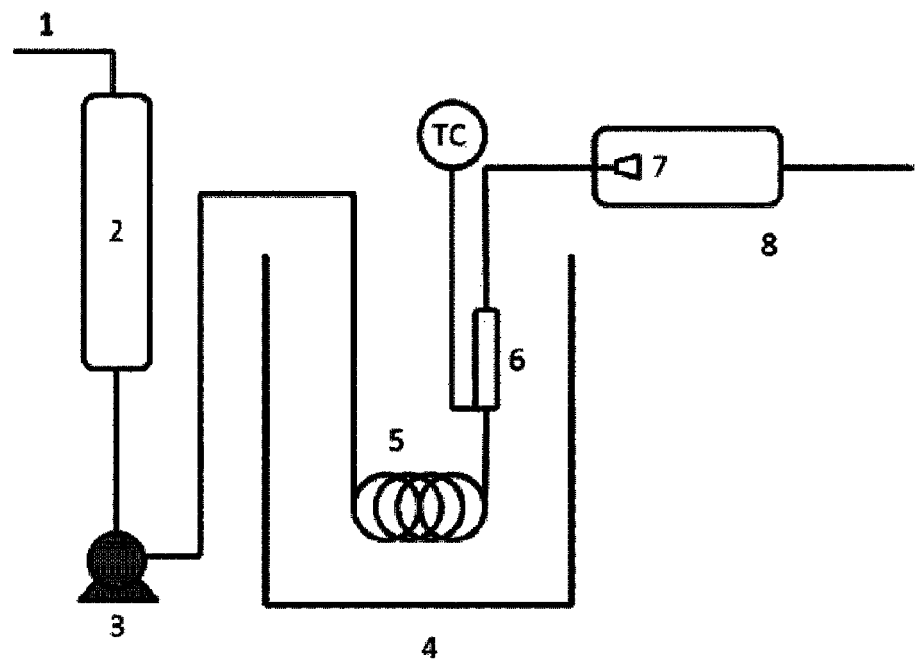
FIG. 2A depicts a schematic of the experimental setup for one embodiment of a semi-batch process. (1) $CO_2$ source (2) Ethanol or Ethanol/Water reservoir (3) HPLC pump (4) Heated sand bath (5) Preheating coil (6) Feedstock packed bed (7) Expansion nozzle (8) Product containment/collection; (TC) thermocouple.
Figure 2B:
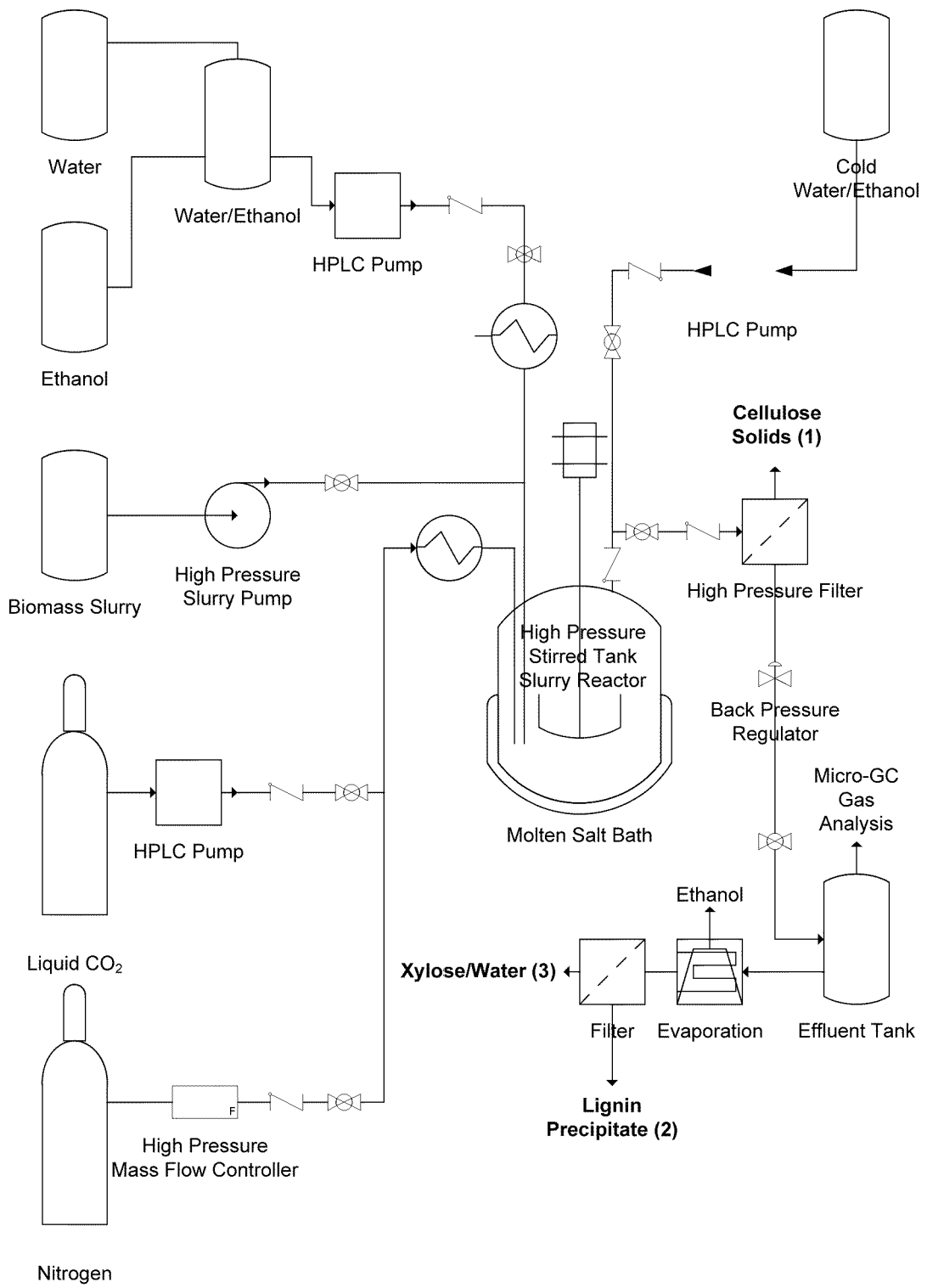
FIG. 2B depicts one embodiment of a reactor system for continuous biomass fractionation.

Treatment of corn stover with supercritical ethanol-$CO_2$ mixtures was carried out using a semi-batch reactor (see FIG. 2A). The corn stover was held in the bed 6 by a 20 micron sintered metal frit placed at the downstream end of the bed. During sand bath 4 heating up, the system was purged with nitrogen. Once at the desired temperature, ethanol/$CO_2$ flow from the reservoir 2 was started using the HPLC pump 3, passing first through a preheating coil 5, and then through the corn stover. Solvent temperature was monitored at the bed entrance by a thermocouple. After passing through the corn stover, the solvent was expanded through a nozzle 7 to atmospheric pressure, which quenched the reaction.

For each run, corn stover was loaded into the packed bed reactor 6. The reactor assembly was placed in the sand bath 4. The sand bath 4 was heated to 264° C., during which time the reactor 6 was purged with flowing nitrogen. Heating up time was in the range of 200-230 minutes. Once at 264° C., the transfer line heat tracing was brought to 250° C. The nitrogen flow was stopped and the HPLC pump was started. The system was brought to a pressure of 1100 psig (except where noted below) and the pump flow rate was adjusted to give a constant system pressure. Extraction of the corn stover was carried out for a period of 20 minutes, after which the pump was stopped and the system was allowed to depressurize. Once the system pressure dropped to below 300 psig, the nitrogen flow was restarted and the system was cooled to room temperature. Preparation and testing of several nozzles led to selection of one which provided a suitable pressure drop at the desired flow rates. The expansion nozzle 7 was fabricated from a Swagelok tubing which was modified by pinching to produce a suitable pressure restriction.

Following the extraction, any solids remaining in the packed bed were recovered and massed. The product solutions recovered during extraction were evaporated to dryness at ~50° C. in room air. The solid residue was washed with 20 mL of warm water. This water soluble portion was added to a sample container and evaporated to dryness at 110° C. The water insoluble portion, comprising lignin, was re-dissolved in ethanol, added to a sample container, and evaporated to dryness at 110° C. These two solid fractions comprise the water soluble and ethanol soluble fractions, respectively.

Run 1—Supercritical Ethanol and Supercritical $CO_2$

The ethanol was held under 300 psig $CO_2$ pressure overnight before the reaction. Using a flow rate of 5.4 mL liquid/min a constant system pressure of 1200 psig was achieved. Product was observed almost immediately as an amber colored solution in the condenser. Extraction continued for 20 minutes. The solid recovered from the packed bed (primarily cellulose) was darker than the starting material, but appeared to have the same particle size and was free flowing. Results are given in Table 1.

TABLE 1

Experimental results showing corn stover load and various solids recovered

| Run | 1 |
|---|---|
| Solvent | scEtOH/sc$CO_2$ |
| Corn Stover Loaded (g) | 0.3064 |
| Recovered solids left over in bed (g) | 0.1919 |
| Extract (wt %) (EtOH and water soluble solid fractions) | 37.4 |
| Ethanol Soluble (g) | * |
| Water Soluble (g) | * |

*Amounts not measured. The calculated sum of ethanol soluble and water soluble fractions is up to 0.1145 g.

Supercritical ethanol/$CO_2$ removed a significant amount of material from corn stover. About 37.4% of the initial mass of corn stover appeared in the ethanol-soluble and water-soluble fractions of the extract. The ethanol soluble fraction component was confirmed to be lignin using GC-MS.

Example 2

A Batch Process for Biomass Fractionation

One set of experiments were done using a 1.2 ml batch reactor made of Swagelok stainless steel tube and Techne SB-2 fluidized sand bath. Corn stover (40 mesh size) was used for this set of experiments.

Calculated amounts of 40 mesh size corn stover (1 g dry basis VF), 3 g liquid (50/50 wt % mixture of water and ethanol) and 5-20 wt % dry ice (based on liquid weight) were taken into the Swagelok stainless steel tube. This tube was heated in a sand bath with varying temperature (180° C. to 320° C.) and pressure (75-80 bar) for various time intervals (0.17 min to 15 min). After the heat treatment, the reaction was quenched by immersing the tube into a water bath maintained at 25° C. The reaction product mixture obtained from this treatment was filtered to obtain a solid product comprising cellulose. The filtrate was evaporated in an oven maintained at 75° C. The residual solid obtained was added to water at 60° C., and the resulting solution filtered. This filtrate was analyzed by HPLC for xylose content, and the solid was analyzed by GC-MS for lignin content.

As shown in Table 2, the mass of corn stover solubilized (xylose and lignin) (as a % of theoretical) using different experimental conditions was tabulated against time, temperature, a constant liquid/solid (L/S) ratio (the EtOH/water/$CO_2$ liquid to corn stover solid), and the lignin fraction recovered.

TABLE 2

Experimental results showing mass solubilized and lignin fraction recovered at various temperatures and residence times

| S. No. | Temperature (° C.) | Residence Time (min) | L*/S ratio | Mass Solubilized as % theoretical | Lignin fraction recovered as % incoming biomass |
|---|---|---|---|---|---|
| 1 | 270 | 2 | 3 | 51.2 | 19.7 |
| 2 | 270 | 3 | 3 | 57.6 | 16.3 |
| 3 | 280 | 2 | 3 | 58.1 | 19 |
| 4 | 280 | 3 | 3 | 66.8 | 18.7 |
| 5 | 285 | 2 | 3 | 67.1 | 18.7 |
| 6 | 285 | 3 | 3 | 69.3 | 17.6 |
| 7 | 300 | 0.17 | 3 | 45.8 | 17.1 |
| 8 | 300 | 0.17 | 3 | 54.5 | 21.1 |
| 9 | 300 | 0.50 | 3 | 49.6 | 17.8 |
| 10 | 300 | 0.50 | 3 | 53.9 | 20.1 |
| 11 | 300 | 0.50 | 3 | 59.1 | 20.7 |
| 12 | 300 | 1 | 3 | 62.2 | 23.1 |
| 13 | 300 | 1 | 3 | 61.7 | 20.3 |

*Liquid was 5 wt % dry ice in a 50/50 mixture of water and ethanol

It was observed that around 270° C., the slope of mass solubilized vs. T increased. This may be due to undesirable cellulose degradation and loss from parasitic reactions. At 285° C. and 2-3 min, about 67-70% of mass was solubilized. Concentrations of $CO_2$ greater than that necessary to maintain saturation in the liquid phase (about 5%) had little effect on yields (data not shown). Temperatures above 300° C. at longer residence times yielded increasing decomposition of cellulose (data not shown).

The data in the following table were generated using similar methodology and corn stover as substrate. As expected, lower temperatures result in lower mass solubilized. Since cellulose content in corn stover is about 33%, about 67% mass solubilized is desired in this step. It is preferable to operate at a temperature of about 250° C. or more so that the length of time needed to extract products of interest from biomass is commercially feasible, and lower liquid to solid (L/S) ratios can be used.

TABLE 3

| Temperature, ° C. | Residence time, min | L/S ratio | $CO_2$ conc., wt % | Ethanol conc., wt % | Mass solubilized, % |
|---|---|---|---|---|---|
| 180 | 15 | 1 | 5 | 40 | 20.3 |
| 240 | 15 | 6 | 5 | 40 | 52.1 |
| 270 | 3 | 3 | 33 | 33 | 57.6 |
| 280 | 3 | 3 | 33 | 33 | 66.8 |
| 285 | 2 | 3 | 33 | 33 | 67.1 |
| 300 | 1 | 3 | 33 | 33 | 62.5 |
| 300 | 1.5 | 3 | 33 | 33 | 68.8 |
| 320 | 0.17 | 3 | 33 | 33 | 69.9 |
| 320 | 0.5 | 3 | 33 | 33 | 74.9 |

Example 3

Continuous Fractionation of Biomass-I

A high pressure, continuously stirred slurry reactor system is used for continuous fractionation of biomass (see FIG. 2B). The slurry reactor is of relatively large volume (100 ml) and operates at temperatures and pressures up to 350° C. and 1,100 psig. The reactor system is equipped with auxiliary systems including a high pressure process gas and liquid feeding system; a liquid product collection system; and a data monitoring and acquisition system. Samples of liquid and gas products are acquired continuously. Similar stirred reactors have been successfully used by other researchers to study hydrothermal processing of biomass (Osada M, Sato T, Watanabe M, Adschiri T, Arai K. "Low-Temperature Catalytic Gasification of Lignin and Cellulose with a Ruthenium Catalyst in Supercritical Water" *Energy Fuels* 2004, 18:327-333).

In this steady-state experimental setup, biomass is first mechanically treated to obtain a particle size of less than about 500 μm. Following this, biomass slurry (1-5 wt %) is prepared in an aqueous solution containing ethanol. Next, this slurry is fed to the reactor continuously by a high pressure slurry pump, and mixed with preheated water/ethanol solution that is fed by an HPLC pump before entering the reactor. This premix ensures that slurry reaches reaction temperature before entering the reactor. The slurry reactor is heated by a molten salt bath. Pressure is maintained by a back pressure regulator located downstream of the reactor. From another line, liquid $CO_2$ is fed directly to the reactor using an HPLC pump. Next, at the end of the reaction time, the effluent exiting the reactor is immediately quenched near the outlet by mixing with cold water/ethanol fed by another HPLC pump. This cooling reactor effluent is passed through a high pressure filter to remove solids, and the filtrate is collected in an effluent tank after passing through the back pressure regulator. Gas is sampled from the headspace and sent to GC for analysis. Ethanol is evaporated to precipitate lignin, which is isolated by filtration, and the remaining water comprising xylose is analyzed on an HPLC for identification and quantification of sugar products. The insoluble solid is analyzed and quantified for cellulose fiber content. Lignin is analyzed with GC-MS.

The experiments are done to develop kinetic data that are not available in the open literature. In non-isothermal Thermogravimetric Analysis (TGA) studies of biomass pyrolysis, which has some relationship to solvothermal processing, Rao and Sharma (Rao T R & Sharma A "Pyrolysis rates of biomass materials" *Energy* 1998, 23:973-978) showed that the reaction order with respect to the residual biomass fraction can vary from zero to two depending upon the temperature range of the reaction, which suggests that the reaction mechanism changes with temperature or with the procession of the process. The first experiments are aimed to establish the reaction order(s) and activation energies for the major solvothermal processes (hemicellulose hydrolysis and lignin depolymerization) as a function of temperature ranges for baseline liquid phase composition.

Because of the small particle size of biomass material (<500 μm), heat and mass transfer resistances are expected to be negligible, and the reactor is assumed to operate in the kinetic regime. This will allow development of kinetic data that can be used to design larger systems.

Example 4

A Flow-Through Process for Biomass Fractionation

Figure 3:
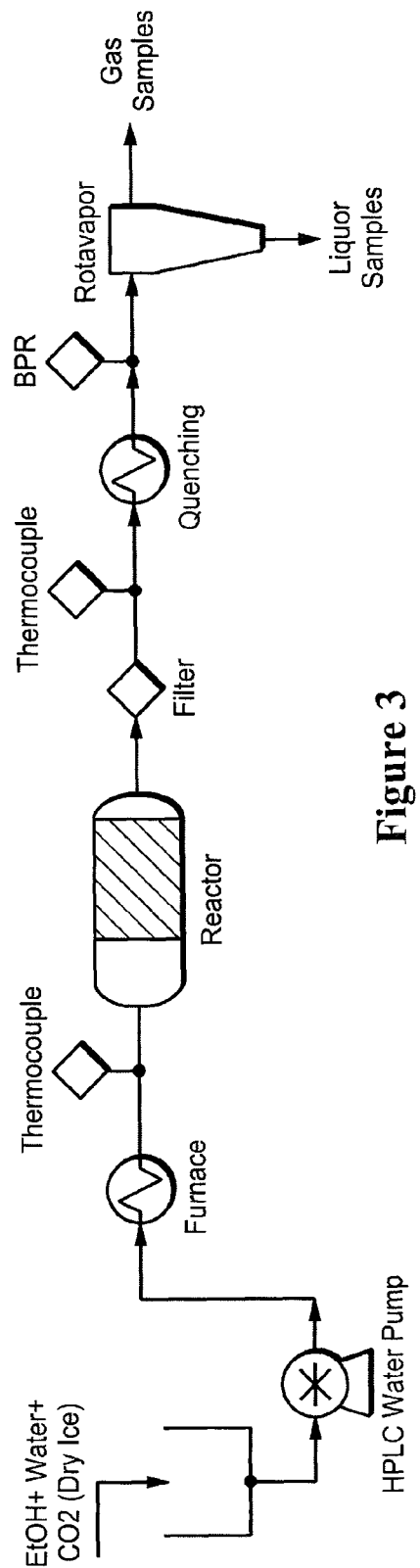
FIG. 3 depicts a schematic of the experimental setup for one embodiment of a single stage flow-through system using 50/50 wt % mixture of ethanol-water as solvent.

A single stage flow-through process is carried out using a high pressure tube reactor made of Swagelok stainless steel tube (see FIG. 3). The reactor volume is 13 ml and biomass used for this set of experiments is birch. Other equipments used for this experiment include ⅛$^{th}$ inch Swagelok stainless steel tube; HPLC water pump from Waters-510, furnace; 15 microns Swagelok filter; dry ice as a $CO_2$ supplier; band heater from Cole-Palmer and a Rotavapor.

Calculated amounts of ethanol/water mixture with 3 g liquid (50/50 wt % mixture of water and ethanol) and 5-20 wt % dry ice (based on liquid weight) were allowed to pass through the water pump and then taken into the ⅛$^{th}$ inch Swagelok stainless steel tube. The mixture flows at a flow rate of 5 ml/min through the tube and this tube was heated in a furnace with temperature rising from 25° C. to 200° C. and pressure is maintained at 1400-1500 psig. After the heat treatment through the furnace, this mixture is fed to the 13 ml reactor where calculated amount of birch (2 g dry basis) is present and is maintained at a particular temperature with the help of Cole-Palmer band heater. With this set up, the reaction time in the reactor is maintained at 2 min by taking biomass porosity of 0.4 into consideration for calculating this reaction time. For this set of experiments the samples were collected for reactor temperatures of 240° C., 250° C. and 260° C. These temperature and pressures are chosen for this experiment to allow the reaction to occur at supercritical conditions. The 13 ml reactor is followed by 15 micron size filter to restrict the flow of solids along with the liquor. After filtration, the obtained liquor is quenched to temperature 25-30° C. by immersing the tube in the water bath. The filtrate (liquid samples) are collected, evaporated in an oven at 75° C. and analyzed by HPLC for xylose and lignin content. This filtrate is also allowed to be analyzed in GC-MS for any furfural content. The sample collector is connected to a Rotavapor where any escaping gas is condensed by cooling water and is collected in the sampler. The residual solids is removed from the reactor was dried, added to water at 60° C. and the resulting solution is filtered and this filtrate is also analyzed by HPLC for cellulose content, lignin content and evaluate glucan purity of the remaining solids.

The data in the following table were generated for the single stage flow through experiments with similar methods and birch as a substrate. We can observe that as we increase the temperature, the lignin fraction recovered shows an increasing trend from 17-25% as ethanol acts as an extracting solvent. This also shows some interesting results in xylose and furfural contents ranging from 59-66%. Having done the entire solid and liquor analysis it is observed that 250° C. and 2 min reaction time gives better results in terms of solubility, glucan purity and xylose/furfural recovery.

TABLE 4

| | Sample No. | | |
|---|---|---|---|
| | 1 | 2 | 3 |
| Temperature (° C.) | 240 | 250 | 260 |
| Solubility (%) | 38.3 | 70.3 | 33.4 |
| Solids left (%) | 61.7 | 29.7 | 66.6 |
| Glucan purity (%) | 57.4 | 61.2 | 70.6 |
| Glucose recovery (%) | 56.9 | 47 | 61.1 |
| Xylose (%) | 55 | 56 | 61.2 |
| Xylose + Furfural (%) | 59 | 63.5 | 65.7 |
| Lignin fraction recovered as % incoming biomass | 17.5 | 21.2 | 24.5 |

Example 5

Continuous Fractionation of Biomass-II

Figure 4:
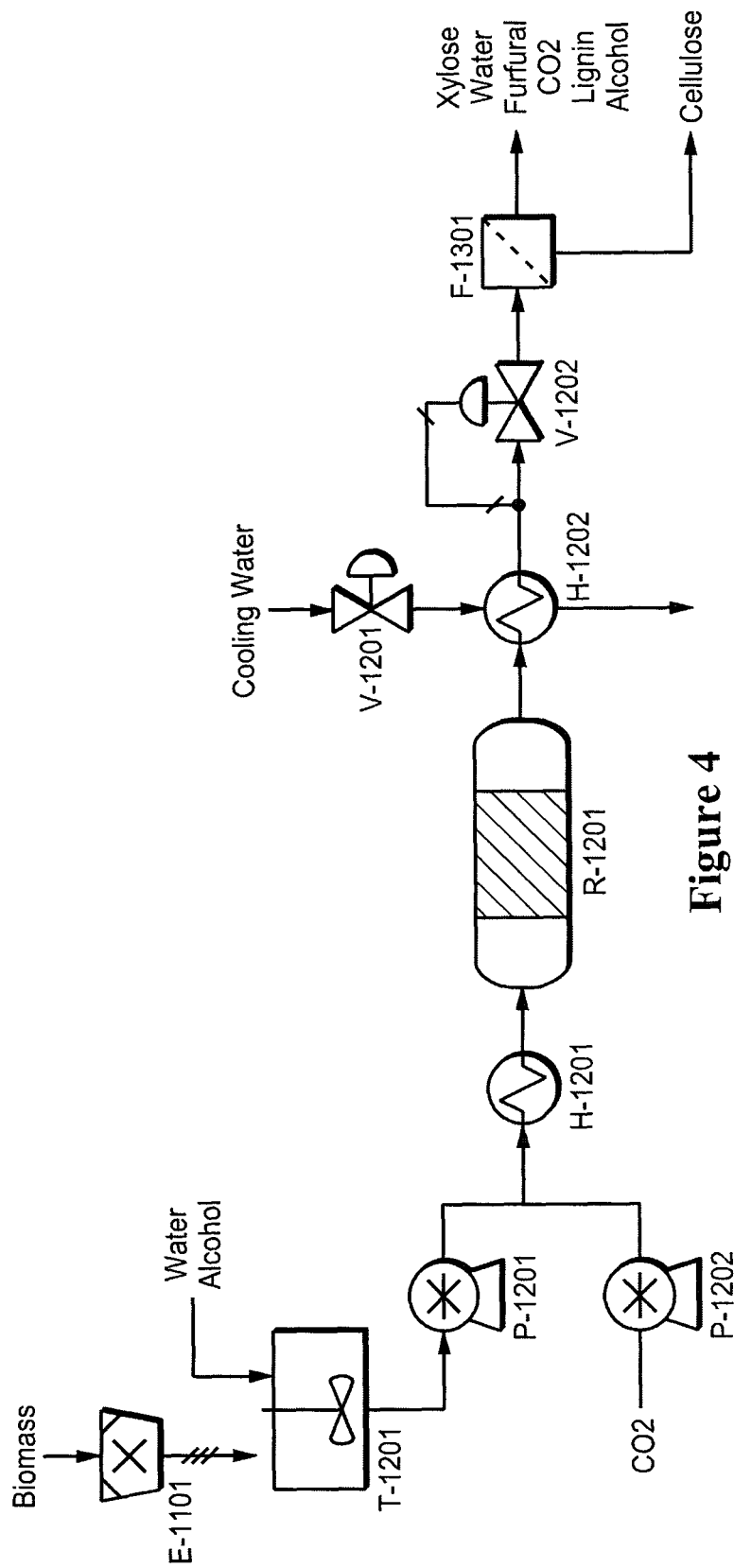
FIG. 4 depicts one embodiment of a reactor system for continuous biomass fractionation.

A high pressure, tube reactor system is used for continuous fractionation of biomass (see FIG. 4). The slurry reactor is of relatively large volume (700 ml) and operates at temperatures and pressures up to 300° C. and 1,500 psig. The reactor system is equipped with auxiliary systems including a high pressure process gas and liquid feeding system; and a solid and liquid product collection system. Samples of liquid and gas products are acquired continuously.

In this steady-state experimental setup, biomass is first mechanically treated to obtain a particle size of less than about 500 μm. Following this, biomass slurry (5-10 wt %) is prepared in an aqueous solution containing ethanol. Next, this slurry is fed to the heater continuously by a high pressure slurry pump From another line, liquid $CO_2$ is fed directly and mixed with the slurry stream using an high pressure pump. The slurry stream passes through a tube furnace which heats the slurry stream to reaction temperature before entering the reactor. The slurry reactor is heated by band heaters. Pressure is maintained by a back pressure regulator located downstream of the reactor. Next, at the end of the reaction time, the effluent exiting the reactor is immediately quenched by a cooling water heat exchanger. The cooled stream then passes though the back pressure regulator, after which the pressure reduces to ambient pressure. This reactor effluent is passed through a filter to remove and collect solids, and the filtrate is collected in an effluent tank. Gas is sampled from the headspace and sent to GC for analysis. Ethanol is evaporated to precipitate lignin, which is isolated by filtration, and the remaining water comprising xylose is analyzed on an HPLC for identification and quantification of sugar products. The insoluble solid is analyzed and quantified for cellulose fiber content. Lignin is analyzed with GC-MS.

The experiments are done to develop kinetic data that are not available in the open literature. In non-isothermal Thermogravimetric Analysis (TGA) studies of biomass pyrolysis, which has some relationship to solvothermal processing, Rao and Sharma (Rao T R & Sharma A "Pyrolysis rates of biomass materials" *Energy* 1998, 23:973-978) showed that the reaction order with respect to the residual biomass fraction can vary from zero to two depending upon the temperature range of the reaction, which suggests that the reaction mechanism changes with temperature or with the procession of the process. The first experiments are aimed to establish the reaction order(s) and activation energies for the major solvothermal processes (hemicellulose hydrolysis and lignin depolymerization) as a function of temperature ranges for baseline liquid phase composition.

Because of the small particle size of biomass material (<500 μm), heat and mass transfer resistances are expected to be negligible, and the reactor is assumed to operate in the kinetic regime. This will allow development of kinetic data that can be used to design larger systems.

Example 6

A Semi-Continuous Process for Cellulose Hydrolysis

Figure 6:
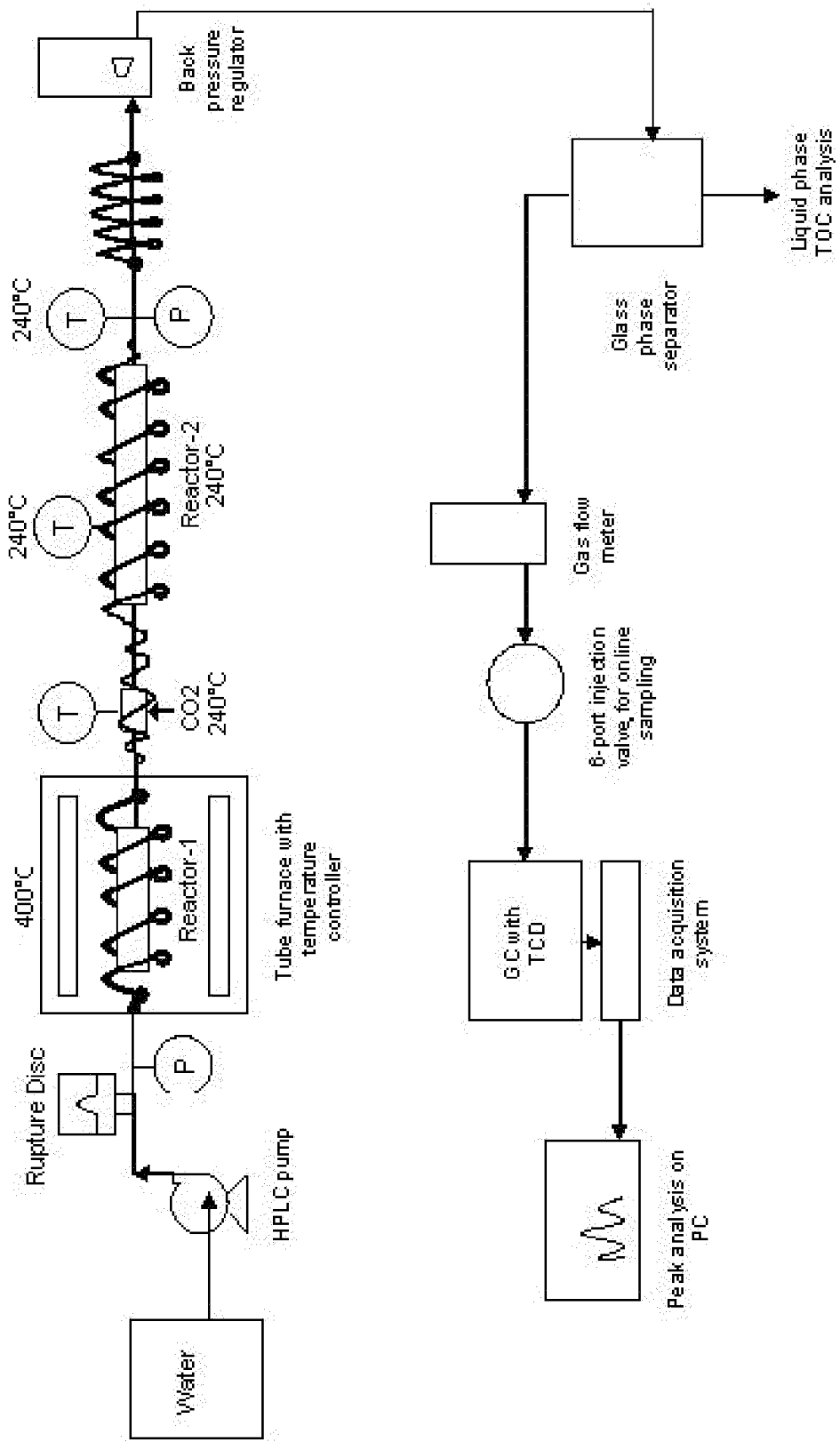
FIG. 6 depicts a schematic of an example of an apparatus used in a process for semi-continuous cellulose hydrolysis.

An apparatus for semi-continuous cellulose solubilization and hydrolysis was designed and constructed. A schematic of the apparatus is shown in FIG. 6.

Cellulose was packed in the first reactor, which was maintained at a constant temperature. Water was continuously pumped through the reactor to solubilize the cellulose and to carry the solubilized cellulose and water to the second reactor, in which $CO_2$ was added for hydrolysis. Formed products were continuously removed from the reactor, rapidly cooled and depressurized. The gaseous and liquid products were phase separated.

α-Cellulose fibers and bleached cotton (natural cellulose) were obtained from commercial sources. Cellulose from corn stover was produced using the process as described in U.S. Provisional Patent Application No. 61/081,337 filed on Jul. 16, 2008. Water was purified using a Barnstead NANOpure Infinity® purification system, and $CO_2$ was acquired from Airgas.

The reaction conditions were: 225 bar pressure, 10 mL volume Reactor-1, 2 mL volume Reactor-2, 375° C. for cellulose solubilization in an oven heated to 400° C., 1 second reaction time and 300° C. for cellulose hydrolysis (8 seconds reaction time).

Typically, Reactor-1 was packed with cellulose and placed inside the furnace, followed by the following steps: (i) Water flow started at desired flow rate using high pressure pump. (ii) Reactor-2 and inlet line of $CO_2$ heated to 300° C. (iii) $CO_2$ flow started at desired flow rate. (iv) After stabilizing the temperature of Reactor-2 at 300° C., the furnace to heat Reactor-1 to 375° C. was started. (v) Liquid product samples were collected at desired intervals from phase separator.

Sugar analysis was done using HPLC, using column Bio-Rad Aminex HPX-87P (Lead based column), RI detector, at 85° C., with water as the mobile phase. Known concentrations of glucose, fructose and cellobiose were injected in the column for calibration.

(a) Hydrolysis of Bleached Cotton (Natural Cellulose)

Three experiments were conducted using bleached cotton at the water flow rates of 5.0, 7.5 and 10.0 gm/min for the process conditions are shown in Table 5.

TABLE 5

Reaction conditions and maximum TOC observed for natural cellulose.

| Experiment ID | Initial mass of bleached cotton (mg) | Water inlet rate (g/min) | $CO_2$ inlet rate (g/min) | Residence time, (seconds) $\tau_1$ $\tau_2$ | | Maximum TOC observed (ppm) |
| --- | --- | --- | --- | --- | --- | --- |
| E111607 | 518.0 | 10 | 1 | 1.3 | 3.6 | 215 |
| E111907 | 647.0 | 5 | 2 | 3.1 | 4.4 | 4944 |
| E111907A | 491.1 | 7.5 | 2 | 1.6 | 3.6 | 297 |

For experiment E111907, liquid product with a surge in total organic compound (TOC obtained at 15 minutes, the liquid volume was 135 ml) was analyzed. This liquid contained glucose, cellobiose and traces of oligomers. Glucose and cellobiose concentrations were determined as 0.83 g/l and 0.27 g/l, respectively, which correspond to yields of 16% glucose and 5.3% cellobiose.

(b) Hydrolysis of α-Cellulose

Two experiments were conducted using α-cellulose fibers procured from Sigma-Aldrich with the following specifications: Product Number: C8002; Appearance: white to off-white powder; Bulk density (g/ml): 0.23 to 0.32; Mesh (% retained): max. 20.0; 100 mesh (% passing): min. 50.0; 200 mesh (% passing): min. 35.0.

For experiment no. E112807, reactor-1 dimensions were ¼" inner diameter (ID)×6" long. For experiment no. E113007, reactor-1 dimensions were 5/16" ID×4" long.

TABLE 6

Reaction conditions and maximum TOC observed for α-cellulose.

| Experiment ID | Initial mass of cellulose (mg) | Water inlet rate (g/min) | $CO_2$ inlet rate (g/min) | Residence time, (seconds) $\tau_1$ $\tau_2$ | | Maximum TOC observed (ppm) |
| --- | --- | --- | --- | --- | --- | --- |
| E112807 | 738.1 | 5 | 2 | 0.6 | 4.4 | 4388 |
| E113007 | 2004.1 | 5 | 2 | 3.8 | 4.4 | 3084 |

Dissolved solids in product solution were observed during both the experiments. These solids were filtered using Whatman paper, and the filtrate was analyzed in HPLC for glucose and cellobiose concentration.

TABLE 7

Results using α-cellulose.

| Experiment ID | Glucose conc. (g/l) | Cellobiose conc. (g/l) | Weight of dissolved solid (mg) | Volume of filtered product liquid (ml) |
| --- | --- | --- | --- | --- |
| E112807 | 1.36 | 0.39 | 87.00 | 25 |
| E113007 | 0.80 | 0.45 | 690.19 | 79 |

After the reaction in experiment E112807, about 10 wt % of the α-cellulose fibers were found as a solid residue in reactor-1. Liquid product of E113007 was colorless. Highest concentration of glucose, 1.52 g/l, was observed after 15 min, and the highest concentration of cellobiose, 0.94 g/l was observed after 10 min of the startup in the E113007 experiment.

(c) Hydrolysis of De-Lignified Corn Stover:

Two experiments, E 122107 and E 122207, were conducted using de-lignified corn stover produced using the process as described in U.S. Provisional Patent Application No. 61/081,337 filed on Jul. 16, 2008, the disclosure of which is incorporated herein by reference in its entirety. Volume of Reactor-1 was 5 ml and its dimensions were 5/16" ID×4" Long. True density of de-lignified corn stover was taken as 0.5 g/ml for residence time calculation.

TABLE 8

Reaction conditions and maximum TOC observed for de-lignified corn stover.

| Experiment ID | Initial mass of corn stover (mg) | Water inlet rate (g/min) | $CO_2$ inlet rate (g/min) | Residence time, (seconds) $\tau_1$ | $\tau_2$ | Maximum TOC observed (ppm) |
|---|---|---|---|---|---|---|
| E122107 | 1411.7 | 2 | 0.5 | 16 | 13.6 | 6731 |
| E122207 | 681.9 | 14 | 2 | 3.7 | 2.4 | 695.2 |

During experiment no. E122107, the pressure drop across the reactor was very high (about 1400 psi), so the water flow rate could not be increased more than 2 ml/min. Product came out as a dark brown solution in first 30 min of operation. After opening the Reactor-1, no solid residue was observed. The biomass was completely liquefied in first 30 min of operation.

In experiment E122207, TOC rise was observed in first 25 min of operation, and then it came down to 300 ppm level. After opening the Reactor-1, more than 50% of biomass was found to be unreacted. The solid residue was weighed after drying at 105° C. The reacted biomass was determined to be 279.76 mg (about 40% by weight of original mass). The liquid product was almost colorless and its volume was 260 ml. No dissolved solids were observed in the product.

Significant amount of cellulose came out as dissolved solids, when α-cellulose fibers were used for the experiments. After de-lignification, liquefaction of corn stover is observed to be faster and total organic compounds (TOC) starts rising just after 5 minutes. As the reaction proceeds, the void volume in the reactor changes continuously, changing the residence time in the semi-continuous experiments.

Example 7

Figure 7:
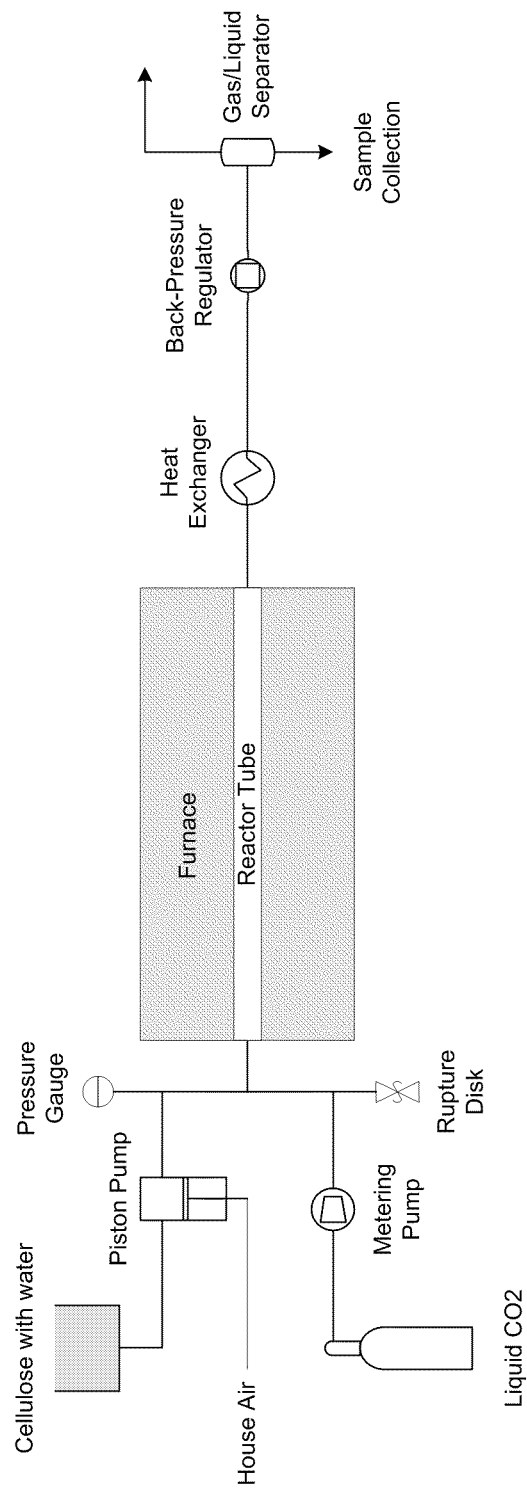
FIG. 7 depicts a schematic of an example of an apparatus used in a continuous cellulose hydrolysis process.

A Continuous Process for Cellulose Hydrolysis (a) A Continuous Process:

An apparatus for cellulose hydrolysis was designed and constructed (see schematic in FIG. 7). This apparatus both dissolved and hydrolyzed cellulose to produce sugars.

The process conditions were: 225 bar pressure, 10 mL reactor, and 300° C. for cellulose solubilization. The residence time (reaction time) is 10 seconds.

Typically, the reactor was placed inside the furnace, followed by the following steps: (i) Reactor and inlet line of $CO_2$ was heated to 300° C.; (ii) Cellulose slurry (4-5 wt % cellulose in water) was started at desired flow rate using piston pump; (iii) $CO_2$ flow was started at desired flow rate; (iv) Mixture was flowed through the reactor tube and then cooled to room temperature; (v) Liquid product samples were collected at desired intervals from the phase separator.

Figure 8:
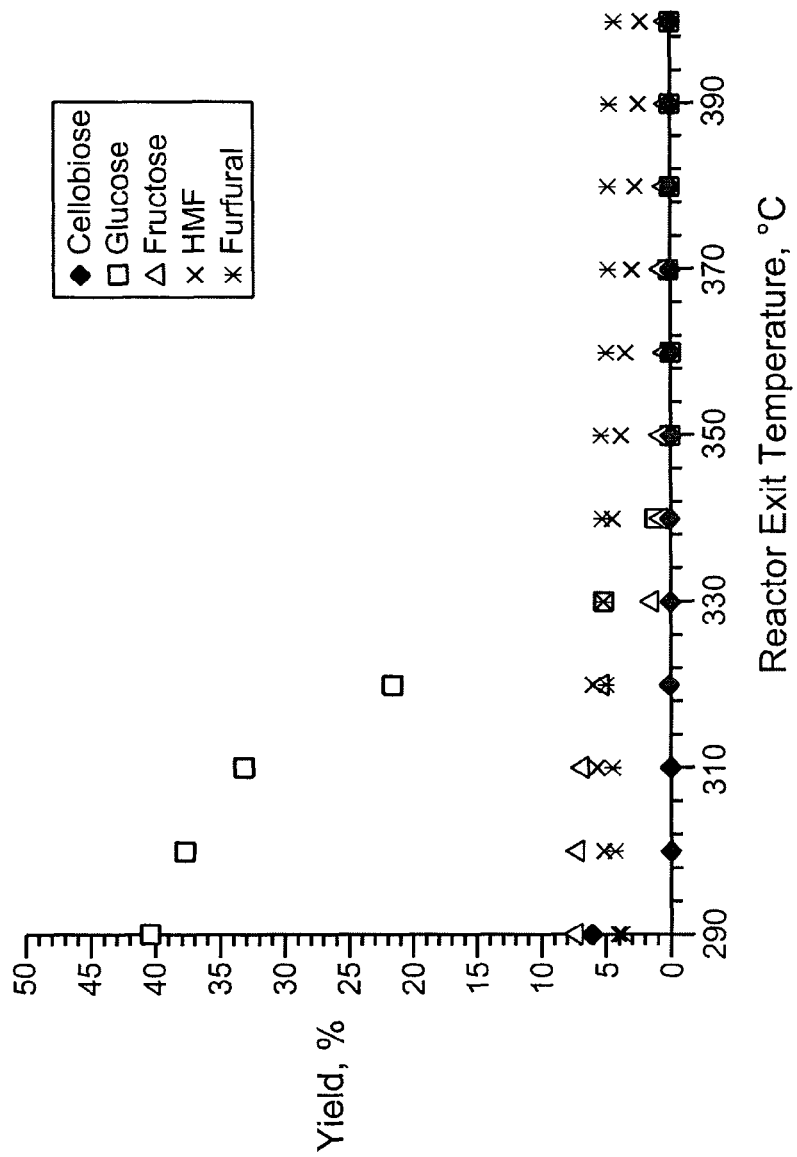
FIG. 8 is a graph of the yields from the continuous flow carbonic hydrothermal treatment of cellulose for different reactor exit temperatures; residence time is approximately 12 s.

The sugar analysis was done using HPLC using column Bio-Rad Aminex HPX-87P (Lead based column), RI detector, at 85° C., with water as the mobile phase. Known concentrations of glucose, fructose and cellobiose were injected in the column for calibration. The results suggest that $CO_2$ catalyzes the hydrolysis of cellulose without affecting the glucose decomposition reactions. FIG. 8 shows the percentage of yield of sugars for different reaction temperature.

Carbonic hydrothermal treatment of cellulose is a promising method for the production of glucose and fructose. The combination of supercritical $CO_2$ and water significantly improved the glucose yield at lower temperatures while the yields of other species remained about the same.

(b) Hydrolysis of Cellulose Derived from Woody Biomass:

Cellulose derived from woody biomass was used as substrate (containing 73% glucan) in a continuous cellulose hydrolysis process. This example involved hydrolyzing the cellulose using supercritical carbon dioxide and supercritical water at about 371-377° C. and about 225 bar for about 0.12-0.3 seconds (based on water density at process conditions). A slurry of cellulose in water was mixed with $CO_2$; the mixture was heated in a furnace to a pre-set temperature between 220° C. to 280° C. before fed to the reactor, which is heated using a heating jacket to about 371-377° C. At the end of the reaction time, the reaction was quenched and the products are analyzed. As the results below show, cellulose was solubilized and glucose monomers and oligomers were obtained. The glucose reported is the total of monomers and oligomers.

TABLE 9

Reaction conditions and maximum TOC observed for de-lignified corn stover.

| | Cellulose slurry temperature, ° C. | Final mixture temperature, ° C. | t, min | Mass solubilized, % | Glucose yield (incoming basis), % | Glucose yield (solubilized basis), % |
|---|---|---|---|---|---|---|
| 1 | 280 | 372 | 0.005 | 37.8 | 15 | 39.7 |
| 2 | 280 | 376.5 | 0.002 | 40.6 | 27 | 66.6 |
| 3 | 250 | 372.5 | 0.005 | 32.5 | 27.5 | 84.6 |
| 4 | 250 | 376.5 | 0.002 | 41 | 36.5 | 89.0 |
| 5 | 220 | 371 | 0.005 | 46 | 44 | 95.7 |
| 6 | 220 | 375 | 0.002 | 41 | 39 | 95.1 |

This shows successful demonstration of the first stage of cellulose hydrolysis. The un-solubilized cellulose can be processed further using a hydrolysis method described to improve yields.

Example 8

Solvo-Thermal Conversion of Xylose to Furfural

Xylose used in Examples 8-10 was purchased from Aldrich. Water was purified using a Barnstead NANOpure Infinity® purification system. $CO_2$ was acquired from Airgas.

Figure 10:
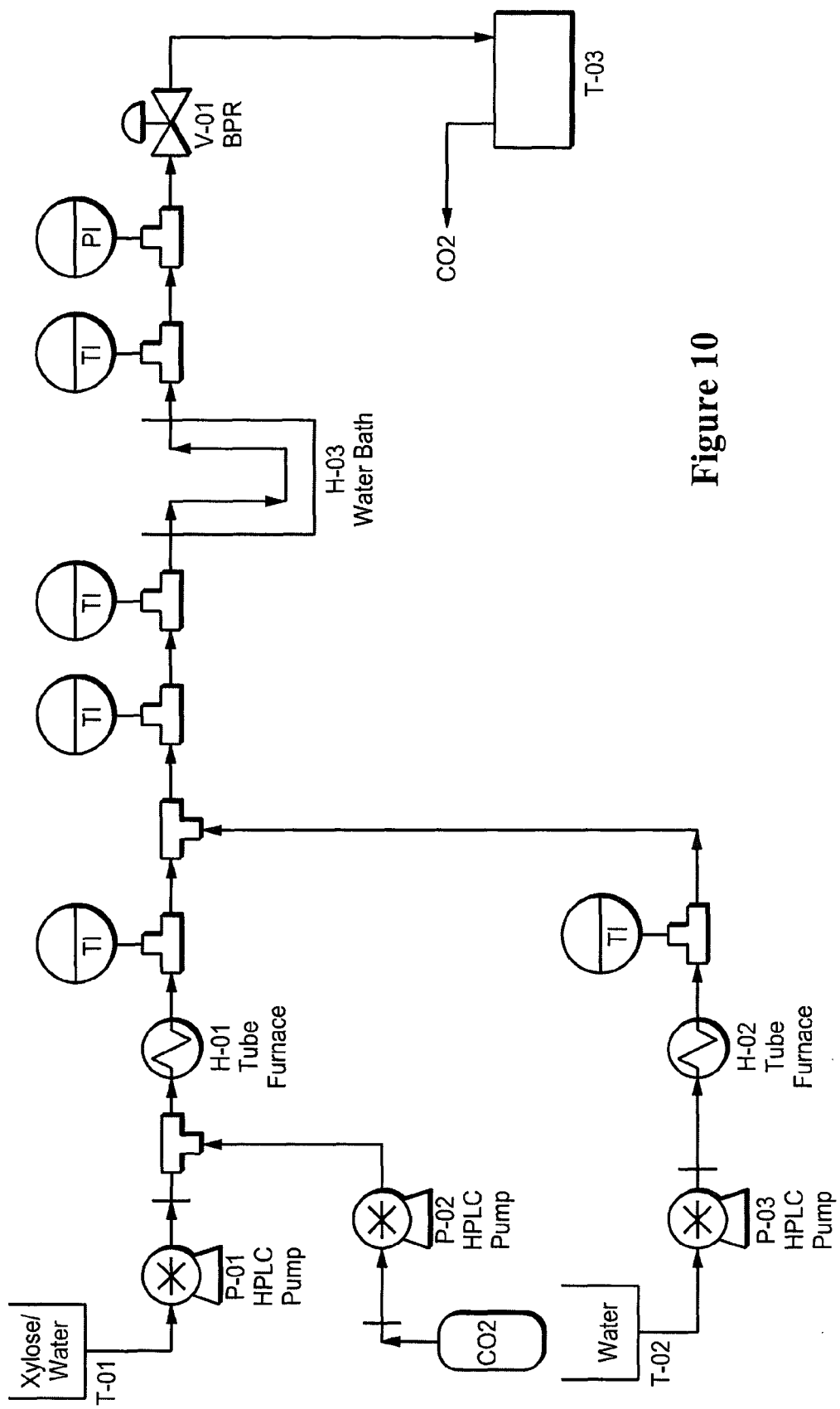
FIG. 10 is a schematic of an exemplary reactor apparatus for xylose hydrolysis.

FIG. 10 illustrates the use of a continuous reaction process. Xylose and water were added to tank T01 and mixed well. The gas cylinder contained liquid carbon dioxide. The xylose, water and carbon dioxide from two tanks T-01 and T-02 were pumped by High Pressure Pumps (P 01 & P 02). In this setup, the aqueous xylose solution (T01) and sub-critical or near-critical water (T02) were contacted by injection into the reactor. There was continuous monitoring of reaction temperature, pressure, and time. Reaction occurs at predetermined pressure and temperature conditions for desired residence time. After exiting, the stream was passed through a cooled water bath (H 03) to bring it to a necessary cooling temperature. Furfural was separated from the mixture using supercritical carbon dioxide extraction or other techniques, and collected in tank (T03) where unconverted xylose/water mixture was diverted for recycling back into the reaction process.

The above setup was used to study hydrothermal conversion of xylose. Xylose feed solution of 10 wt % in water was prepared. HPLC pumps were used to pump all streams. In reactions with $CO_2$, the $CO_2$ was mixed with the xylose feed stream.

Reaction products samples were filtered (using 0.2 μm syringe membrane filter) and analyzed using GC-MS. HPLC analysis was used to determine unconverted xylose with a Transgenomic® sugars column (maintained at 80° C.) and refractive index detector. The mobile phase was distilled water at a flow rate of 0.5 ml/min. Calibration curves were constructed for the compounds of interest, and concentrations of those species were determined for the various reaction conditions.

Example 9

Xylose Conversion and Furfural Yields

Figure 11:
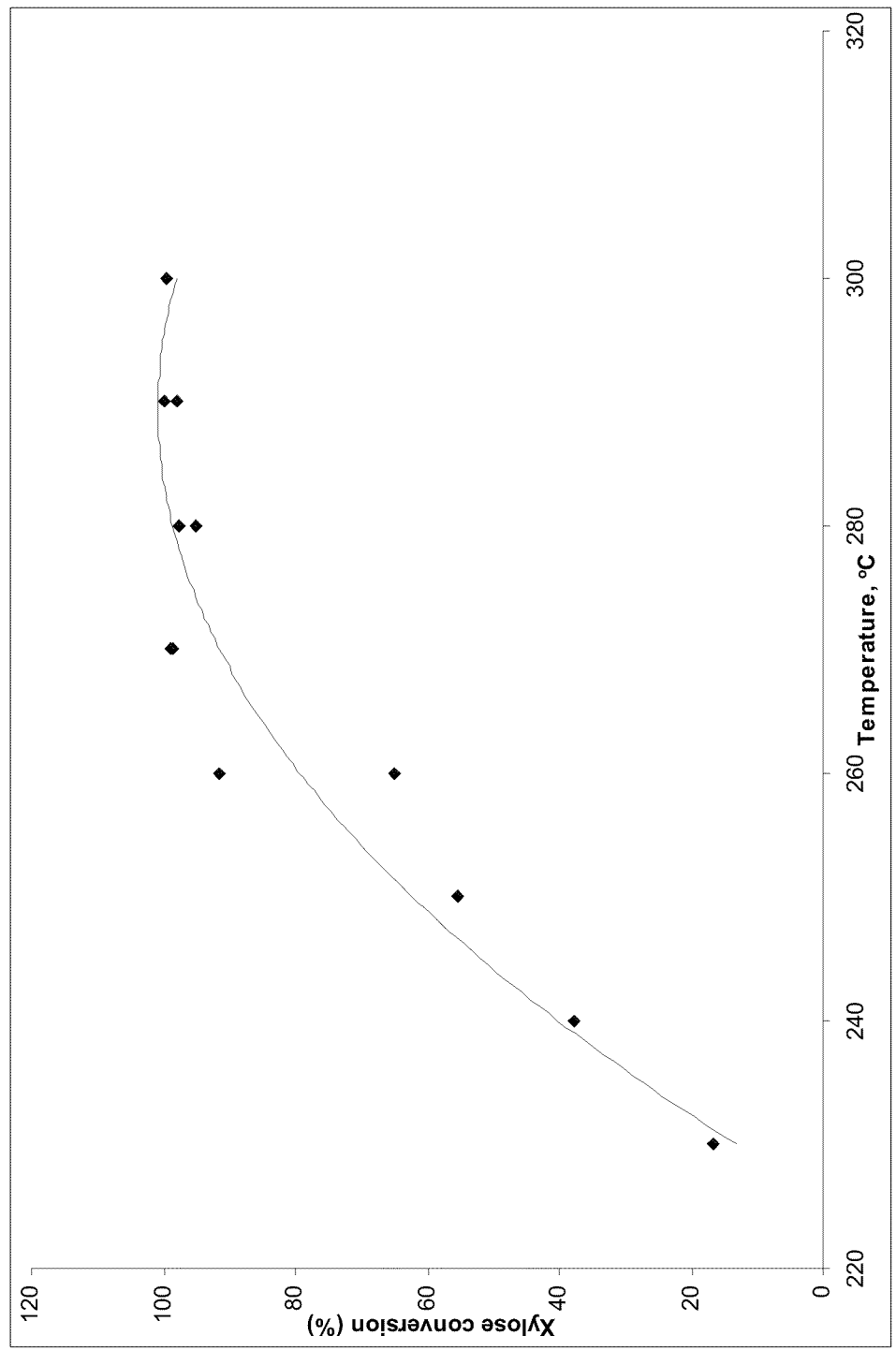
FIG. 11 is a plot of effect of temperature on the conversion of xylose.
Figure 12:
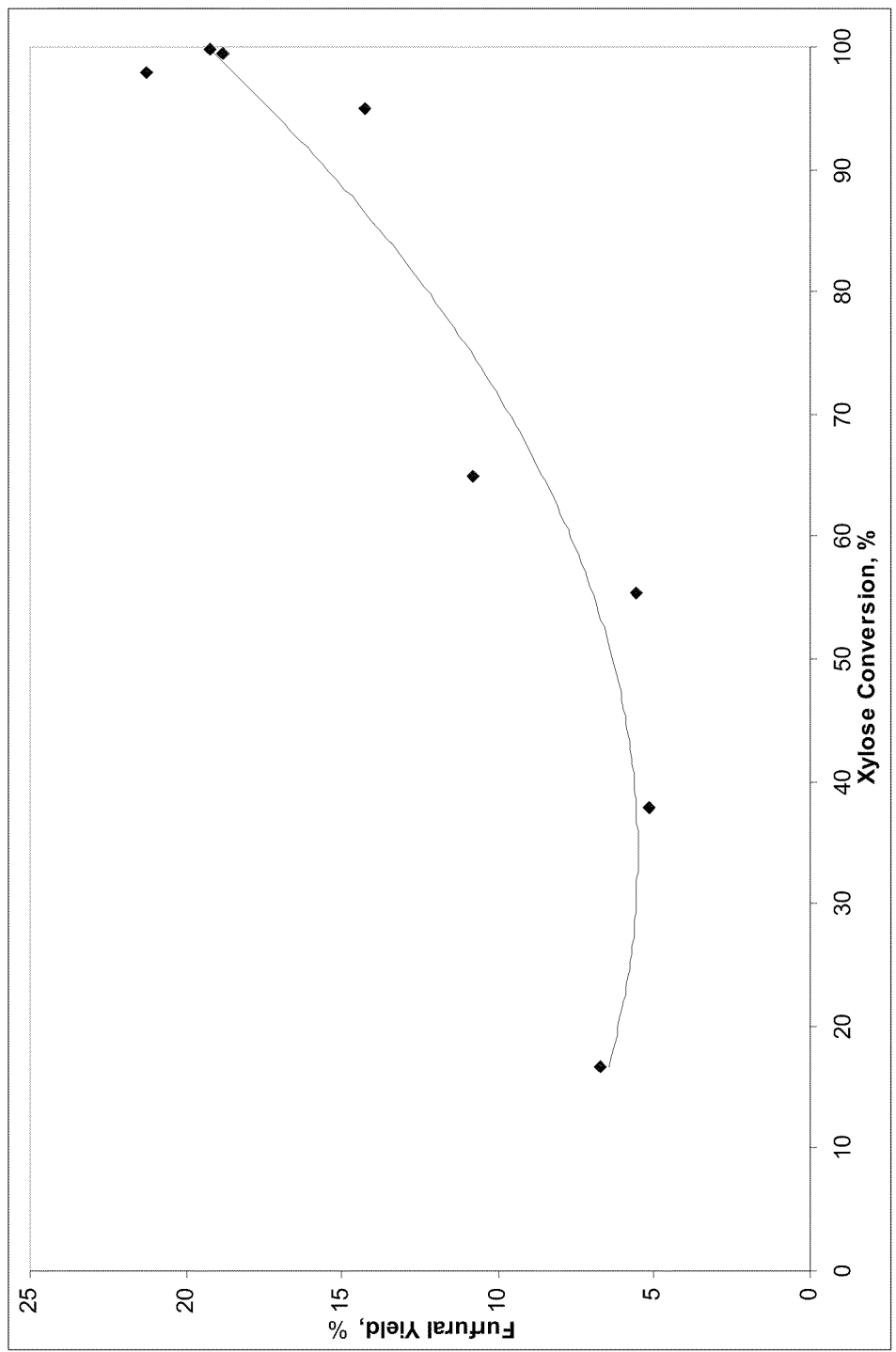
FIG. 12 is a plot showing the relationship between conversion of xylose and the furfural yield.
Figure 13:
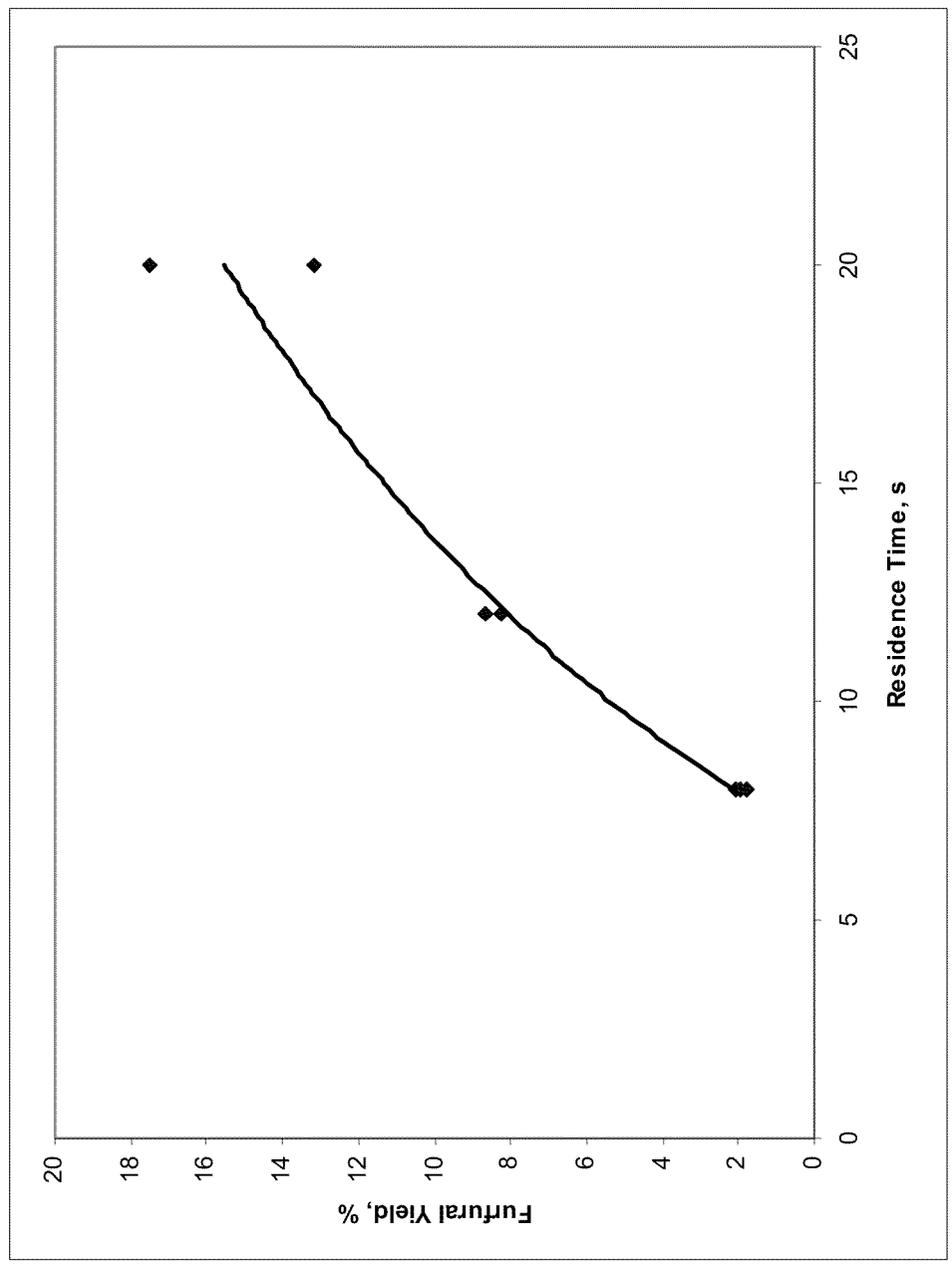
FIG. 13 is a plot of furfural yield at different residence times.
Figure 14:
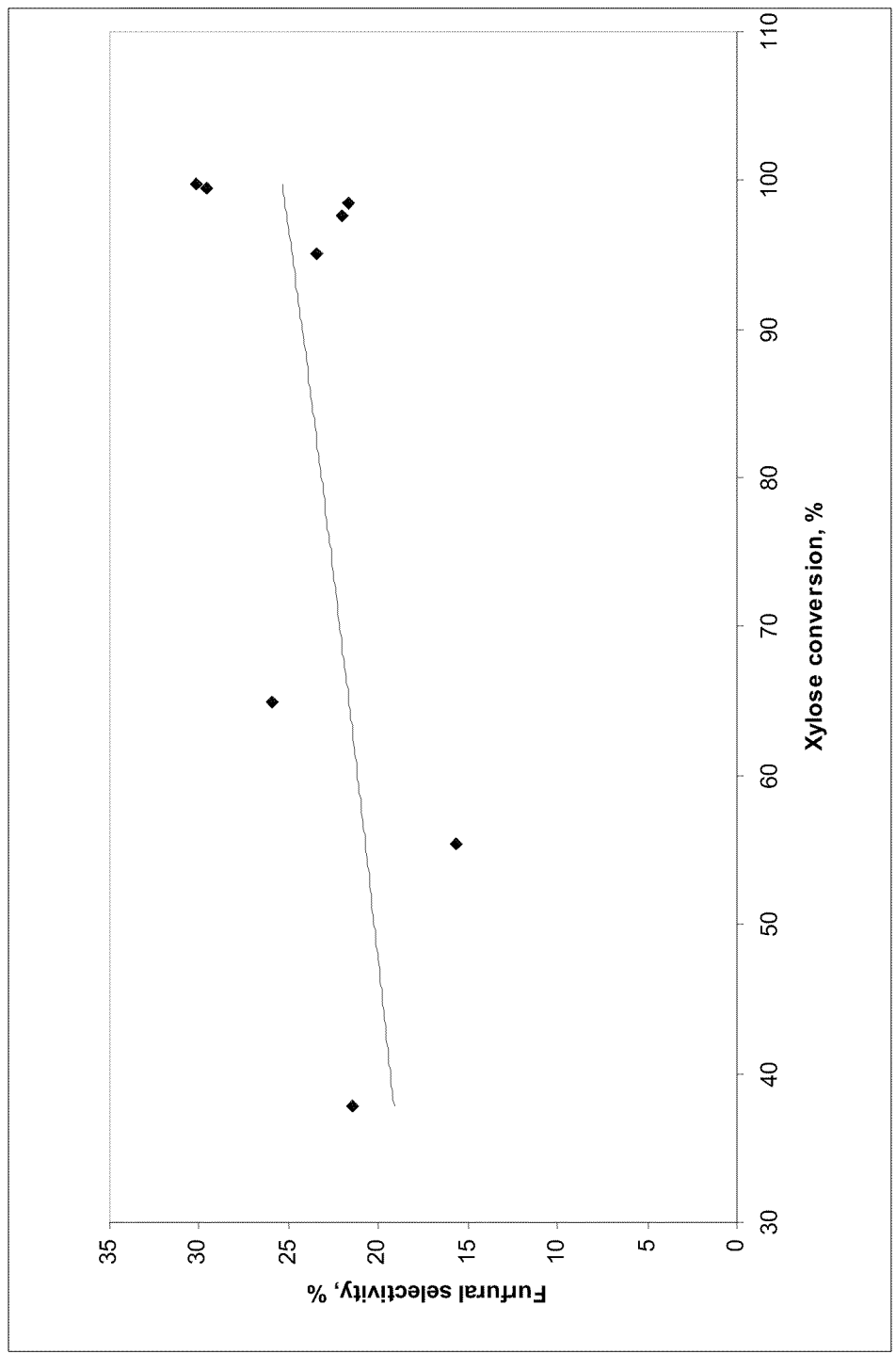
FIG. 14 is a plot of the selectivity toward furfural production versus xylose conversion.
Figure 15:
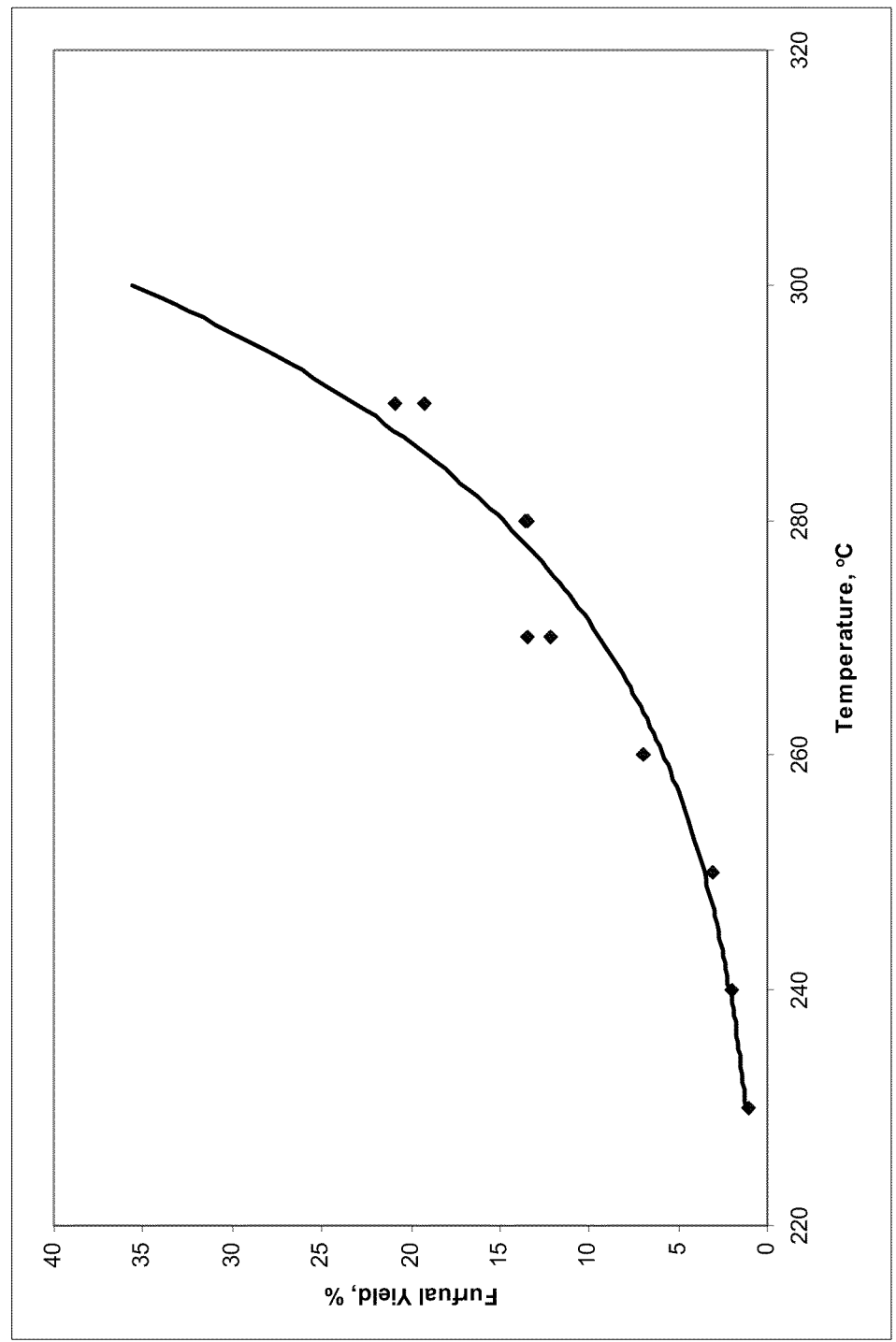
FIG. 15 shows the effect of temperature on the furfural yield (percentage of original xylose).
Figure 16:
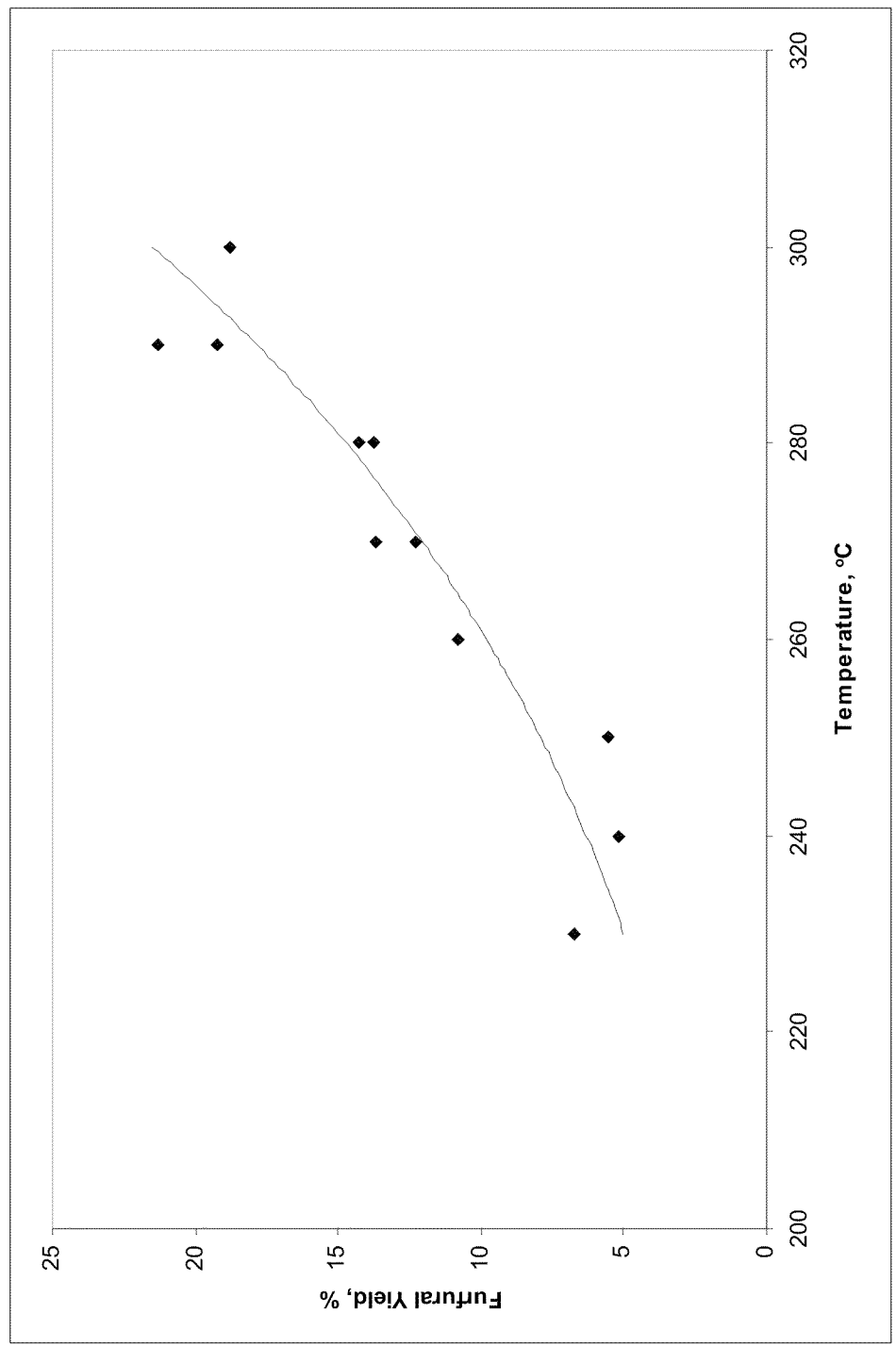
FIG. 16 is a plot of furfural yield (percentage of converted xylose) versus temperature.

FIG. 11 shows xylose conversion in water plotted against temperatures of 230° C. and 300° C., with zero residence time. Xylose conversion increased with the increase in the temperature and attained above 90% conversion at 270° C. Furfural yield also increased with xylose conversion as shown in FIG. 12. Furfural yield increased with increasing residence time from 4 to 20 s which is demonstrated in FIG. 13. The same trend was observed in a plot of the furfural selectivity versus xylose conversion (FIG. 14). The furfural yield also increased with temperature, which is shown as percentage of original xylose in FIG. 15 and percentage of converted xylose in FIG. 16. The yield and selectivity both increased with increasing xylose conversion, even as the xylose conversion neared 100% (FIGS. 12 and 14).

Example 10

Xylose Conversion with $CO_2$

Figure 17:
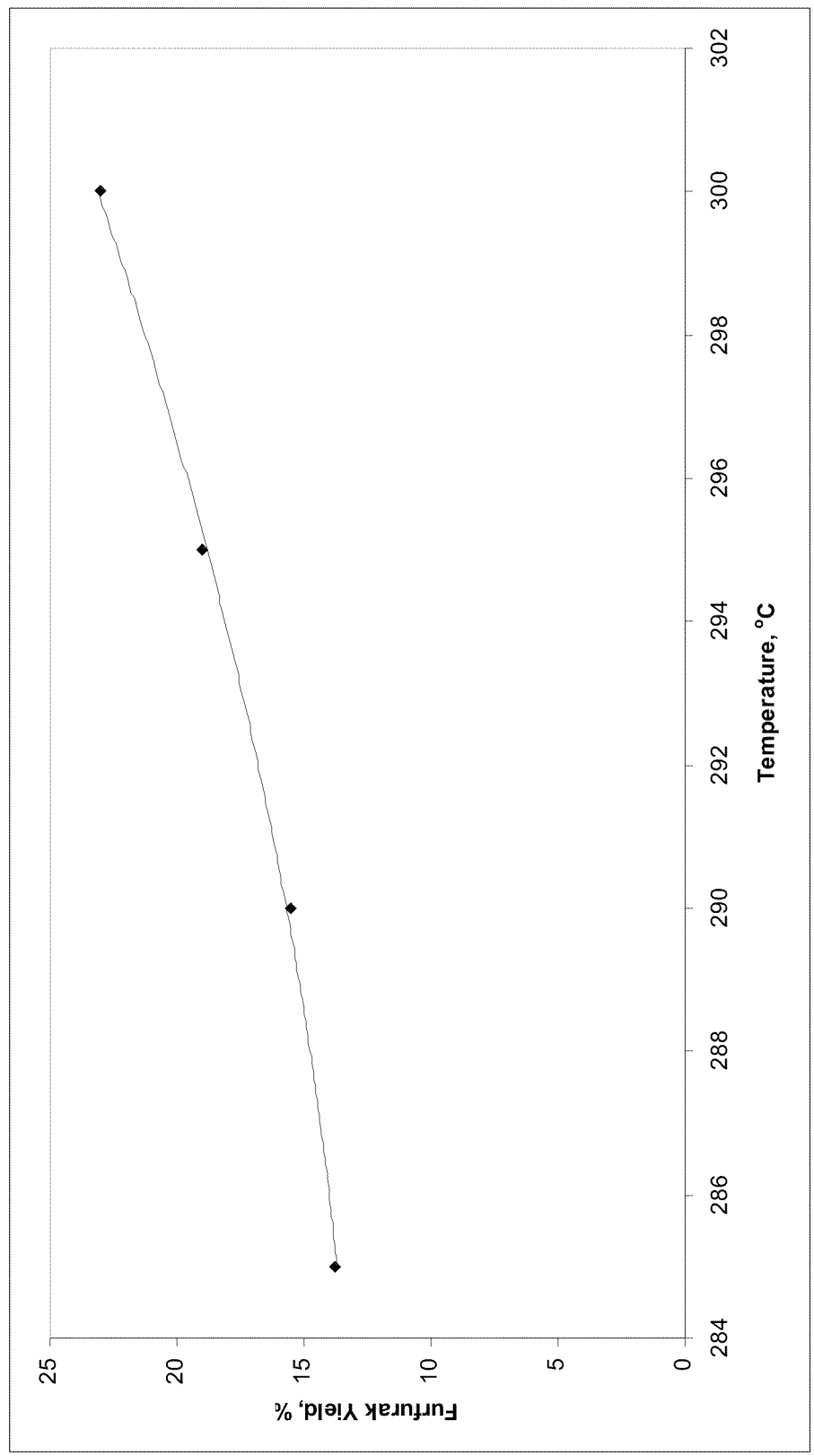
FIG. 17 is a plot of the furfural yield produced with carbon dioxide versus temperature.
Figure 18:
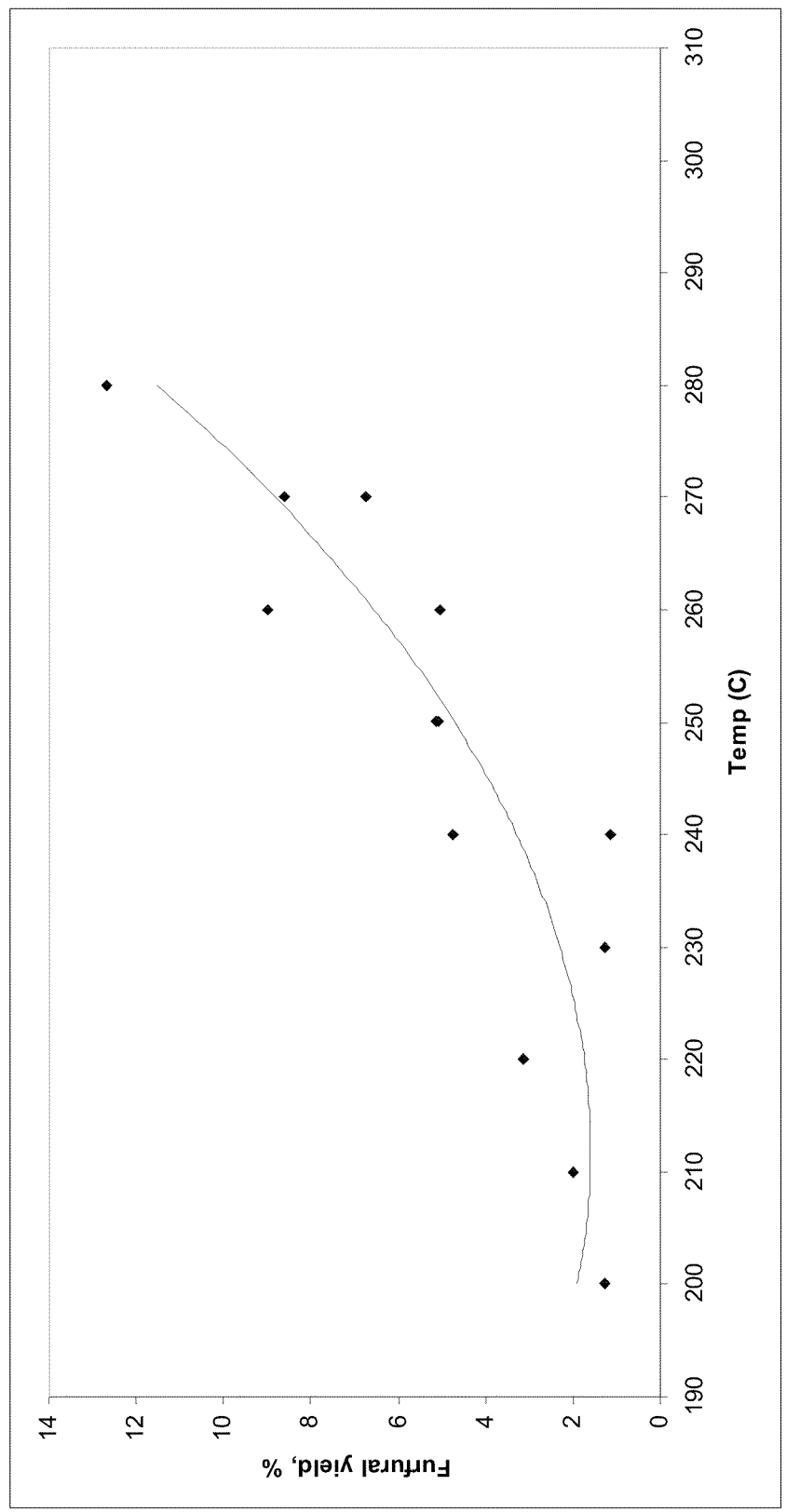
FIG. 18 is a plot of furfural yield produced without carbon dioxide versus temperature at zero residence time in a continuous system.

FIG. 17 shows data for xylose conversion with $CO_2$ addition. Addition of carbon dioxide increased furfural yield as indicated in FIG. 17 and compared to FIG. 18. Effect of carbon dioxide addition on furfural yield was also higher at higher temperatures. Furfural yield and selectivity increased with the addition of $CO_2$, indicating an enhancement of the desired reactions. The effect of $CO_2$ was investigated further in additional experiments with enough and excess $CO_2$. The results of these experiments revealed no significant differences between the two conditions for a given temperature. Furfural yield and selectivity both increased with residence time, with the higher $CO_2$ concentration yielding sharper increases.

Example 11

Conversion of Xylose from Biomass Fractionation with $CO_2$

Figure 19:
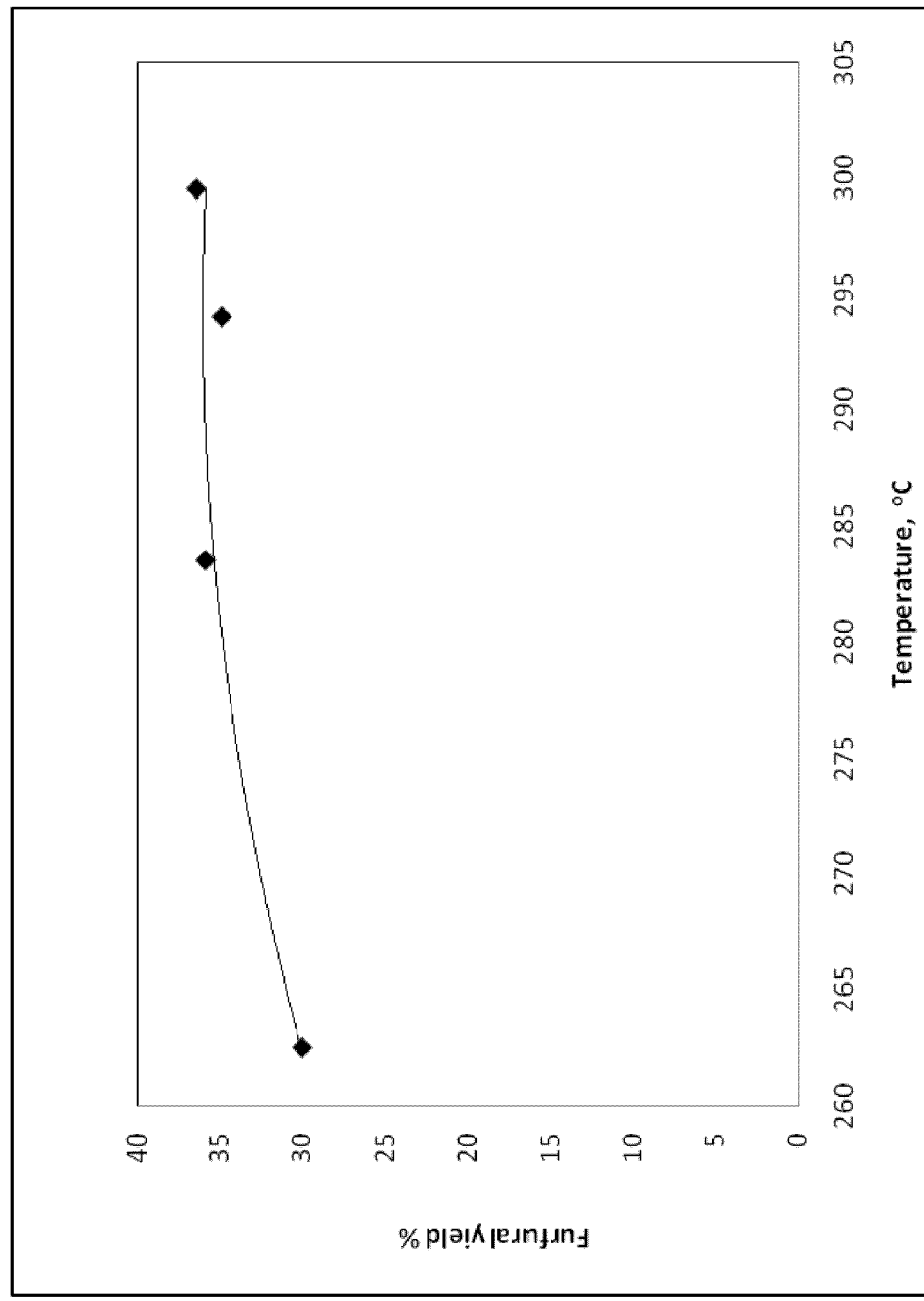
FIG. 19 is a plot of furfural yield from hydrolysis of xylose liquor from fractionation of lignocellulosic biomass, produced with carbon dioxide.

A xylose liquor from fractionation of lignocellulosic biomass as described above was converted to furfural with carbon dioxide. A correlation of the yields of furfural produced with the reaction temperature is shown in FIG. 19.

Example 12

Continuous Fractionation of Biomass in Two Stages (a) General Process
Schematic of the two-stage fractionation process is shown in FIG. 5. A high-pressure reactor system is used for continuous fractionation of biomass in two stages. The reactors operate at temperatures and pressures of up to 350° C. and 100 bar, respectively. The reactor systems are equipped with auxiliary systems, i.e., a high pressure process gas and liquid feeding system; a liquid product collection system; and a data monitoring and acquisition system.

In this experimental setup, biomass slurry is prepared in water. Next, this slurry is heated in a furnace and fed to the first stage reactor continuously by a high-pressure slurry pump. From another line, liquid $CO_2$ is fed directly into the slurry using a special $CO_2$ pump. The slurry reaches reaction temperature before entering the reactor. Pressure is maintained by a back pressure regulator located downstream of the reactor. At the end of reaction time, the effluent exiting the reactor is immediately quenched near the outlet by a heat exchanger. This cooled reactor effluent is passed through a high-pressure filter to remove solids and particulate matter, and the filtrate is collected in an effluent tank. This xylose-rich solution is analyzed on an HPLC for identification and quantification of sugar products.

The insoluble solids from the first stage are mixed with $C_1$-$C_5$ alcohol (e.g. ethanol or butanol) and then fed to the second stage reactor continuously by a high-pressure slurry pump and heated to reaction temperature before entering the reactor in a manner similar to that in the first stage. Pressure is maintained by a back pressure regulator located downstream of the reactor. At the end of reaction time, the effluent exiting the reactor is immediately quenched near the outlet by heat exchanger. This cooled reactor effluent is passed through a high pressure filter to remove solids and particulate matter, and the filtrate is collected in an effluent tank. The insoluble solids are analyzed and quantified for cellulose content. Lignin dissolved in the $C_1$-$C_5$ alcohol (e.g. ethanol or butanol) is precipitated by evaporating/distilling ethanol/butanol from the solution.
(b) Materials
The biomass feedstock used was hardwood flour (mix of oak and birch) from American Fiber, which contains ~36% glucan, ~17% xylan and ~32% lignin.

The two-stage fractionation was conducted in a pilot plant capable of processing 100 kg/d of dry biomass. An 8-10% hardwood flour slurry in water was processed in the first stage. The resultant solids from the first stage were fed to the second stage as 8-10% slurry in butanol.
(c) Process Conditions
Stage 1: 250° C., 100 bar, 1 min residence time, 1:1 $CO_2$/biomass; Stage 2: 250° C., 100 bar, 1 min residence time, butanol as solvent.
(d) Results
In stage 1, about 71.1% of xylan accounted for, including 57.3% as xylose oligomers, 7.0% as xylose monomers, and 6.8% as furfural. In stage 2, 88.9% of remaining xylan was dissolved, while about 0.1% of glucan was dissolved. Glucan content in the resultant solids was about 74-78%. A>90% overall de-lignification was achieved.

Although the foregoing invention has been described in some detail by way of illustration and example for purposes of clarity of understanding, it will be apparent to those skilled in the art that certain changes and modifications may be practiced without departing from the invention. Therefore, the descriptions and examples should not be construed as limiting the scope of the invention.

It should be noted that, as used herein, the singular form "a", "an", and "the" includes plural references unless indicated otherwise. Additionally, as used herein, the term "comprising" and its cognates are used in their inclusive sense; that is, equivalent to the term "including" and its corresponding cognates.

All patents, patent applications, documents, and articles cited herein are incorporated by reference in their entireties.

What is claimed is:

1. A method of making at least one of furfural and glucose, the method comprising:
   a. processing a biomass using a first fluid to form lignin, cellulose, and xylose;
   b. processing at least one of the cellulose and xylose using a second fluid to form glucose and furfural respectively;
   c. wherein at least one of the processing steps above is performed with a reactive fluid comprising carbon dioxide and water, the reactive fluid having a temperature and pressure above a critical point for carbon dioxide, and at least one of the temperature and the pressure of the reactive fluid being below the critical temperature and pressure, respectively, of water.

2. A method according to claim 1 wherein the reactive fluid further comprises $C_1$-$C_5$ alcohol, the temperature and pressure of the reactive fluid are above a critical point for said $C_1$-$C_5$ alcohol, and the reactive fluid is the first fluid used to process the biomass to form the lignin, cellulose, and xylose.

3. A method according to claim 1 wherein the second fluid comprises said reactive fluid of claim 1, and said second fluid does not contain alcohol.

4. A method according to claim 3 wherein the second fluid consists essentially of said carbon dioxide and said water.

5. A method according to claim 1 wherein said temperature and pressure of the first fluid and the second fluid when present are in the near-critical range for water.

6. A method according to claim 2 wherein the alcohol of the first fluid comprises ethanol.

7. A method according to claim 6 wherein the alcohol consists essentially of ethanol.

8. A method according to claim 2 further comprising separating an aqueous alcoholic solution of the lignin and the xylose from the first fluid by reducing at least one of the temperature and the pressure of the first fluid to evolve the carbon dioxide.

9. A method according to claim 8 further comprising precipitating the lignin by removing the alcohol from the alcoholic solution and filtering the lignin from the remaining solution containing the xylose.

10. A method according to claim 9 further comprising contacting the xylose-containing solution with carbon dioxide to form a second fluid, maintaining said second fluid at a temperature and pressure above the critical point of carbon dioxide and below a critical temperature, a critical pressure, or both of water sufficient to dehydrate said xylose to form furfural.

11. A method according to claim 1 wherein the cellulose is precipitated and separated from the first fluid.

12. A method according to claim 11 wherein the precipitation occurs by reducing the pressure of the first fluid sufficiently rapidly to prevent crystallization of the cellulose, providing an amorphous cellulose.

13. A method according to claim 11 or claim 12 and further comprising contacting the separated cellulose with supercritical water for a sufficient period of time to solubilize the cellulose and form a cellulose solution but not so long to hydrolyze more than ten percent by weight of the cellulose.

14. A method according to claim 13 wherein the period of time is about a second or less.

15. A method according to claim 14 wherein the period of time is about half a second or less.

16. A method according to claim 13 and further comprising quenching the cellulose solution with carbon dioxide to form a reaction mixture having a temperature and pressure above a critical point for carbon dioxide and wherein at least one of said temperature and said pressure are below a critical temperature and pressure respectively for water, and hydrolyzing said cellulose in said reaction mixture to form said glucose.

17. A method according to claim 11 or claim 12 comprising contacting said cellulose with a fluid comprising carbon dioxide and water, the third fluid having a temperature and pressure above a critical point for carbon dioxide, and at least one of the temperature and the pressure of said fluid being below the critical temperature and pressure, respectively, of water.

18. A method according to claim 17 wherein the third fluid has a temperature between about 280 and 290° C.

19. A method according to claim 18 wherein said contacting occurs for a period of time between about 15 and 20 seconds.

20. A method according to claim 1 or claim 2 wherein
   a. the second fluid comprises said carbon dioxide and water of step (c) and said processing of step (b) comprises processing the cellulose using said second fluid; and
   b. the xylose is processed using a third fluid comprising carbon dioxide and water, the third fluid having a temperature and pressure above a critical point for carbon dioxide, and at least one of the temperature and the pressure of the third fluid being below the critical temperature and pressure, respectively, of water.

21. A method according to claim 1, wherein the first fluid is quenched quickly subsequent to forming said lignin, cellulose, and xylose.

* * * * *